(12) United States Patent
Fujisawa et al.

(10) Patent No.: US 7,624,090 B2
(45) Date of Patent: Nov. 24, 2009

(54) APPARATUS AND METHOD OF READING AND RECORDING CONTENT DATA WITH VALIDATION

(75) Inventors: Hiroshi Fujisawa, Kanagawa (JP); Osamu Date, Tokyo (JP)

(73) Assignee: Sony Corporation (JP)

( * ) Notice: Subject to any disclaimer, the term of this patent is extended or adjusted under 35 U.S.C. 154(b) by 277 days.

(21) Appl. No.: 10/485,578

(22) PCT Filed: Jun. 5, 2003

(86) PCT No.: PCT/JP03/07101

§ 371 (c)(1),
(2), (4) Date: Feb. 2, 2004

(87) PCT Pub. No.: WO03/105153

PCT Pub. Date: Dec. 18, 2003

(65) Prior Publication Data

US 2004/0199511 A1 Oct. 7, 2004

(30) Foreign Application Priority Data

Jun. 5, 2002 (JP) ............................. 2002-164610
Jul. 4, 2002 (JP) ............................. 2002-195661

(51) Int. Cl.
*G06F 17/30* (2006.01)
(52) U.S. Cl. .......................................... 707/1; 386/126
(58) Field of Classification Search .................... 707/1; 386/126
See application file for complete search history.

(56) References Cited

U.S. PATENT DOCUMENTS

| | | | | |
|---|---|---|---|---|
| 4,823,333 A | * | 4/1989 | Satoh et al. .................... 369/84 |
| 4,872,151 A | * | 10/1989 | Smith ............................ 369/14 |
| 5,148,416 A | * | 9/1992 | Hoshino et al. ............ 369/30.12 |
| 6,188,835 B1 | * | 2/2001 | Grandbois ..................... 386/126 |
| 6,201,771 B1 | * | 3/2001 | Otsuka et al. ............. 369/30.32 |
| 6,701,061 B2 | * | 3/2004 | Karasudani et al. ............ 386/46 |
| 2001/0002846 A1 | | 6/2001 | Onishi | |
| 2002/0038411 A1 | * | 3/2002 | Naito ........................... 711/163 |

FOREIGN PATENT DOCUMENTS

| | | |
|---|---|---|
| JP | 6-208780 A1 | 7/1994 |
| JP | 06-259939 | 9/1994 |
| JP | 6-302155 A1 | 10/1994 |
| JP | 07-014373 A | 1/1995 |

(Continued)

*Primary Examiner*—Hung T Vy
*Assistant Examiner*—Michael Le
(74) *Attorney, Agent, or Firm*—Lerner, David, Littenberg, Krumholz & Mentlik, LLP

(57) ABSTRACT

An apparatus and method for furnishing discs with additional information specific to a given device for disc management purposes. An information control unit references a disc management table in a data management memory to verify whether or not a disc ID acquired from a current disc information management unit has already been recorded. If the result reveals the disc has never been loaded, the information control unit adds disc information about the disc to the disc management table. A user may furnish the disc with such additional information as a local disc ID and a local disc name specific to the user's device. The information control unit enters the additional information into the disc management table in association with the disc ID.

13 Claims, 49 Drawing Sheets

FOREIGN PATENT DOCUMENTS

| | | |
|---|---|---|
| JP | 08-294110 | 11/1996 |
| JP | 9-265763 A1 | 10/1997 |
| JP | 10-050031 A | 2/1998 |
| JP | 10-069758 | 3/1998 |
| JP | 11-025655 A | 1/1999 |
| JP | 11-066694 | 3/1999 |
| JP | 11-127396 | 5/1999 |
| JP | 11-185449 A | 7/1999 |
| JP | 2000-021136 A | 1/2000 |
| JP | 2000-173240 | 6/2000 |
| JP | 2000-195229 | 7/2000 |
| JP | 2001-143449 A1 | 5/2001 |
| JP | 2001-319419 | 11/2001 |
| JP | 2002-010183 | 1/2002 |
| JP | 2002-084480 A | 3/2002 |
| JP | 2003-101925 A1 | 4/2003 |

* cited by examiner

F I G. 6
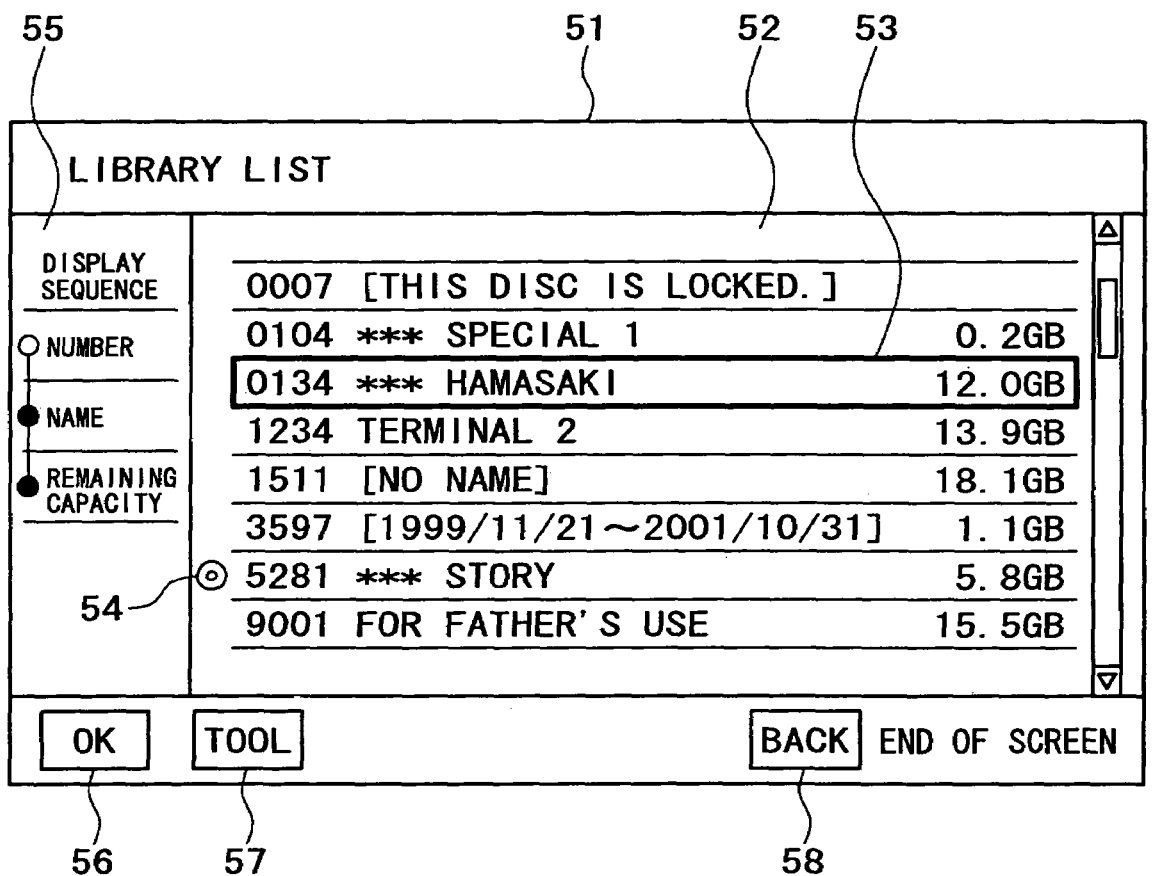

FIG. 20

| CONFIRMATION OF SEARCH SETTING | |
|---|---|
| VIEWING STATUS | UNWATCHED |
| PERIOD | FROM DECEMBER 1999 TO DECEMBER 2000 |
| KEYWORD | OLYMPIC |
| KEYWORD | HIGHLIGHTS |
| SEARCH METHOD | ALL KEYWORDS INCLUDED |

CLOSE

FIG. 22

DELETION OF SELECTED ENTRIES FROM THE LIST — 201

SELECT DISC ENTRIES TO BE DELETED FROM THE LIST. △

| | | | |
|---|---|---|---|
| ☑ | 0104 **** SPECIAL 1 | 0.2GB | FINALIZE — 205 |
| ☐ | 0134 **** HAMASAKI | 12.0GB | CANCEL — 206 |
| ☑ | 1234 TERMINAL 2 | 13.9GB | VIEW ENTRIES FOR DELETION — 207 |
| ☑ | 1511 [NO NAME] | 18.1GB | SELECT ALL — 208 |
| ☐ | 3597 [1999/11/21~2001/10/31] | 1.1GB | CANCEL SELECTION — 209 |
| ☑ | 5281 **** STORY | 5.8GB | |
| ☐ | 9001 FOR FATHER'S USE | 15.5GB | |

▽

OK — 210    BACK — 211

IF THE MAXIMUM ALLOWABLE NUMBER OF DISC ENTRIES IN THE LIST IS EXHAUSTED, THE EXISTING ENTRIES WILL BE OVERWRITTEN AUTOMATICALLY WITH NEW DISC ENTRIES.

IF THE MAXIMUM ALLOWABLE NUMBER OF DISC ENTRIES IN THE LIST IS EXHAUSTED, THE EXISTING ENTRIES WILL NOT BE OVERWRITTEN AUTOMATICALLY WITH NEW DISC ENTRIES.

THE MAXIMUM ALLOWABLE NUMBER OF DISC ENTRIES IN THE LIST HAS BEEN EXHAUSTED. TO MAKE AN ENTRY OF THIS DISC INTO THE LIST, DELETE UNNECESSARY DISC ENTRIES FROM THE LIST AND RELOAD THE DISC.

FIG. 32

DISC INFORMATION

| DISC NAME | SERIAL DRAMA SPECIAL "***" IN THE SUMMER 2001, AND HIGHLIGHTS FROM THE SPRING FINALS OF HIGH SCHOOL BASEBALL CHAMPIONSHIP AT KOSHIEN STADIUM | | |
|---|---|---|---|
| TITLE COUNT | 12 | DISC ID | 5280 |
| RECORDING DATES | 2/05/1999 ~ 11/25/2001 | | |
| REMAINING STORAGE CAPACITY | DR: 0H45M~1H40M<br>HR: 1H00M | SR: 2H21M<br>LR: 4H49M | |
| | 22.2/23GB | | |

CLOSE  BACK

FIG. 40

| LIBRARY LIST | | | | |
|---|---|---|---|---|
| | LOCAL DISC | | | |
| DISPLAY SEQUENCE | 0001 | 0007 | [THIS DISC IS LOCKED.] | 0.2GB |
| ● NUMBER | 0003 | 0134 | MY FAVORITE XXX | 12.0GB |
| ● NAME | 0002 | 0104 | DOCUMENTARY | |
| ● REMAINING CAPACITY | 0004 | 1234 | MOVIE BROADCAST ON mm/dd | 13.9GB |
| ○ LOCAL | 0005 | 1511 | [NO NAME] | 18.1GB |
| | 0006 | 3597 | [11/21/1999 – 10/31/2001] | 1.1GB |
| | ◎ 0007 | 5281 | DRAMA BROADCAST ON mm/dd | 5.8GB |
| | 0008 | 9001 | FOR FATHER'S USE | 15.5GB |

[OK]  [TOOL]  [BACK / END OF SCREEN]

THE DATA TO BE RECORDED TO THE
LOADED DISC "MY FAVORITE ***"
ARE STORED ON THE HARD DISC.
DO YOU WANT THE DATA TO BE
RECORDED TO THE LOADED DISC?

| RECORD | DELETE | CHANGE |

SELECT THE DESIRED LOCAL DISC.

| LOCAL | DISC | |
|---|---|---|
| 0001 | 0007 | [THIS DISC IS LOCKED.] |
| 0002 | 0104 | DOCUMENTARY |
| 0003 | 0134 | MY FAVORITE *** |
| 0004 | 1234 | MOVIE BROADCAST ON mm/dd |
| 0005 | 1511 | [NO NAME] |

| RECORD | CANCEL |

┌─────────────────────────────────────────────────┐
│ THE HARD DISC CONTAINS DATA CONSTITUTING        │
│ A PLURALITY OF TITLES TO BE RECORDED TO         │
│ THE SELECTED DISC.                              │
│                                                 │
│   PRIORITY  TITLE NAME  RECORDING DATE   SIZE   │
│      1       TITLE A     01/01/2002     0.3GB   │
│      2       TITLE B     01/31/2002     0.1GB   │
│                                                 │
│   SET PRIORITY FOR THE DATA ABOUT               │
│   TO BE RECORDED.                               │
│                                      ┌────────┐ │
│                                      │PRIORITY│ │
│                                      └────────┘ │
└─────────────────────────────────────────────────┘
                                            452
```

FIG. 50

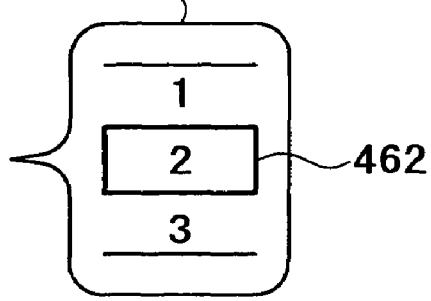

FIG. 51A

| DISC ID | DISC NAME | ADDITIONAL INFORMATION | FLAG | RECORDING ID | | |
|---|---|---|---|---|---|---|
| | | | | PRIORITY 1 | PRIORITY 2 | ... |
| 0134 | ***HAMASAKI | ... | 1 | 0x001001 | 0x010010 | |

FIG. 51B

| DISC ID | DISC NAME | ADDITIONAL INFORMATION | FLAG | RECORDING ID | | | |
|---|---|---|---|---|---|---|---|
| | | | | PRIORITY 1 | PRIORITY 2 | PRIORITY 3 | ... |
| 0134 | ***HAMASAKI | ... | 1 | 0x001001 | 0x011010 | 0x010011 | |

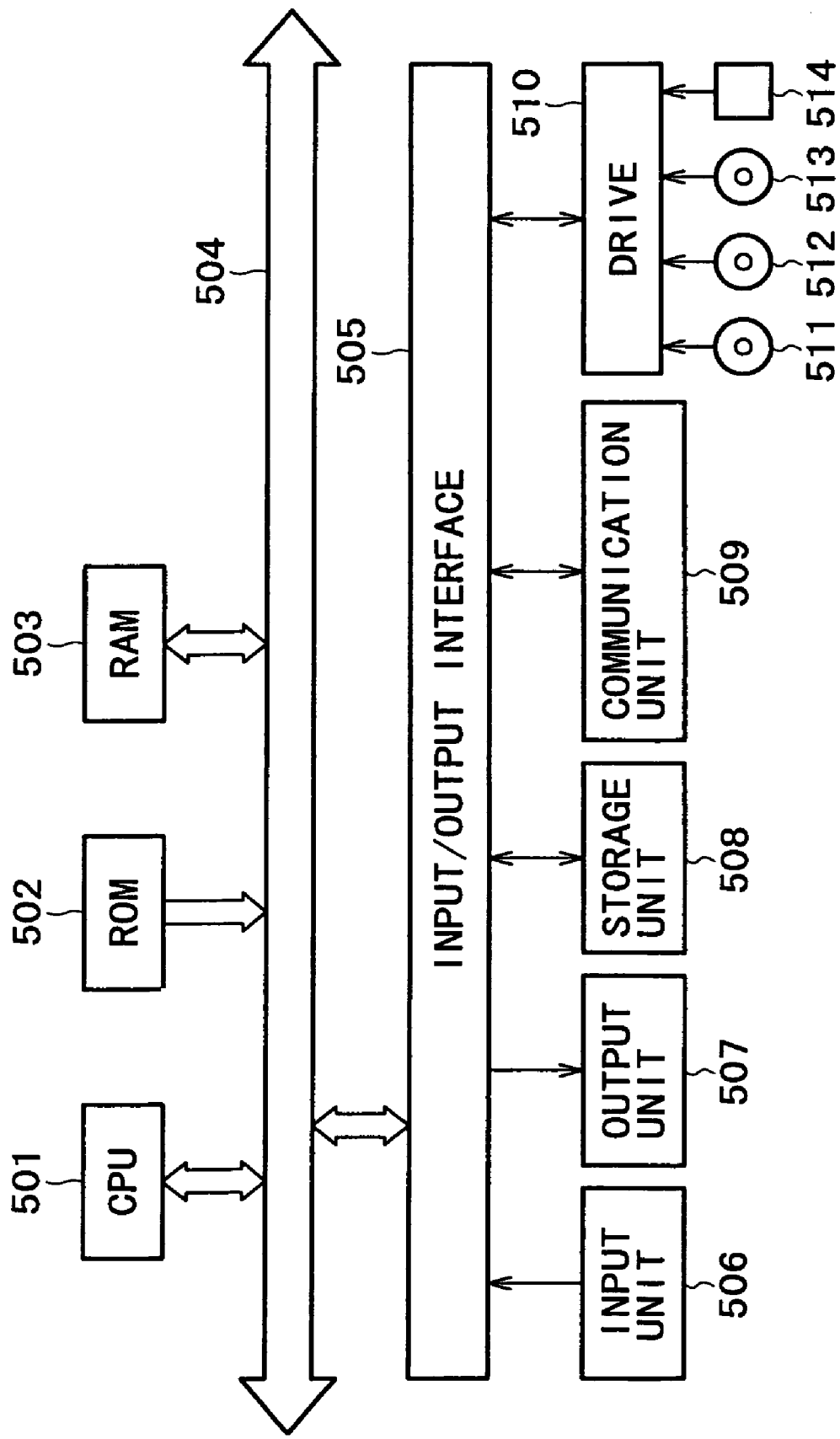

APPARATUS AND METHOD OF READING AND RECORDING CONTENT DATA WITH VALIDATION

CROSS-REFERENCE TO RELATED APPLICATIONS

The present application is a national stage application under 35 U.S.C. § 371 of International Application No. PCT/JP03/007101, filed Jun. 5, 2003, which claims priority from Japanese Application Nos. JP 2002-164610, filed Jun. 5, 2002, and JP 2002-195661, filed Jul. 4, 2002, the disclosures of which are hereby incorporated by reference herein.

BACKGROUND OF THE INVENTION

1. Technical Field

The present invention relates to an information processing apparatus, an information processing method, a recording medium, and a program. More particularly, the invention relates to an information processing apparatus, an information processing method, a recording medium, and a program for managing information recorded on recording media such as optical discs in such a manner that the recorded information may be displayed in an easy-to-view format, sorted out, and searched for with ease.

2. Background Art

Today, diverse recording media such as magnetic discs, optical discs, magneto-optical discs, and semiconductor memories are coming-into general use. Illustratively, users can record desired music or picture data to the recording medium, reproduce recorded music or picture data from the medium, or edit the recorded data through the intervention of the medium.

However, one disadvantage has been recognized for the disc media: they have no IDs of their own, so that there has been no viable method by which to manage the discs using IDs.

A method has been proposed which allows users to write any distinguishable IDs to their own AV (audio visual) apparatus for disc management. A disadvantage of this method is that since the IDs are written to an internal memory of each apparatus, the discs involved can be managed by that apparatus alone and not by any other AV apparatus, at least not in the same manner.

Where a single disc is to be shared by a plurality of users, it is preferred that the disc be furnished with different additional information specific to each user or to each AV apparatus to be used.

If data are desired to be recorded to a given disc and if that disc is not immediately available for loading into the AV apparatus at hand, it is desirable that the data be retained temporarily on an internal hard disc or the like of the apparatus for management purposes.

SUMMARY OF THE INVENTION

The present invention has been made in view of the above circumstances and provides an apparatus, a method, a recording medium, and a program for furnishing discs with different additional information specific to each user or to each apparatus and for allowing data to be stored temporarily inside the apparatus if a recording disc is not loaded in the apparatus for the moment.

An information processing apparatus of the present invention includes: a reading means for reading, from a loaded information recording medium, identification information for identifying the information recording medium; an acquiring means for acquiring related information about first content data recorded on the information recording medium; a recording means for recording the identification information read out by the reading means and the related information acquired by the acquiring means, in such a manner that the identification information is associated with the related information; and a comparing means for comparing the identification information read out by the reading means with the identification information associated with the related information recorded by the recording means.

If the comparison by the comparing means reveals that the identification information read out by the reading means has not been recorded by the recording means, then the recording means may record the identification information and the related information acquired by the acquiring means in such a manner that the identification information is associated with the related information.

The information processing apparatus may further include: a display controlling means for controlling display of the related information recorded by the recording means; and a selecting means for selecting the related information of which the display is controlled by the display controlling means; wherein the comparing means may compare the identification information associated with the related information selected by the selecting means with the identification information read out by the reading means.

The information processing apparatus may further include a reproducing means which, if the comparison by the comparing means reveals that the identification information associated with the related information selected by the selecting means matches the identification information read out by the reading means, then reproduces from the information recording medium the first content data associated with the related information selected by the selecting means.

The information processing apparatus may further include a notifying means which, if the comparison by the comparing means reveals that the identification information associated with the related information selected by the selecting means does not match the identification information read out by the reading means, then prompts a user to load the information recording medium associated with the identification information read out by the reading means.

The information processing apparatus may further include: a storing means for storing second content data acquired so as to be recorded to the information recording medium, in association with the identification information for identifying the information recording medium; and a determining means for determining whether or not the identification information read out by the reading means matches the identification information associated with the second content data stored by the storing means.

The information processing apparatus may further include a writing means which, if the determining means determines that the identification information read out by the reading means matches the identification information associated with the second content data stored by the storing means, then reads the second content data from the storing means and writes the second content data to the information recording medium.

The recording means may record, in association with the identification information, additional information which differs from the related information recorded on the information recording medium and which concerns the first content data.

An information processing method of the present invention includes the steps of: reading, from a loaded information recording medium, identification information for identifying the information recording medium; acquiring related information about first content data recorded on the information recording medium; recording the identification information read out in the reading step and the related information acquired in the acquiring step, in such a manner that the identification information is associated with the related information; and comparing the identification information read out in the reading step with the identification information associated with the related information recorded in the recording step.

The information processing method may further include the steps of: storing second content data acquired so as to be recorded to the information recording medium, in association with the identification information for identifying the information recording medium; and determining whether or not the identification information read out in the reading step matches the identification information associated with the second content data stored in the storing step.

The information processing method may further include the step of, if the determining step determines that the identification information read out in the reading step matches the identification information associated with the second content data stored in the storing step, reading the second content data stored in the storing step and writing the second content data to the information recording medium.

A recording medium of the present invention which stores a computer-readable program includes the steps of: reading, from a loaded information recording medium, identification information for identifying the information recording medium; acquiring related information about content data recorded on the information recording medium; recording the identification information read out in the reading step and the related information acquired in the acquiring step, in such a manner that the identification information is associated with the related information; and comparing the identification information read out in the reading step with the identification information associated with the related information recorded in the recording step.

A program of the present invention for causing a computer to execute the steps of: reading, from a loaded information recording medium, identification information for identifying the information recording medium; acquiring related information about content data recorded on the information recording medium; recording the identification information read out in the reading step and the related information acquired in the acquiring step, in such a manner that the identification information is associated with the related information; and comparing the identification information read out in the reading step with the identification information associated with the related information recorded in the recording step.

Through the use of the information processing apparatus, information processing method, and program according to the invention, identification information for identifying a loaded information recording medium is first read out of the medium. Related information about the content data recorded on that information recording medium is acquired. The two kinds of information are then recorded in association with each other.

BRIEF DESCRIPTION OF THE DRAWINGS

FIG. 6 is a schematic view of a typical library list screen display;

FIG. 20 is a schematic view of a typical search setting confirmation screen display;

FIG. 22 is a schematic view showing a typical screen display for deleting selected entries from the list;

FIG. 28A is a schematic view of a typical message screen display;

FIG. 28B is a schematic view of another typical message screen display;

FIG. 29 is a schematic view of another typical message screen display;

FIG. 32 is a schematic view of a typical dialog screen display of disc information;

FIG. 40 is a schematic view of a typical disc information screen display;

FIG. 46 is a schematic view of another typical dialog screen display;

FIG. 47 is a schematic view of a typical disc change screen display;

FIG. 49 is a schematic view of a typical priority setting screen display;

FIG. 50 is a schematic view of a typical pull-down screen display brought about when a Priority button is selected on the priority setting screen of FIG. 49;

FIG. 51A is an explanatory view showing how priorities are set;

FIG. 51B is another explanatory view depicting how priorities are set;

FIG. 57 is a block diagram sketching a typical internal structure of a general-purpose computer.

DETAILED DESCRIPTION

Best Mode for Carrying Out the Invention

Preferred embodiments of this invention will now be described with reference to the accompanying drawings.

Figure 1:
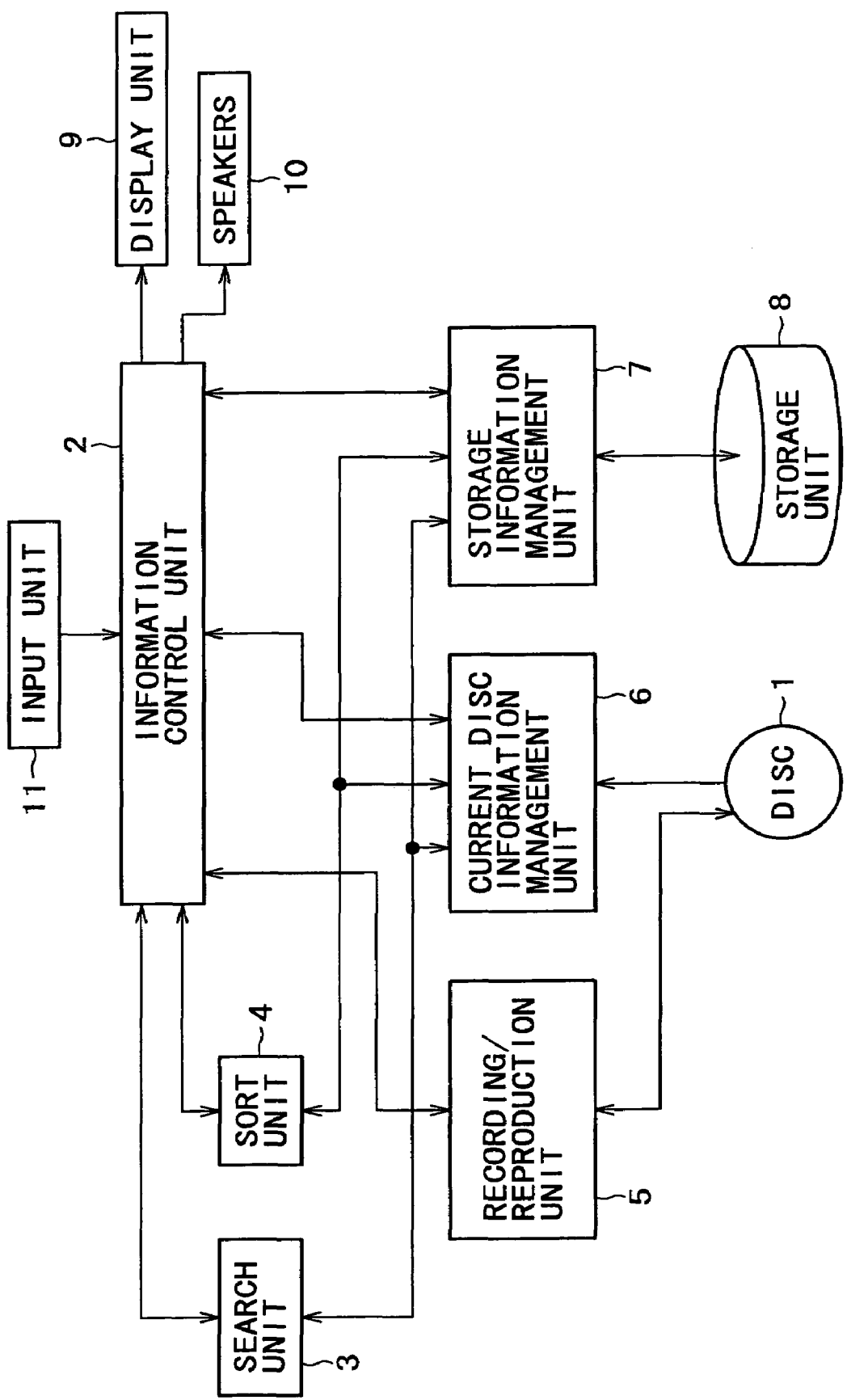
FIG. 1 is a block diagram outlining a typical structure of a video recorder embodying this invention.

FIG. 1 schematically shows a typical structure of a digital video recorder practiced as a first embodiment of this invention. This digital video recorder is capable of reproducing video and audio content data from a disc 1 and recording some information to the disc 1.

The disc 1 is loaded into a disc drive, not shown, of the digital video recorder. The disc 1 is any one of writable media such as CD-R (Compact Disc-Recordable), CD-RW (CD-ReWritable), DVD-R (Digital Versatile Disc-Recordable), and DVD-RW (DVD-ReWritable). The digital video recorder may record video and audio content data or additional information (e.g., disc name and title names) associated with the content data to data recording areas of the disc 1. A plurality of title names may be recorded to a single disc 1.

A predetermined recording area of the disc 1 illustratively contains a previously recorded 16-digit disc ID specific to that disc. Certain digits of the disc ID (e.g., its low-order four digits) are visibly indicated as a cartridge ID on the disc surface.

Although only one disc is shown in the example of FIG. 1, this is not limitative of the invention. A digital video recorder with a disc changer capability may have a plurality of discs 1 loaded therein.

An information control unit 2 executes predetermined control programs based on input signals which represent a user's operations and which are fed from an input unit 11. Through the program execution, the information control unit 2 controls a search unit 3, a sort unit 4, a recording/reproduction unit 5, a current disc information management unit 6, and a storage information management unit 7. The information control unit 2 acquires current information from the current disc information management unit 6 and sends the acquired information to the storage information management unit 7.

The information control unit 2 supplies a display unit 9 and speakers 10 with pictures and sounds represented by the content data fed from the recording/reproduction unit 5. Furthermore, the information control unit 2 outputs to the display unit 9 diverse kinds of information (disc information and title information, to be described later) sent from the current disc information management unit 6 or from the storage information management unit 7. Also output to the display unit 9 are search results from the search unit 3 and sorted results from the sort unit 4.

Under control of the information control unit 2, the search unit 3 causes the current disc information management unit 6 and storage information management unit 7 to search for the information designated by the user, and sends the result of the search to the information control unit 2. The sort unit 4 under control of the information control unit 2 causes the current disc information management unit 6 and storage information management unit 7 to sort information in the order designated by the user, and supplies the sorted result to the information control unit 2.

The recording/reproduction unit 5 under control of the information control unit 2 records content data from the information control unit 2 to the disc 1, or reads content data from the disc 1 and supplies the retrieved data to the control unit 2. In addition, the recording/reproduction unit 5 under control of the information control unit 2 records to the disc 1 various kinds of information which have been input by the user.

The current disc information management unit 6 acquires current information from the loaded disc 1 and sends the acquired information to the information control unit 2. The storage information management unit 7 stores into a storage unit 8 the current information acquired from the information control unit 2, or retrieves current information from the storage unit 8 and feeds the retrieved information to the information control unit 2.

The storage unit 8 is illustratively made up of a mass-storage hard disc drive. Under management of the storage information management unit 7, the storage unit 8 retains the current information acquired from the disc 1. The current information at least includes a disc ID and a title number associated with that disc ID.

With this embodiment, when the disc 1 is loaded, current information retrieved from the disc 1 is stored successively into the storage unit 8 as long as the unit 8 has a free space. When the storage unit 8 has been exhausted in capacity, the stored information is overwritten with new information either automatically or upon display of a message prompting the user to delete unnecessary information from storage.

The display unit 9 is constituted illustratively by an LCD (liquid crystal display) or the like. In operation, the display unit 9 reproduces (i.e., displays) content data from the disc 1 or displays a library list screen 51 (FIG. 6), to be discussed later.

The input unit 11 may be composed of buttons, switches, a keyboard, a mouse, and/or a jog dial attached to the apparatus body. The input unit 11 may alternatively a remote commander furnished independently of the body.

Figure 2:
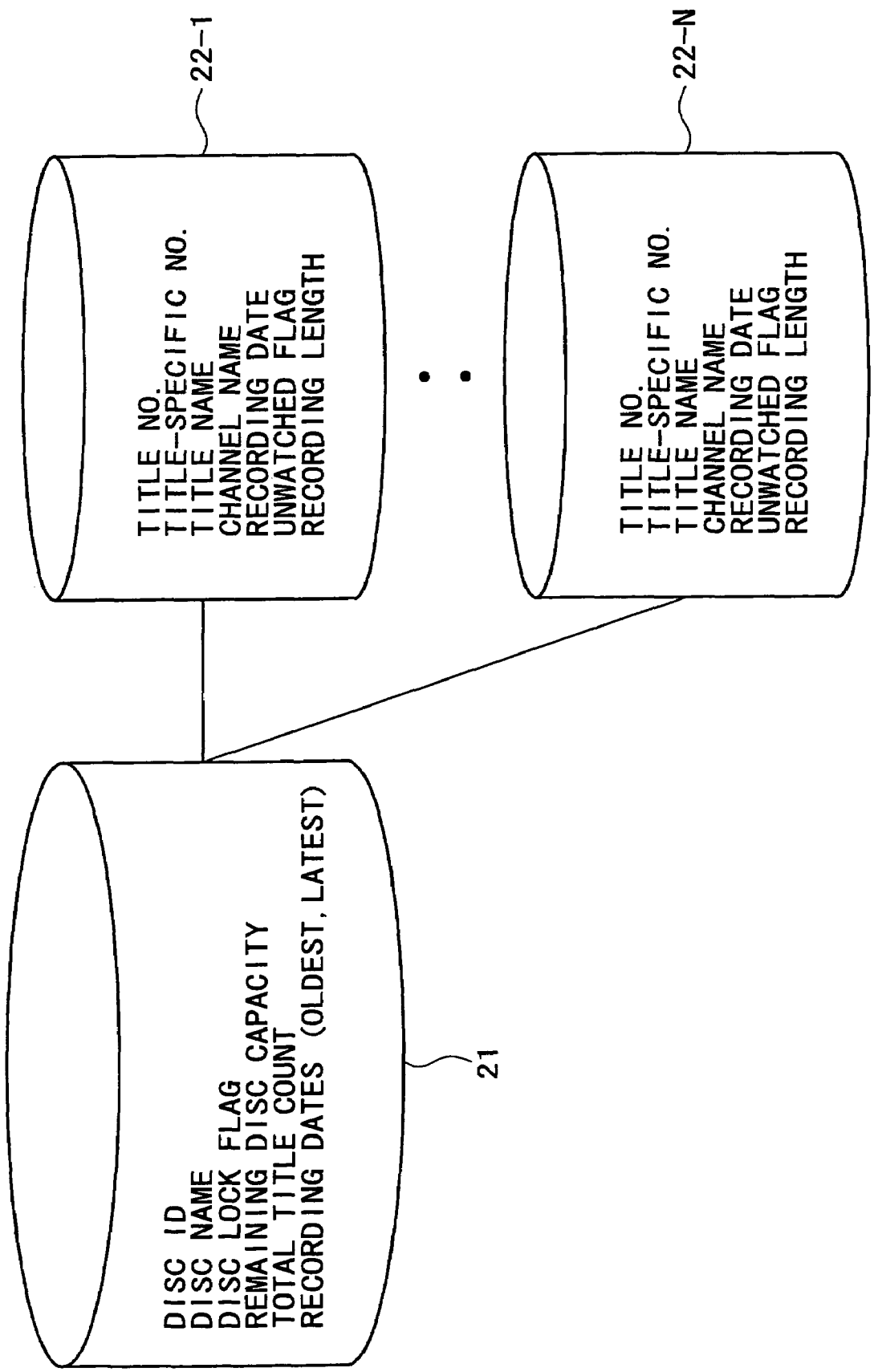
FIG. 2 is a schematic view showing typical current information held in a storage unit.

FIG. 2 schematically shows typical current information held in the storage unit 8. In the storage unit 8, disc information 21 is stored in association with sets of title information 22-1 through 22-N (or simply called the title information 22 if there is no specific need to distinguish the title information sets 22-1 through 22-N from one another). Although only one set of disc information 21 is shown in the example of FIG. 2, this is not limitative of the invention. Alternatively, a plurality of disc information sets 21 may be stored, each in association with the title information sets 22-1 through 22-N.

The disc information 21 includes a disc ID, a disc name, a disc lock flag, a remaining disc capacity, a total title count, and recording dates. The disc ID is illustratively formed by 16 alphanumeric characters specific to the disc 1 and recorded previously on the disc 1. A suitable disc name is provided by the user in order to name the disc 1 as desired. The disc lock flag indicates whether the information recorded on the disc 1 is being locked. The remaining disc capacity refers to the currently available storage capacity of the disc 1. The total title count represents the total number of title information sets 22-1 through 22-N, to be described later. The recording dates indicate the oldest and the latest dates of the content data recorded on the disc 1.

The title information sets 22-1 through 22-N each include a title number, a title-specific number, a title name, a channel name, a recording date, an unwatched flag, and a recording length. The title number is any number that is distinguishable within the disc 1. The title-specific number represents a number that is specific to each content data item. The tile name is a name given to each content data item. The channel name denotes the broadcasting station from which the content data were broadcast. The recording date stands for the date on which the content data were recorded. The unwatched flag is a flag that indicates whether a given content data item has been watched.

Figure 3:
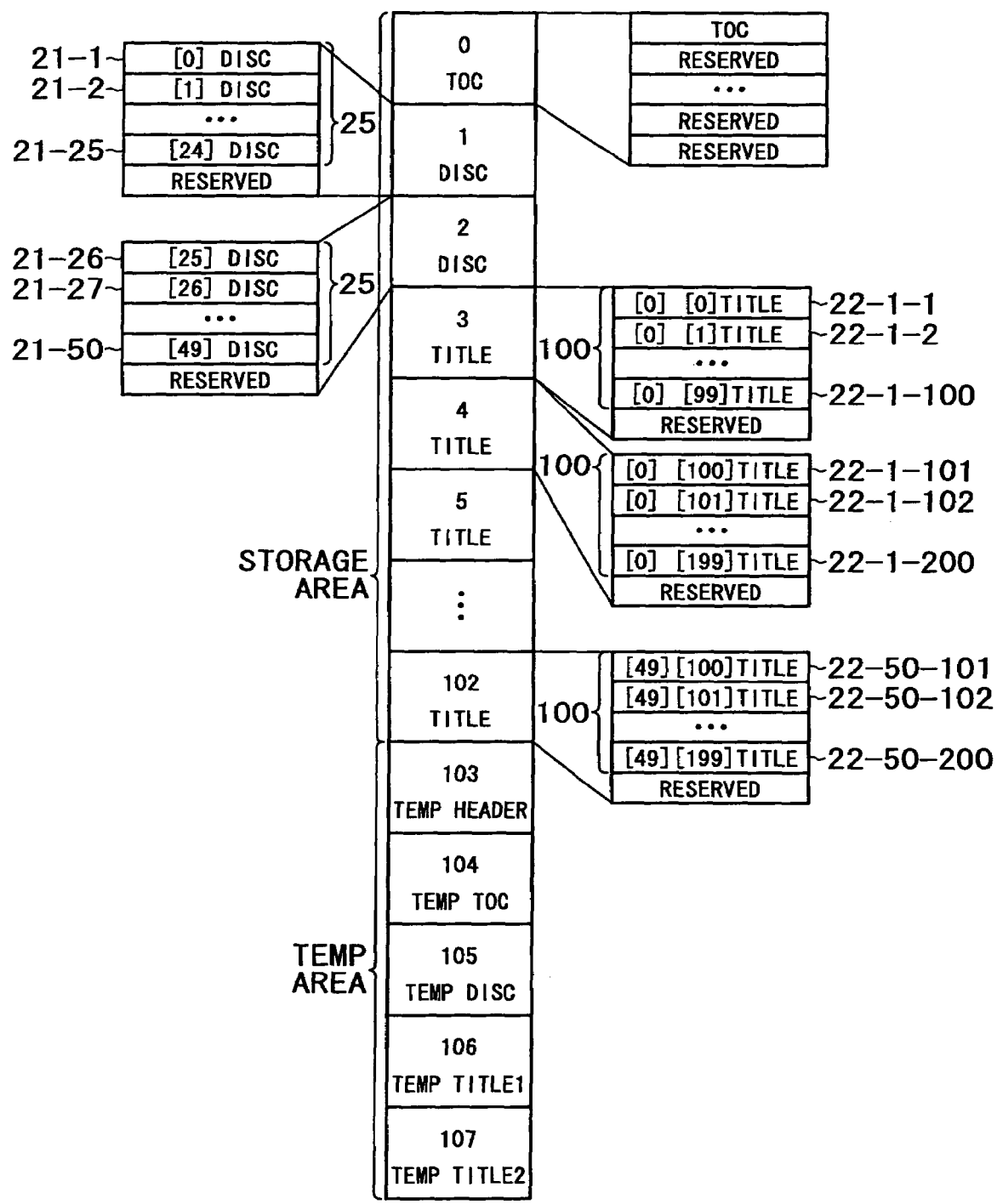
FIG. 3 is a schematic view sketching a data structure of current information retained in the storage unit.

FIG. 3 depicts a typical data structure of current information stored in the storage unit 8. With this data structure, disc information sets 21-1 through 21-50 for up to 50 discs 1 may be accommodated. For purpose of illustration, the disc information sets 21-1 through 21-50 may be associated with 200 title information sets 22-1-1 through 22-50-200.

The storage unit 8 is formed illustratively by a total of 108 blocks ranging from block 0 to block 107, each block having a size of 16 kilobytes. In the description that follows, the blocks 0 through 102 may be collectively called a storage area and the blocks 103 through 107 a temp area as needed.

The block 0 (TOC) accommodates 15 kilobytes of TOC (table of contents) information. The block 1 holds disc information sets 21-1 through 21-25 and the block 2 retains disc information sets 21-26 through 21-50, each disc information set having a size of 600 bytes. The block 3 (title) has title information sets 22-1-1 through 22-1-100, block 4 has title information sets 22-1-101 through 22-1-200, and so on. The block 102 has title information sets 22-50-101 through 22-50-200. Each title information set has a size of 160 bytes.

In the example of FIG. 3, one block accommodates disc information 21 of 25 discs and title information 22 of 100 titles. The regions indicated as "Reserved" make up unused (i.e., reserved) areas.

The block 103 (temp header) holds location information about content data recorded on the loaded disc. The block 104 (temp TOC) retains TOC information about the loaded disc. The block 105 (temp disc) keeps disc information about the loaded disc. The blocks 106 and 107 (temp title 1, temp title 2) each accommodate title information about the loaded disc. The blocks 103 through 107 are provided for use in a duplication process executed to eliminate mismatches between stored information items.

The phenomenon called the mismatch occurs illustratively when power is removed inadvertently while data are being written to the storage unit 8. The sudden disruption of power can leave a single data item updated only halfway; part of the data item is renewed but the rest remains old.

With this embodiment, the mismatch is prevented for each disc 1 by operating simultaneously on one block of TOC information, one block of disc information, and two (or a plurality of) blocks of title information. Illustratively, the block 0 holding the TOC information, block 1 retaining the disc information set 21-1, and blocks 3 and 4 having the title information sets 22-1-1 through 22-1-200 are handled as a single coherent group for a disc ID of "0."

Information is written and retrieved on a block-by-block basis. When the information in the temp area is all copied to the storage area in a process that will be described later, the temp header (block 103) of the temp area is cleared.

Figure 4:
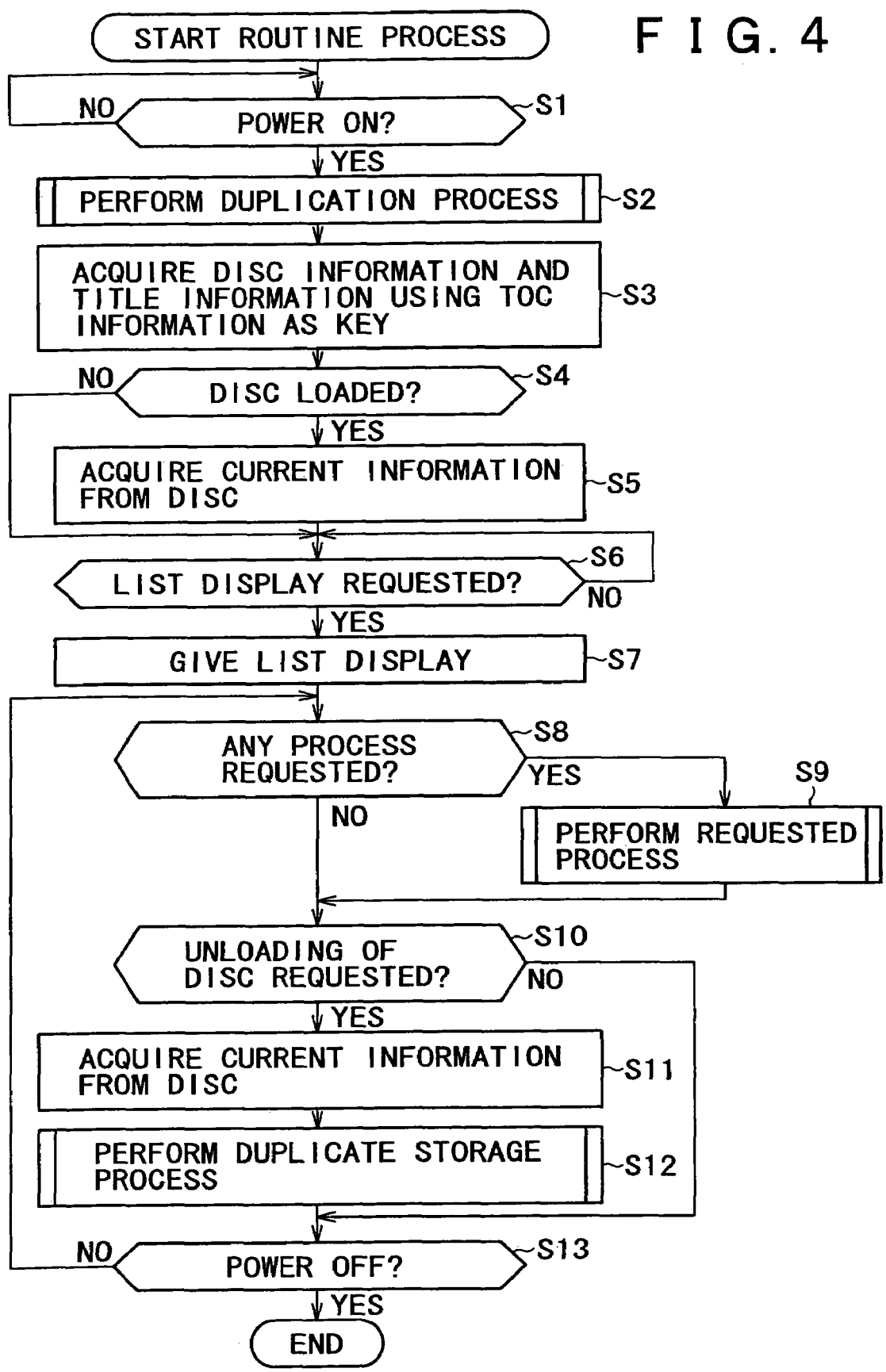
FIG. 4 is a flowchart of steps constituting a routine process.

Described below with reference to the flowchart of FIG. 4 is the routine process carried out by the digital video decoder shown in FIG. 1.

In step S1, the information control unit 2 determines whether or not the digital video recorder is turned on in response to the user's operation. The information control unit 2 waits for power to be applied. If power is found to be applied in step S1, step S2 is reached. In step S2, the information control unit 2 causes the storage information management unit 7 to carry out a duplication process.

Figure 5:
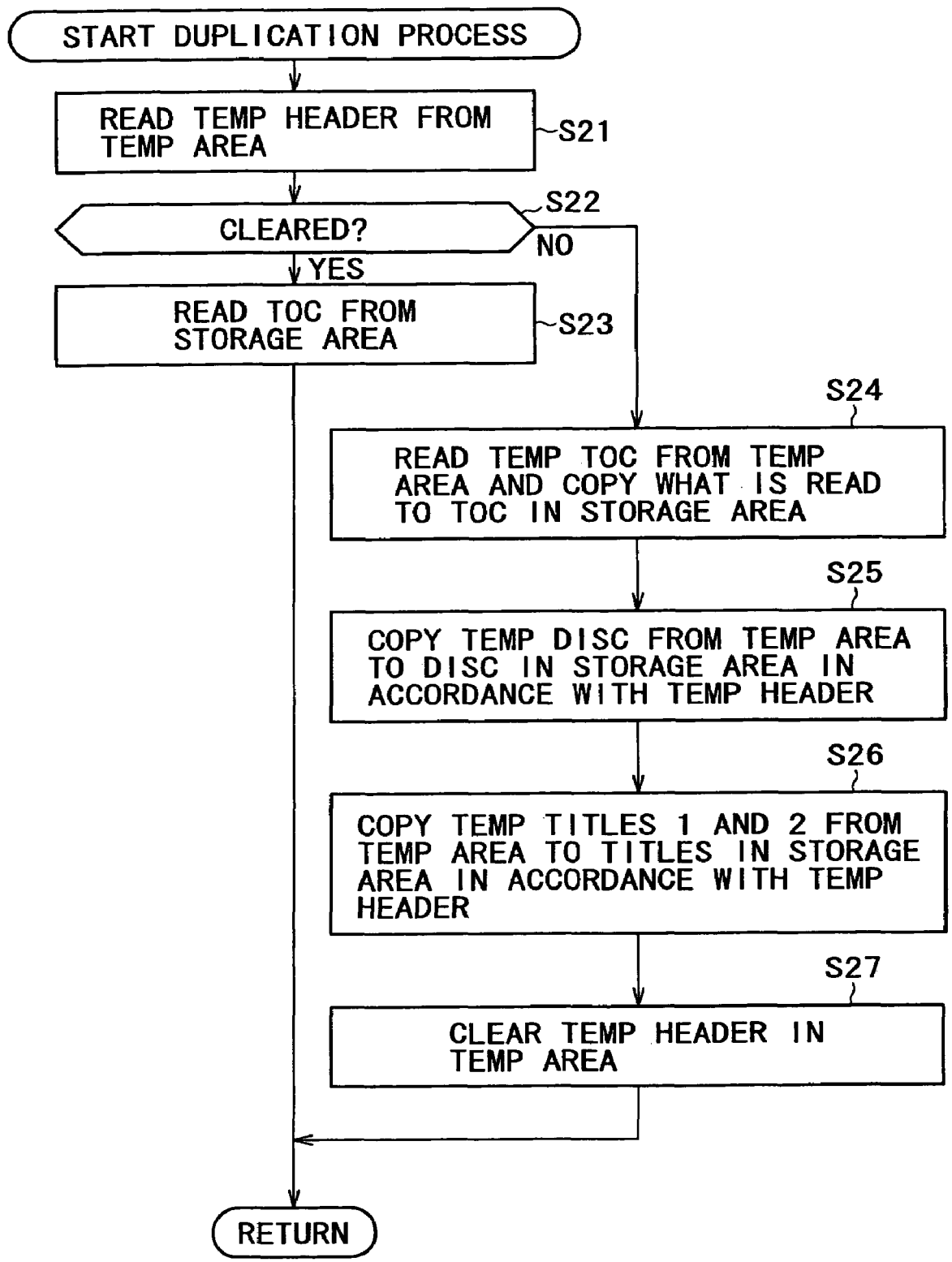
FIG. 5 is a flowchart of steps detailing a duplication process in step S2 of FIG. 4.

Details of the duplication process are discussed below by referring to the flowchart of FIG. 5.

In step S21, the storage information management unit 7 reads information from the temp header (block 103) in the temp area of the storage unit 8. In step S22, the storage information management unit 7 determines whether the temp header information retrieved in step S21 turns out to be cleared. If the temp header information is found to be cleared, step S23 is reached.

In step S23, the storage information management unit 7 determines that the diverse kinds of information held in the storage area are valid given the fact that the temp header information is found cleared. The storage information management unit 7 then reads the TOC information from the TOC (block 0) in the storage area.

If in step S22 the temp header information is not found to be cleared, step S24 is reached. In step S24, the storage information management unit 7 determines that the items of information held in the storage area are invalid. The storage information management unit 7 then reads the TOC information from the temp TOC (block 104) in the temp area and copies the retrieved information to the TOC (block 0) in the storage area.

In step S25, the storage information management unit 7 reads the disc information from the temp disc block (block 105) in the temp area in accordance with the temp header information, and copies the retrieved information to a disc block (e.g., block 1) in the storage area.

In step S26, the storage information management unit 7 reads the title information from the temp title 1 (block 106) in the temp area in accordance with the temp header information, and copies the retrieved information to a title block (e.g., block 3) in the storage area. If more title information is found in the temp title 2 (block 107), that information is copied to another title block (e.g., block 4) in the storage area.

In step S27, the storage information management unit 7 clears the information from the temp header (block 103) in the temp area.

As described, if the items of information kept in the storage area are found to be invalid, then steps S24 through S27 are carried out to copy the valid information retained in the temp area. The process is designed to maintain data consistency.

After step S23 or S27, control is returned to step S3 of FIG. 4. In step S3, the information control unit 2 causes the storage information management unit 7 to acquire disc information and title information using the TOC information as the key. That is, the storage information management unit 7 obtains the disc and title information from the storage unit 8 on the basis of the TOC information retrieved in step S23 or S24 as discussed above with reference to FIG. 5.

In step S4, the information control unit 2 determines whether or not the disc 1 is loaded in the disc drive, not shown. If the disc 1 is found to be loaded, step S5 is reached. In step S5, the information control unit 2 causes the current disc information management unit 6 to read the-current information from the loaded disc 1.

If in step S4 the disc 1 is not found to be loaded, step S5 is skipped. In step S6, the information control unit 2 determines whether or not the user has requested display of a library list. The information control unit 2 waits for the user to request a library list display.

If in step S6 the display of a library list is found requested, step S7 is reached. In step S7, the information control unit 2 outputs to the display unit 9 the current information acquired from the current disc information management unit 6 and the disc information obtained from the storage information management unit 7. The display unit 9 displays the received information as the library list.

FIG. 6 gives a display example of a library list screen 51. The library list screen 51 indicates a library list display area 52, a cursor 53, a loaded disc mark 54, a display sequence setting area 55, an OK button, a Tool button 57, and a Back button 58.

The library list display area 52 shows a list of cartridge IDs (part of disc IDs), disc names, and remaining disc capacities taken out of the disc information acquired from the current disc information management unit 6 and storage information management unit 7. The cursor 53 is shown highlighting the disc information constituted by "0134 (cartridge ID), * Hamasaki (disc name), 12.0 GM (remaining disc capacity)." The loaded disc mark 54 indicates that the loaded disc 1 has the disc information "5281, * STORY, 5.8 GB."

The display sequence setting area 55 shows items "Number," "Name" and "Remaining Capacity." The displayed information is sorted by one of these items which is selected by the user (i.e., by cartridge ID, by disc name, or by remaining disc capacity in descending order). In the example of FIG. 6, the displayed information is shown sorted by number (by cartridge ID).

The buttons 56 through 58 are each selected as needed by the user operating the input unit 11. Selecting the OK button 56 displays a submenu 61 (FIG. 8A or 8B); selecting the Tool button 57 displays a tool menu 121 (FIG. 14); and selecting the Back button 58 terminates the library list screen 51.

Returning to step S8 in FIG. 4, the information control unit 2 determines whether or not the user has requested any one of predetermined processes (e.g., reproduction reservation, search, or deletion). If one of these processes is found to be requested, step S9 is reached in which the requested process is performed.

For example, it is assumed that the reproduction reservation process is requested in step S9. Details of the reproduction reservation process are discussed below with reference to the flowchart of FIG. 7.

In step S41, the information control unit 2 determines whether or not any title is selected and its reproduction requested by the user. The information control unit 2 waits for reproduction of a title to be requested. Described below with reference to FIGS. 8A through 10 is what takes place until a desired title is selected and its reproduction requested.

Figure 8A:
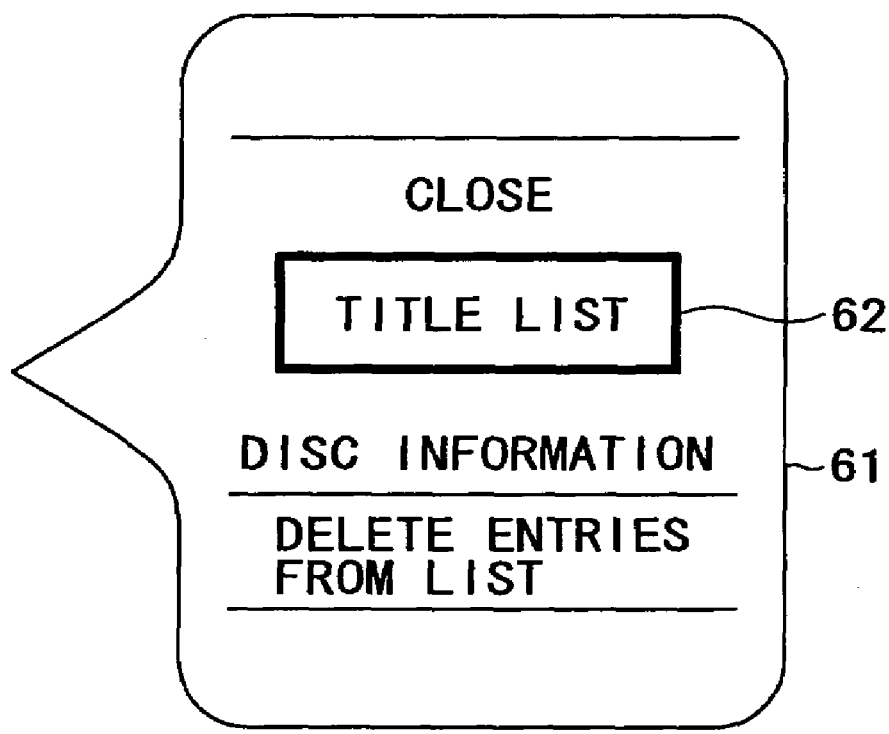
FIG. 8A is a schematic view of a typical submenu display of the library list.
Figure 8B:
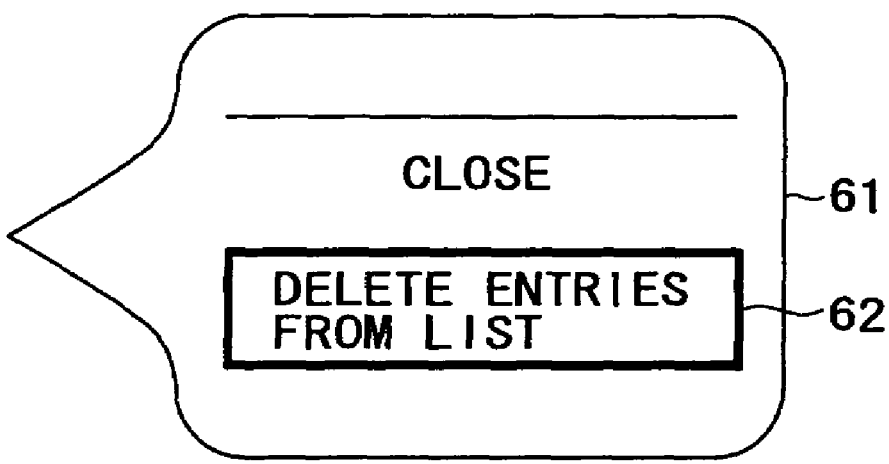
FIG. 8B is a schematic view of another typical submenu display of the library list.

Suppose that the user operating the input unit 11 selects a desired item (disc information "0134, *** Hamasaki, 12.0 GB" in this example) by use of the cursor 53 on the library list screen 51 and pushes the OK button 56. In that case, the information control unit 2, given the user's instruction, causes the display unit 9 to display the library list submenu 61 as shown in FIG. 8A. The submenu 61 includes such user-selectable items as "Close," "Title List," "Disc Information," and "Delete Entries from List."

If locked disc information (e.g., "0007: This Disc Is Locked" in FIG. 6) is selected by the cursor 53 before the OK button 56 is pushed, then the submenu 61 of FIG. 8B appears. This submenu 61 indicates user-selectable items such as "Close" and "Delete Entries from List."

When the user selects the item "Title List" by operating a cursor 62 on the submenu 61 of FIG. 8A, the information control unit 2 outputs to the display unit 9 the title information which corresponds to the user-selected disc information and which is derived from the title information acquired from the storage information management unit 7. (In this case, the title information corresponds to the disc information having the cartridge ID "0134" and the disc name "*** Hamasaki.") The display unit 9 displays the received information as a title list.

Figure 9:
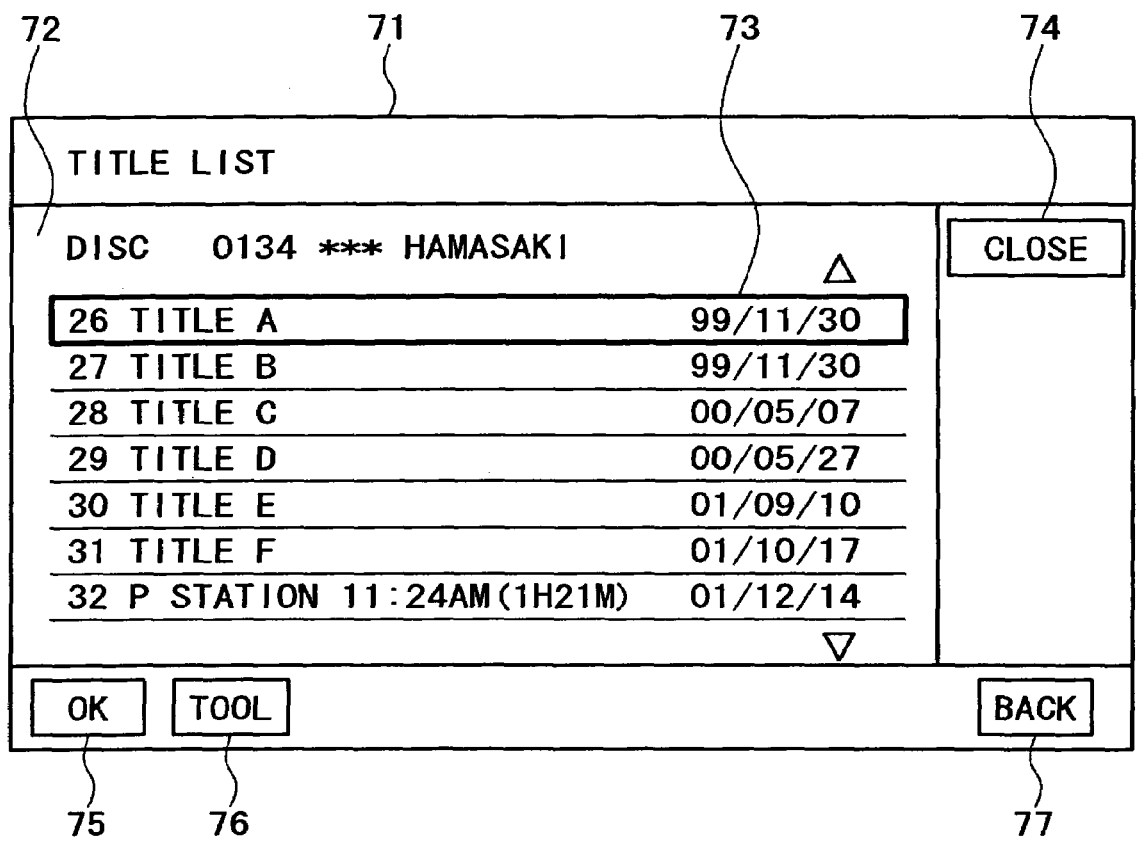
FIG. 9 is a schematic view of a typical title list screen display.

FIG. 9 schematically shows a display example of a title list screen 71. The title list screen 71 includes a title list display area 72, a cursor 73, a Close button 74, an OK button 75, a Tool button 76, and a Back button 77.

The title list display area 72 gives a list of title numbers, title names, and recording dates derived from the title information associated with the disc information having the cartridge ID "0134" and the disc name "*** Hamasaki." In this example, the cursor 73 is shown highlighting the title information "26 (title No.), Title A (title name), Nov. 30, 1999 (recording date)."

The buttons 74 through 77 are each selected as needed for operation by the user. Selecting the Close button 74 terminates the title list screen 71 and replaces it with the library list screen 51 (FIG. 6); selecting the OK button 75 displays a title list submenu 81 (FIG. 10A or 10B); selecting the Tool button 76 displays a title list tool menu 271 (FIG. 31); and selecting the Back button 77 terminates the title list screen 71 and replaces it with the library list screen 51.

Figure 10A:
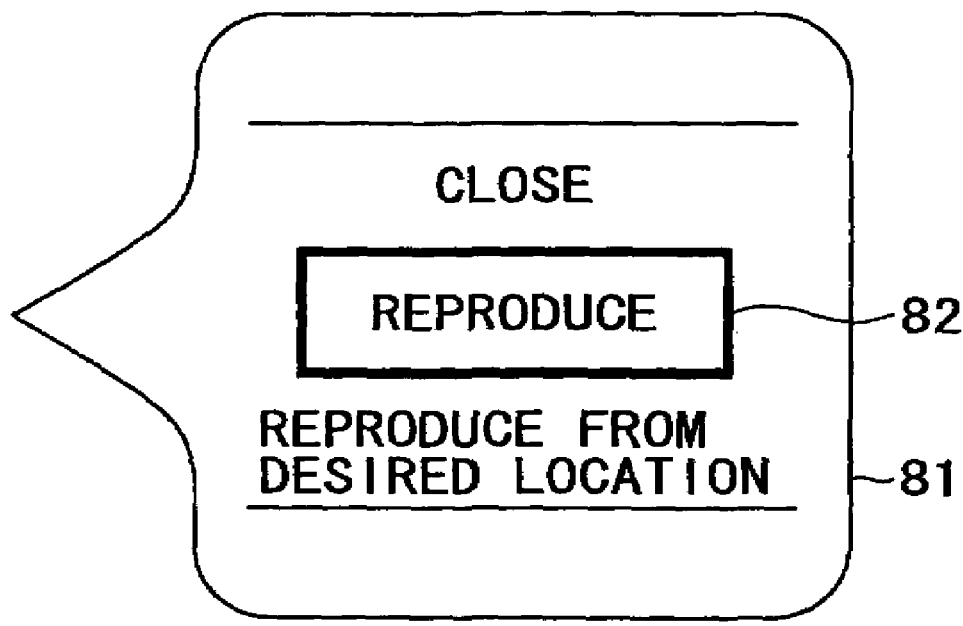
FIG. 10A is a schematic view of another typical submenu display of the title list.

Suppose that the user operating the input unit 11 selects a desired item (title information "26, Title A, Nov. 30, 1999" in this example) by use of the cursor 73 on the title list screen 71 and pushes the OK button 75. In that case, the information control unit 2, given the user's instruction, causes the display unit 9 to display the title list submenu 81 as shown in FIG. 10A. The submenu 81 includes such user-selectable items as "Close," "Reproduce," and "Reproduce from Desired Location."

Figure 10B:
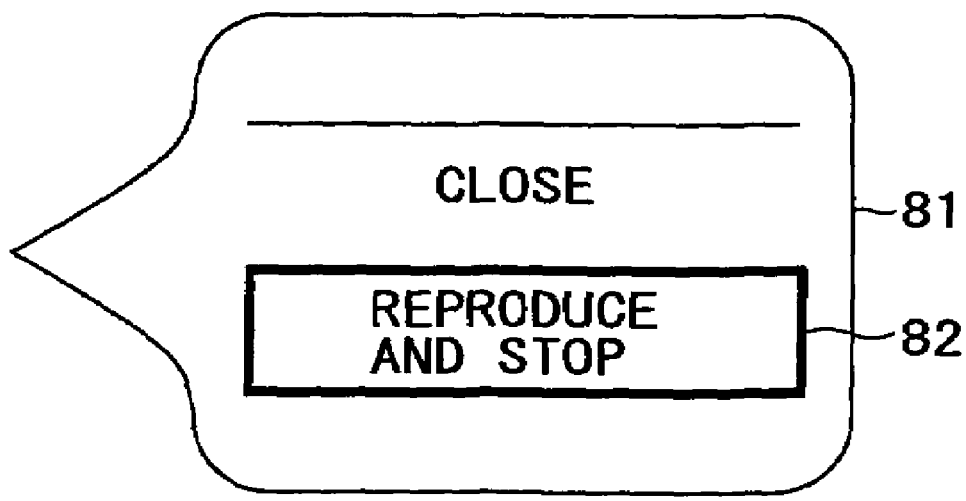
FIG. 10B is a schematic view of another typical submenu display of the title list.

If the content data corresponding to the title information selected by the cursor 73 are being reproduced at present, a title list submenu 81 such as one shown in FIG. 10B appears. This submenu 81 includes such user-selectable items as "Close" and "Reproduce and Stop."

Selecting the item "Reproduce" using a cursor 82 on the submenu 81 of FIG. 10A allows the user to request reproduction of the desired title. This operation permits the information control unit 2 to determine, in step S41 of FIG. 7, that reproduction of the specified title has been requested. The information control unit 2 then goes to step S42.

In step S42, the information control unit 2 determines whether or not any title (content data) not recorded on the loaded disc has been selected. If any title absent from the loaded disc is found to be selected, step S43 is reached. In step S43, the information control unit 2 sets the recording/reproduction unit 5 to automatic reproduction mode.

In step S44, the information control unit 2 causes the display unit 9 to display a message prompting the user to load the selected disc. Illustratively, a dialog screen 91 shown in FIG. 11 appears. The dialog screen 91 indicates a disc name 92 of the selected disc ("0134, *** Hamasaki" in this example) along with the message urging the user to load the disc.

Viewing the dialog screen 91, the user can easily search through the visibly indicated cartridge IDs of the discs 1 at hand for the cartridge ID ("0134" in this case) of the disc containing the title to be reproduced (content data).

Figure 11:
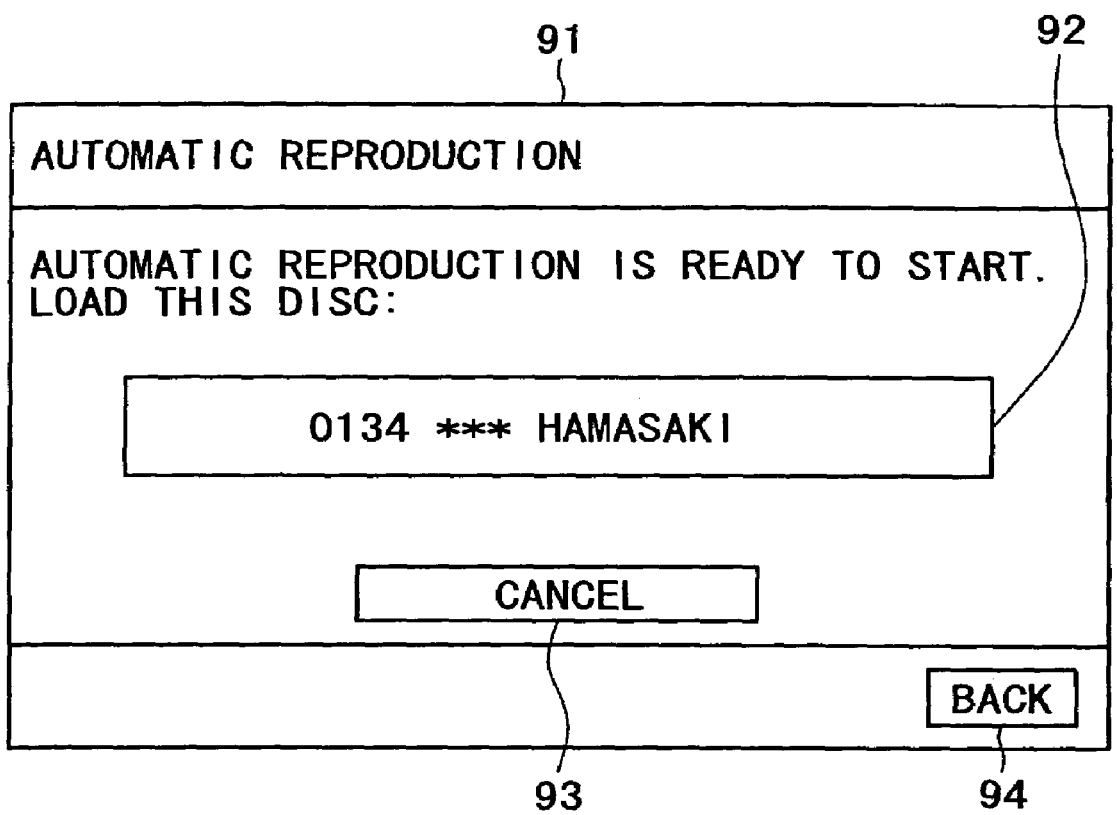
FIG. 11 is a schematic view of a typical dialog screen display.

The dialog screen 91 of FIG. 11 includes a Cancel button 93 and a Back button 94 which may be operated selectively by the user. Operating the Cancel button 93 cancels reproduction of the content data, and operating the Back button 94 calls up the library list screen 51 (FIG. 6) again.

Figure 7:
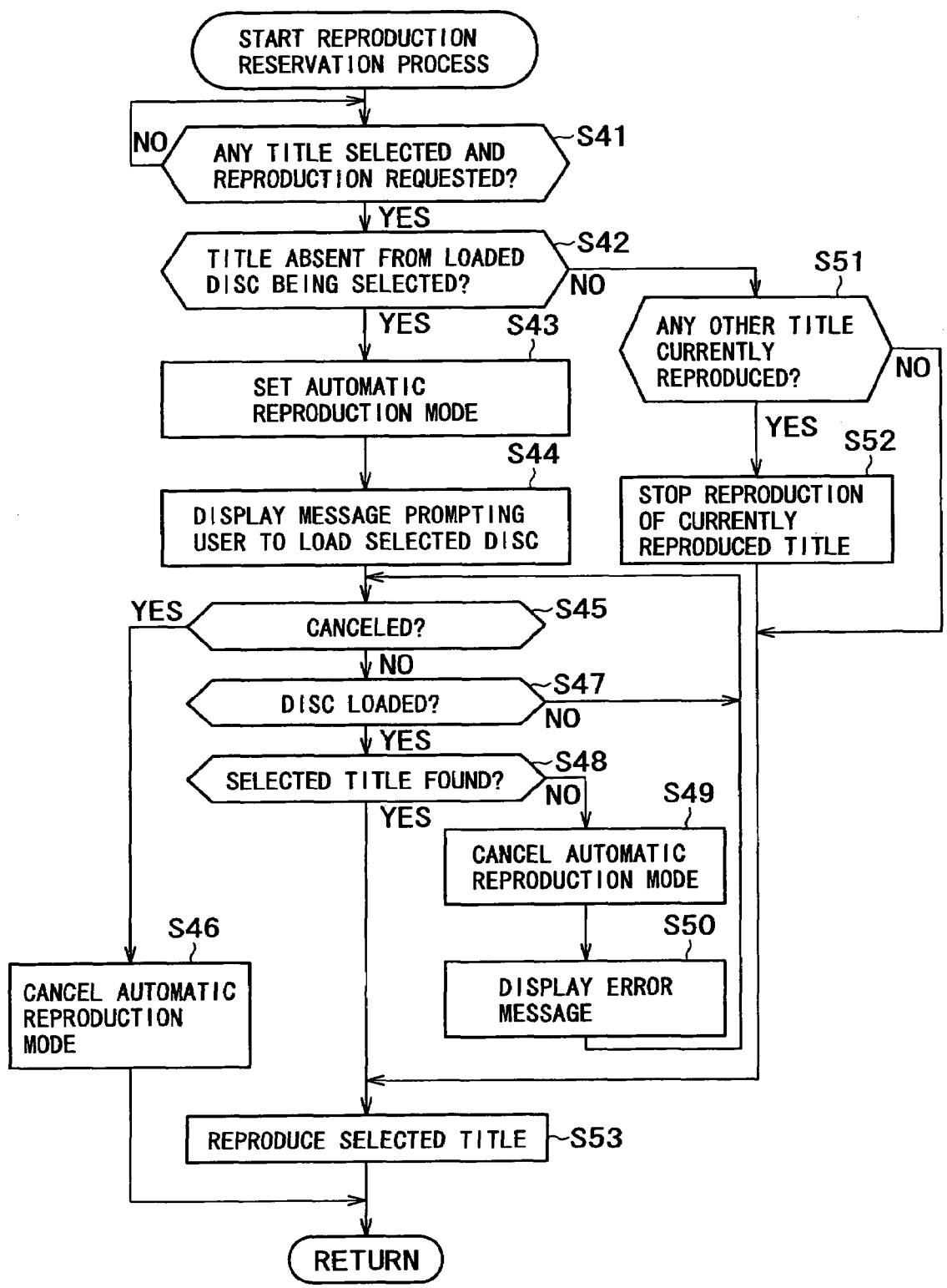
FIG. 7 is a flowchart of steps detailing a reproduction reservation process as an example of step S9 in FIG. 4.

Returning to step S45 in FIG. 7, the information control unit 2 determines whether or not the user has pushed the Cancel button 93 or the Back button 94. If the Cancel button 93 or the Back button 94 is found to be pushed, step S46 is reached. In step S46, the information control unit 2 cancels the automatic reproduction mode set for the recording/reproduction unit 5 in step S43.

If in step S45 neither the Cancel button 93 nor the Back button 94 is found selected, step S47 is reached. In step S47, the recording/reproduction unit 5 determines whether or not the selected disc (disc with the cartridge ID "0134" and the disc name "*** Hamasaki" in the example of FIG. 11) is loaded. If the selected disc is not found to be loaded, step S45 is reached again and the above-described process of the step is repeated.

If in step S47 the selected disc is found to be loaded, step S48 is reached. In step S48, the recording/reproduction unit 5 determines whether or not the loaded disc 1 carries the title (content data) selected in step S41. If the selected title is found recorded on the loaded disc 1, step S53 is reached.

Figure 12:
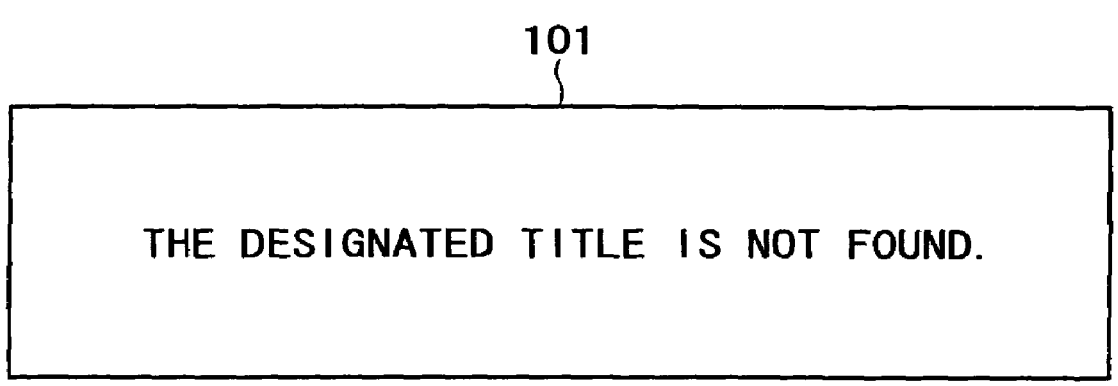
FIG. 12 is a schematic view of a typical error message screen display.

If in step S48 the loaded disc is not found to contain the selected title, then step S49 is reached. In step S49, the recording/reproduction unit 5 cancels the automatic reproduction mode set by the information control unit 2, and notifies the information control unit 2 that the selected title is not found on the loaded disc. In step S50, the information control unit 2 receives the notice from the recording/reproduction unit 5 and causes the display unit 9 to display an error message screen 101 as shown in FIG. 12.

The message informs the user that the designated title (content data) has been deleted from the disc 1.

After step S50, control is returned to step S45 and the subsequent steps are repeated as described above.

If in step S42 any title recorded on the loaded disc is found to be selected, step S51 is reached. In step S51, the information control unit 2 determines whether or not the recording/reproduction unit 5 is currently reproducing any other title. If no other title is found being reproduced, then step S53 is reached. If some other title is found being reproduced in step S51, then the information control unit 2 goes to step S52 and causes the recording/reproduction unit 5 to stop the ongoing reproduction of that title.

In step S53, the recording/reproduction unit 5 under control of the information control unit 2 reproduces the title selected by the user. Specifically, the recording/reproduction unit 5 starts reproducing the content data corresponding to the title information ("26, Title A, Nov. 30, 1999" in this example) selected on the title list screen 71 shown in FIG. 9.

As described, when loaded with the disc 1, the disc information may be displayed in list form so that the user may specify a desired title out of the listed titles in simple operations. If the user designates any title to be found on an unloaded disc, the relevant cartridge ID is indicated to prompt the user to load the selected disc. In turn, the user can readily search through the visibly indicated cartridge IDs of the discs at hand for the cartridge ID identifying the disc containing the title to be reproduced.

Figure 13:
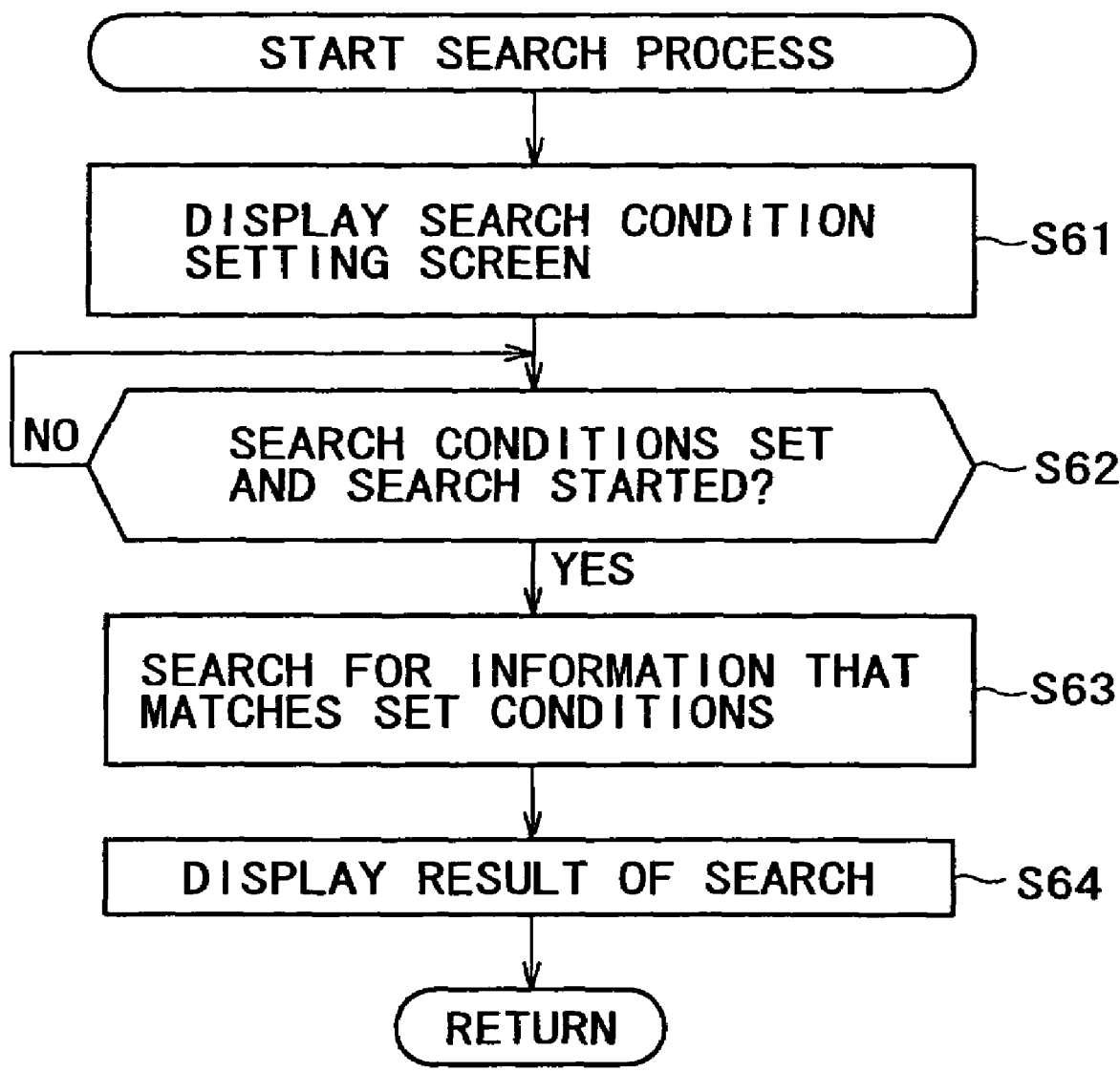
FIG. 13 is a flowchart of steps detailing a search process as another example of step S9 in FIG. 4.

Described below with reference to the flowchart of FIG. 13 are steps detailing a search process as another example of step S9 in FIG. 4.

Figure 14:
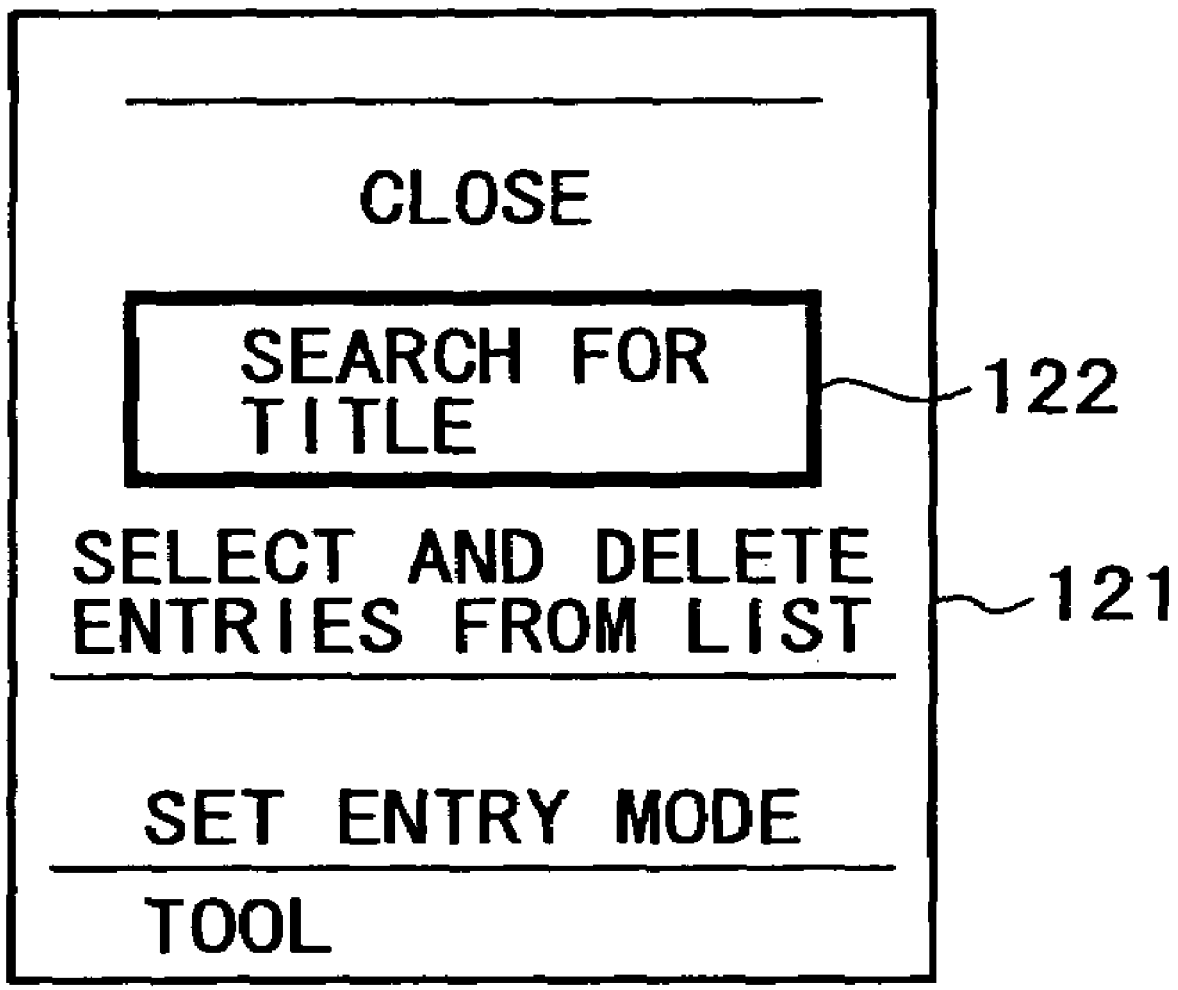
FIG. 14 is a schematic view of a typical tool display of the library list.

Suppose that the user operating the input unit 11 has pushed the Tool button 57 on the library list screen 51 in FIG. 6. In that case, the information control unit 2, given the user's instruction, causes a library list tool menu 121 as shown in FIG. 14. The tool menu 121 includes such user-selectable items as "Close," "Search for Title," "Select and Delete Entries from List," and "Set Entry Mode."

Figure 15:
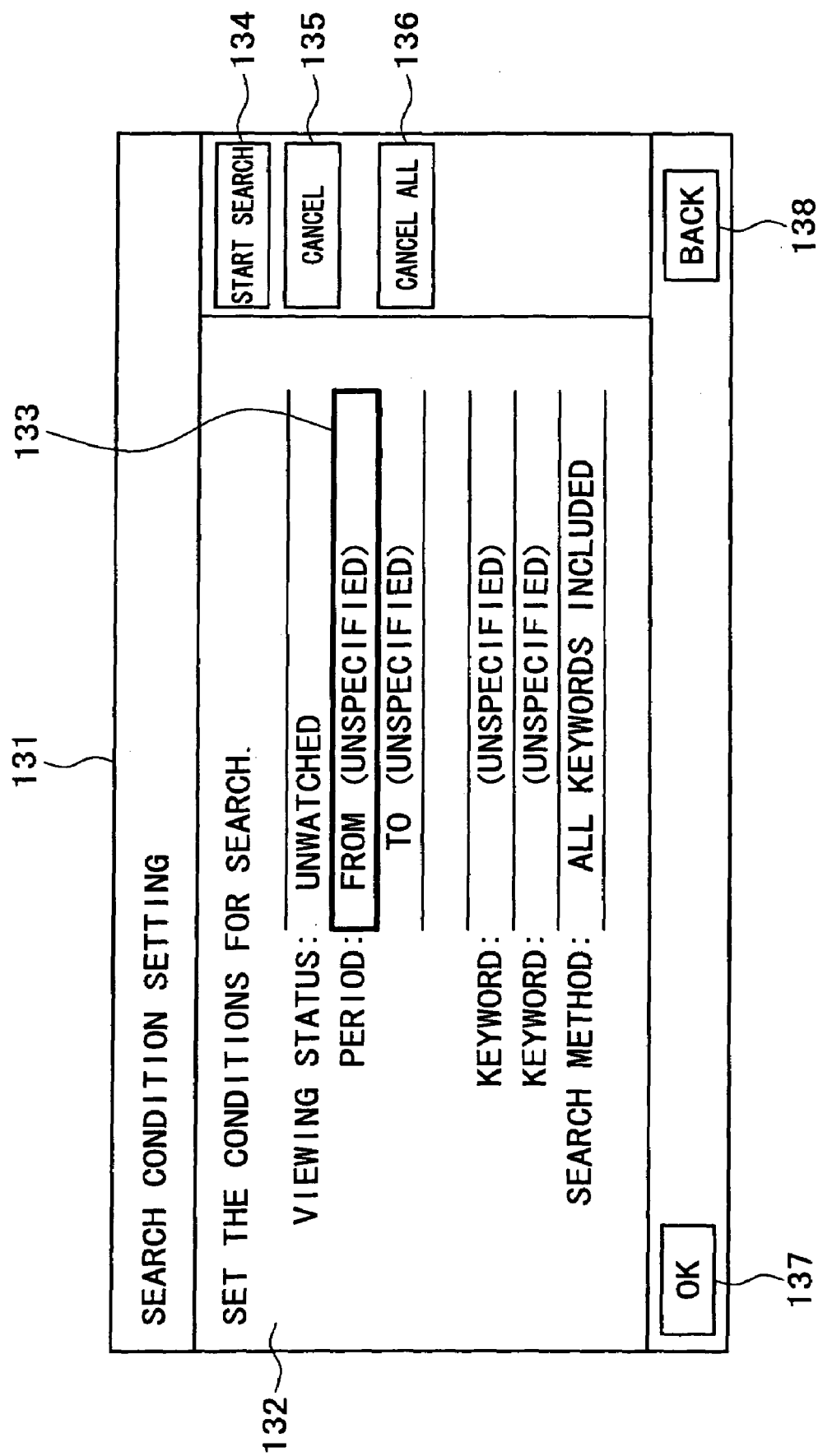
FIG. 15 is a schematic view of a typical search condition setting screen display.

It is assumed here that the user selects the item "Search for Title" using the cursor 122 on the tool menu 121 in FIG. 14. The information control unit 2 then goes to step S61 of FIG. 13, and causes the display unit 9 to display a search condition setting screen 131 as shown in FIG. 15 based on the user's instruction. The search condition setting screen 131 includes a search condition setting area 132, a cursor 133, a Start Search button 134, a Cancel button 135, a Cancel All button 136, an OK button 137, and a Back button 138.

The search condition setting area 132 includes items "Viewing Status," "Period," "Keyword," and "Search Method," any of which may be set as desired by the user. The buttons 134 through 138 may be operated selectively by the user. Operating the Start Search button 134 starts a search under currently set search conditions; operating the Cancel button 135 cancels the search; operating the Cancel All button 136 cancels all search conditions that may have been established; operating the OK button 137 permits setting of the item selected by the cursor 133; and operating the Back button 138 terminates the search condition setting screen 131 and replaces it with the library list screen 51 (FIG. 6).

Figure 16:
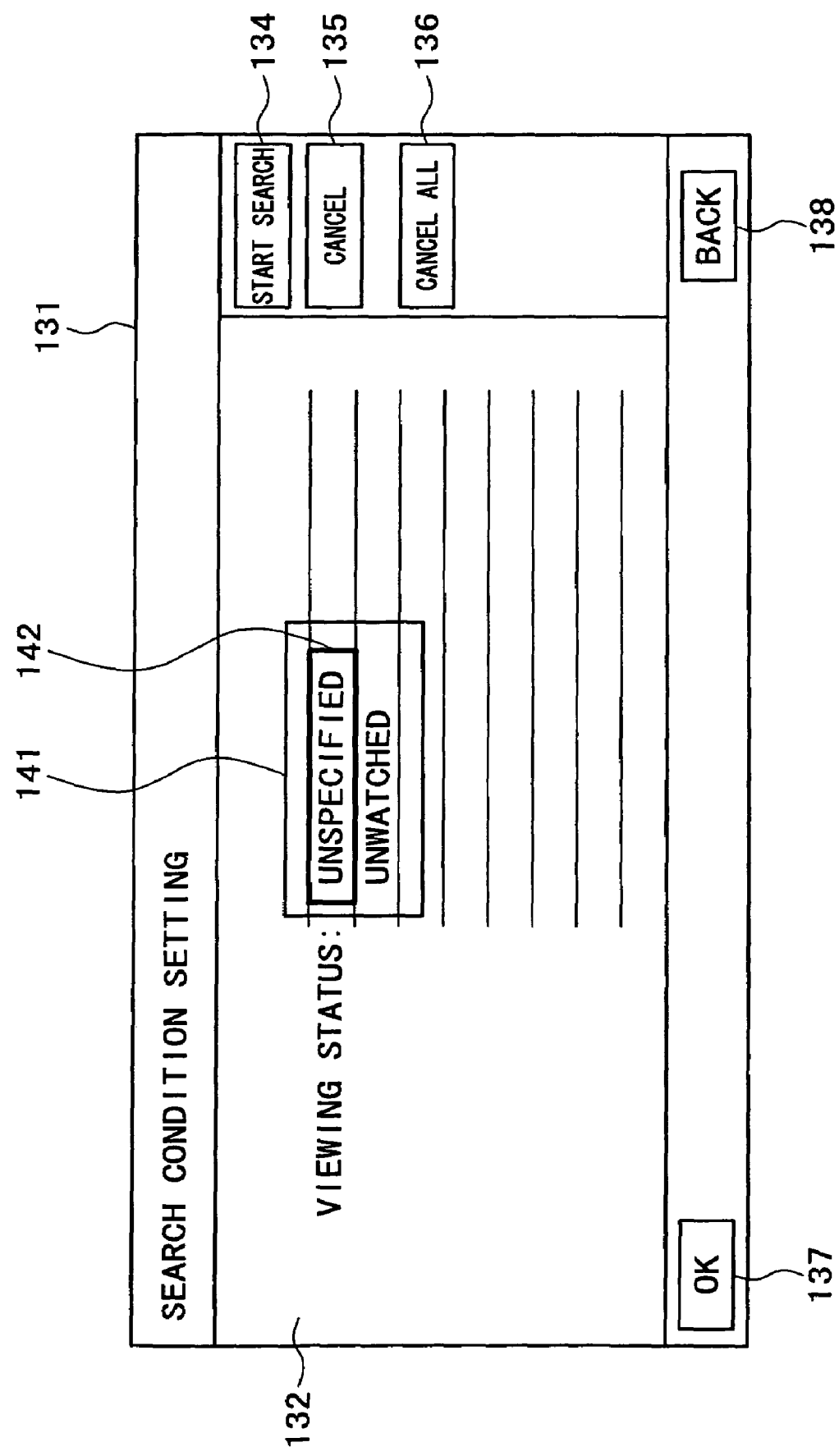
FIG. 16 is a schematic view of another typical search condition setting screen display.

Illustratively, if the user selects the item "Viewing Status" using the cursor 133 on the search condition setting screen 131 in FIG. 15 and pushes the OK button 137, the information control unit 2 causes a pull-down menu 141 such as one shown in FIG. 16 to appear in accordance with the user's instruction. This pull-down menu 141 has items "Unspecified" and "Unwatched," any of which may be selected by use of a cursor 142.

Figure 17:
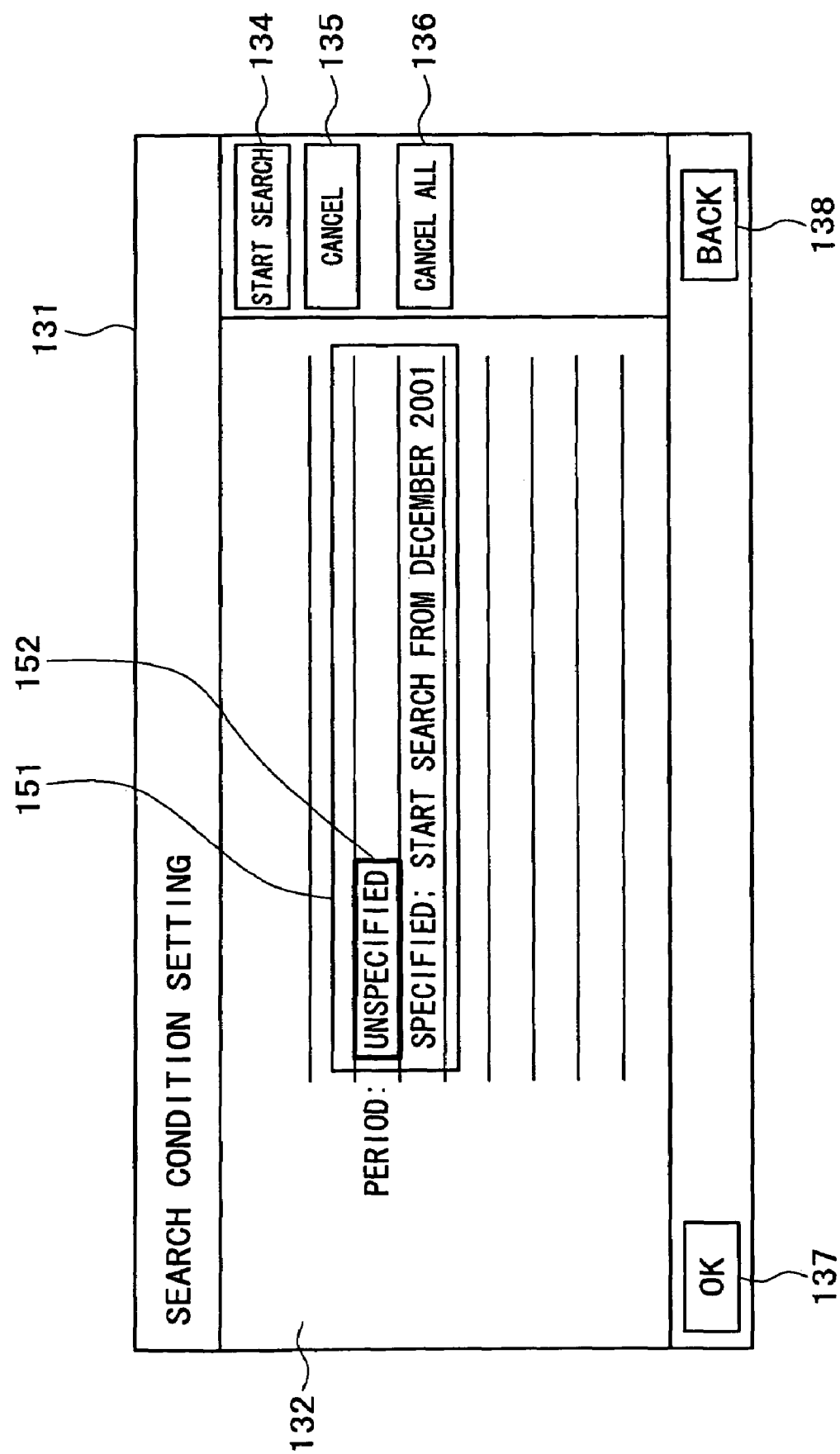
FIG. 17 is a schematic view of another typical search condition setting screen display.

If the user selects the item "Period" using the cursor 133 on the search condition setting screen 131 in FIG. 15 and pushes the OK button 137, the information control unit 2 causes a pull-down menu 151 such as one shown in FIG. 17 to appear in accordance with the user's instruction. This pull-down menu 151 has items "Unspecified" and "Specified," any of which may be selected by use of a cursor 152.

Figure 18:
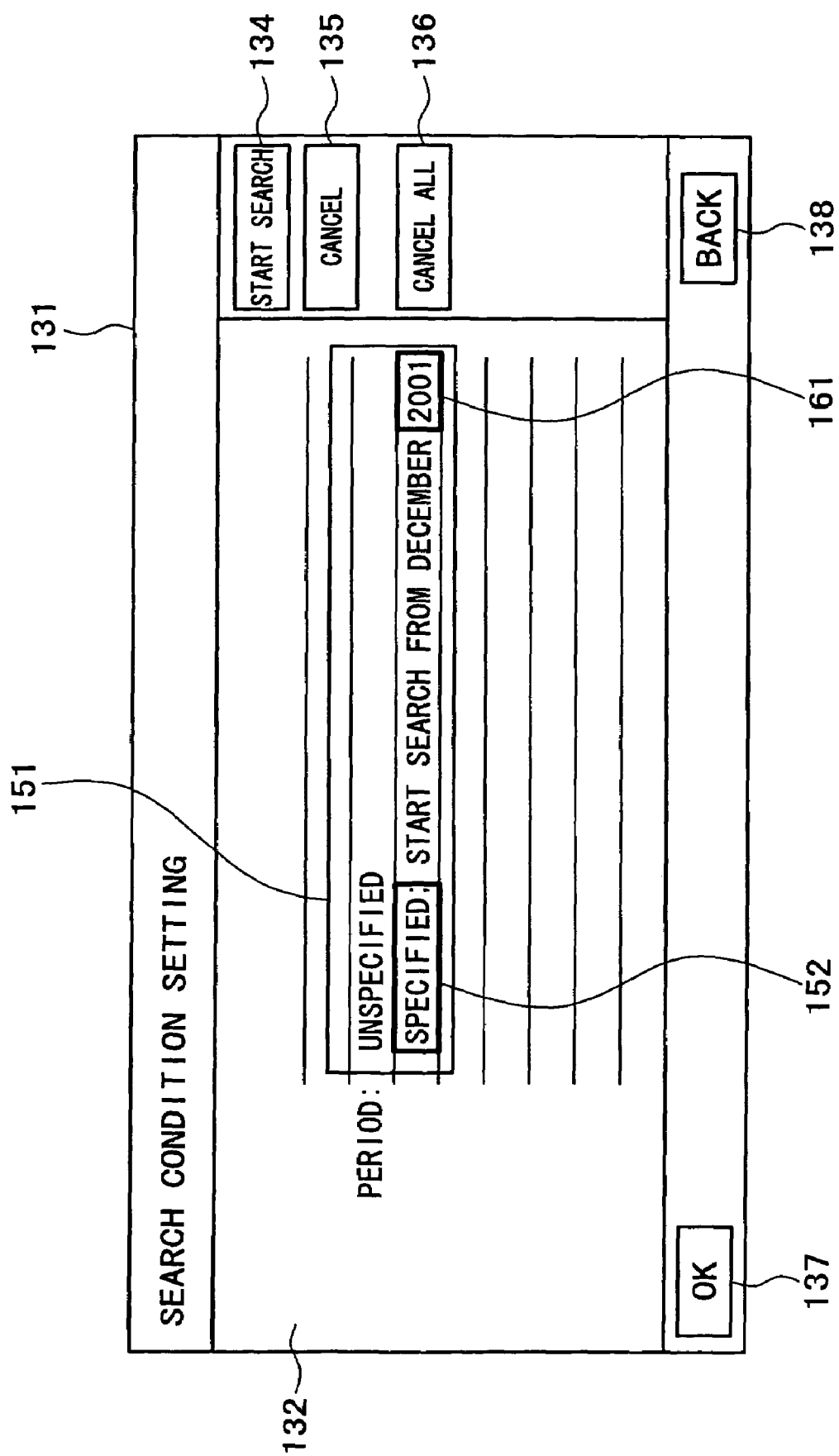
FIG. 18 is a schematic view of another typical search condition setting screen display.

Suppose that, with the pull-down menu 151 being displayed, the user selects the item "Specified" by use of the cursor 152 as shown in FIG. 18. In that case, an input area 161 is set on active display so that the user may input a month and a year into the area.

Returning to step S62 of FIG. 13, the information control unit 2 determines whether or not the user has set search conditions and started the search. That is, the information control unit 2 determines whether or not the items in the search condition setting area 132 of the search condition setting screen 131 have any search conditions set therein by the user before the Start Search button 134 is pushed. The information control unit 2 waits for any search condition to be set and for the search to be started.

If in step S62 the information control unit 2 determines that search conditions have been set and that the start of search has been designated, then step S63 is reached. In step S63, the information control unit 2 causes the search unit 3 to search for the information that matches the search conditions established by the user. The search unit 3 under control of the information control unit 2 causes the current disc information management unit 6 and storage information management unit 7 to search for the information specified by the user and to send the result of the search to the information control unit 2.

Figure 19:
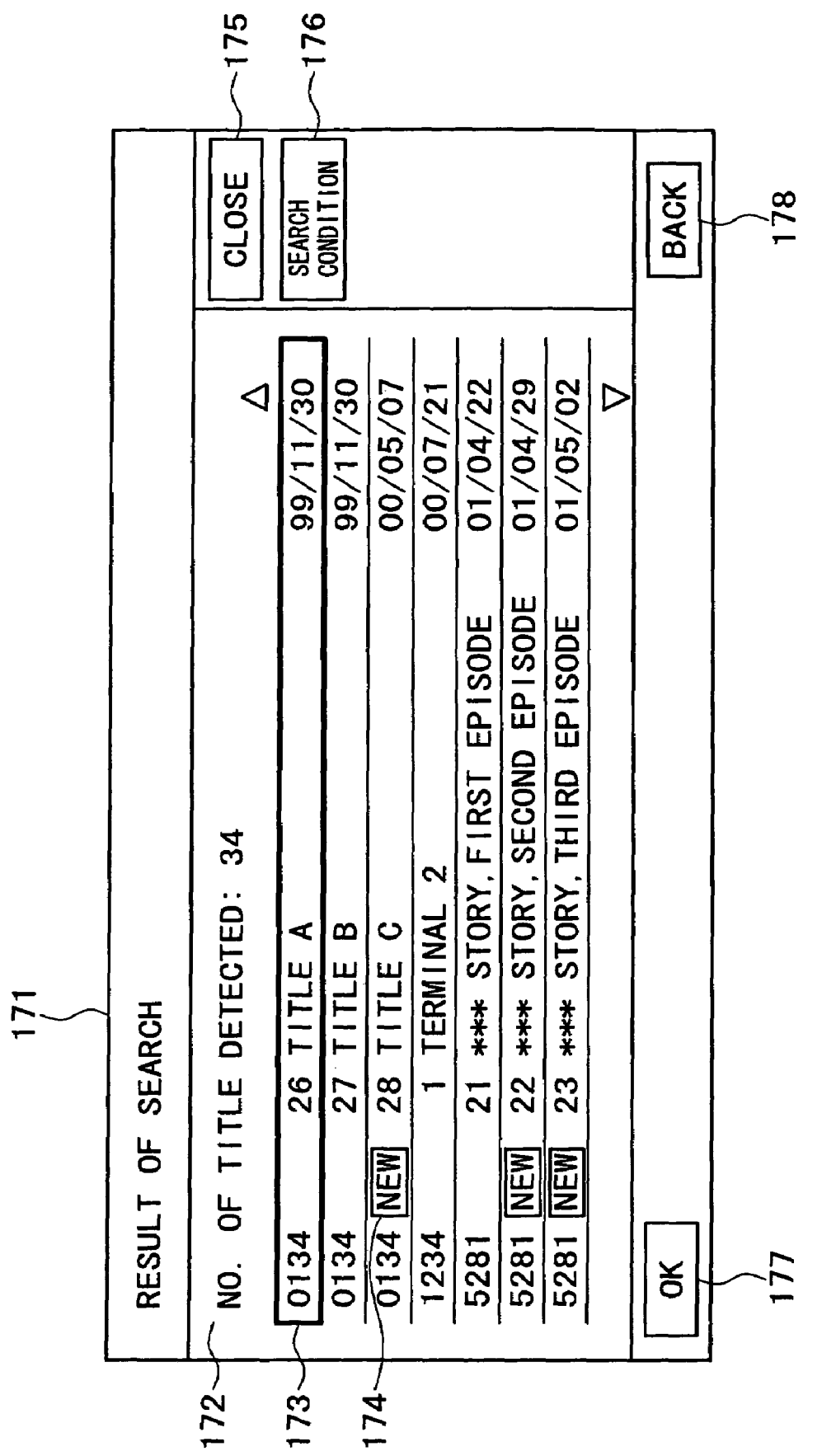
FIG. 19 is a schematic view of a typical search result screen display.

In step S64, the information control unit 2 causes the display unit 9 to display a search result screen 171 as shown in FIG. 19 on the basis of the search result supplied from the search unit 3. The search result screen 171 includes a search result display area 172, a cursor 173, an unwatched mark 174, a Close button 175, a Search Condition button 176, an OK button 177, and a Back button 178.

The search result display area 172 gives the number of titles detected, along with a list of cartridge IDs, title numbers, title names, and recording dates derived from the search result acquired from the search unit 3. The cursor 173 is shown highlighting the search result "0134, 26, Title A, Nov. 30, 1999" in the displayed list. The unwatched mark 174 indicates that the content data to which the mark is attached have yet to be watched.

The buttons 175 through 178 are each operated selectively by the user. Operating the Close button 175 terminates the search result screen 171 and replaces it with the library list screen 51 (FIG. 6) again; operating the Search Condition button 176 causes a search setting confirmation screen 191 (FIG. 20) to appear; operating the OK button 177 displays the title list submenu 81 (FIG. 10A or 10B); and operating the Back button 178 terminates the search result screen 171 and replaces it with the library list screen 51 again.

As described, the user can easily search for the title information that matches the desired conditions. The unwatched mark 174 attached to the title information yet to be watched helps the user verify a viewing history of the titles with ease.

Illustratively, if the user pushes the Search Condition button 176 on the search condition screen 171, the information control unit 2 causes the display unit 9 to display the search setting confirmation screen 191 as shown in FIG. 20 in accordance with the user's instruction. The search setting confirmation screen 191 includes a search condition display area 192 indicating the search conditions being set, and a Close button 193. The search condition display area 192 shows such search conditions as viewing status, a period, keywords, and a search method. The Back button 193 is operated selectively by the user wishing to return to the search result screen 171 (FIG. 19).

The search setting confirmation screen 191 thus allows the user to reconfirm the search conditions that have been set, even after the search is completed.

Figure 21:
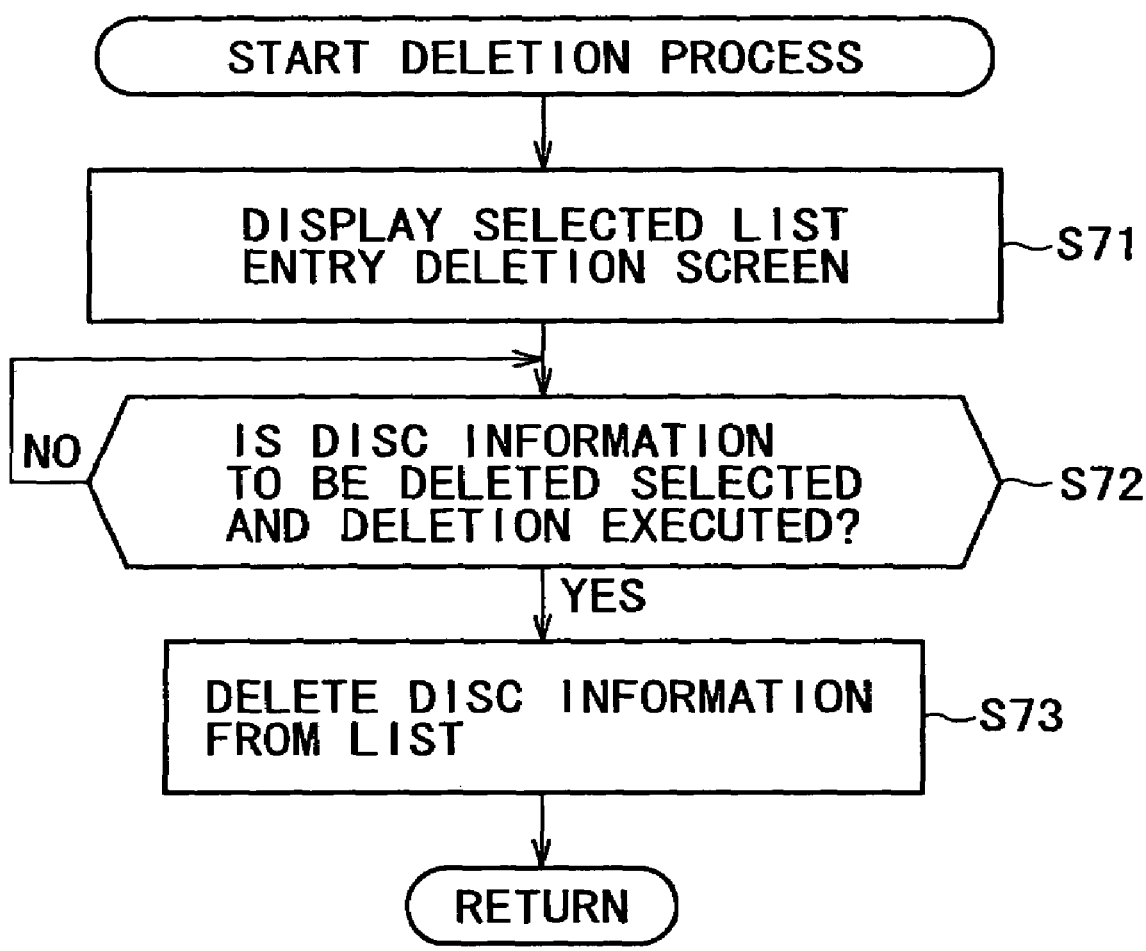
FIG. 21 is a flowchart of steps detailing a deletion process as another example of step S9 in FIG. 4.

Described below with reference to the flowchart of FIG. 21 are steps detailing a deletion process as another example of step S9 in FIG. 4.

Suppose that the user selects the item "Select and Delete Entries from List" using the cursor 122 on the tool menu 121 shown in FIG. 14. In step S71, the information control unit 2, given the user's instruction, outputs to the display unit 9 the current information acquired from the current disc information management unit 6 and the disc information obtained from the storage information management unit 7. The display unit 9 displays the received information in the form of a selected list entry deletion screen.

FIG. 22 depicts a display example of the selected list entry deletion screen 201. This screen 201 includes a deletion setting area 202, a cursor 203, check boxes 204, a Finalize button 205, a Cancel button 206, a View-Entries-for-Deletion button 207, a Select All button 208, a Cancel Selection button 209, an OK button 210, and a Back button 211.

The deletion setting area 202 gives a list of cartridge IDs, disc names, and remaining disc capacities derived from the disc information acquired from the current disc information management unit 6 and from the storage information management unit 7. The cursor 203 is shown highlighting the disc information "0104, *** Special 1, 0.2 GB" in the displayed list.

The buttons 205 through 211 are each operated selectively by the user. Operating the Finalize button 205 finalizes the disc information to be deleted; operating the Cancel button 206 terminates the selected list entry deletion screen 201 and replaces it with the library list 51 (FIG. 6); operating the View-Entries-for-Deletion button 207 displays a list of disc information to be deleted; operating the Select All button 208 selects all disc information for deletion; operating the Cancel Selection button 209 cancels the selection being made; operating the OK button 210 selects the disc information to be deleted; and operating the Back button 211 terminates the selected list entry deletion screen 201 and replaces it with the library list 51 again.

If the user selects a particular item using the cursor 203 in the displayed list on the selected list entry deletion screen 201 and pushes the OK button 210, the information control unit 2 checks the check box 204 of the selected item in accordance with the user's instruction. If the user pushes the View-Entries-for-Deletion button 207, the information control unit 2, given the user's instruction, causes the display unit 9 to display only the disc information whose check boxes are being checked at that point. The selected list entry deletion screen 201 is switched to a display shown in FIG. 23, the new display giving a list of the selected disc information only. On this selected list entry deletion screen 201, a Display All button 212 is shown substituting for the View-Entries-for-Deletion button 207 (FIG. 22). The button 212 may be operated selectively by the user wishing to return to the selected list entry deletion screen 201 of FIG. 22.

Figure 23:
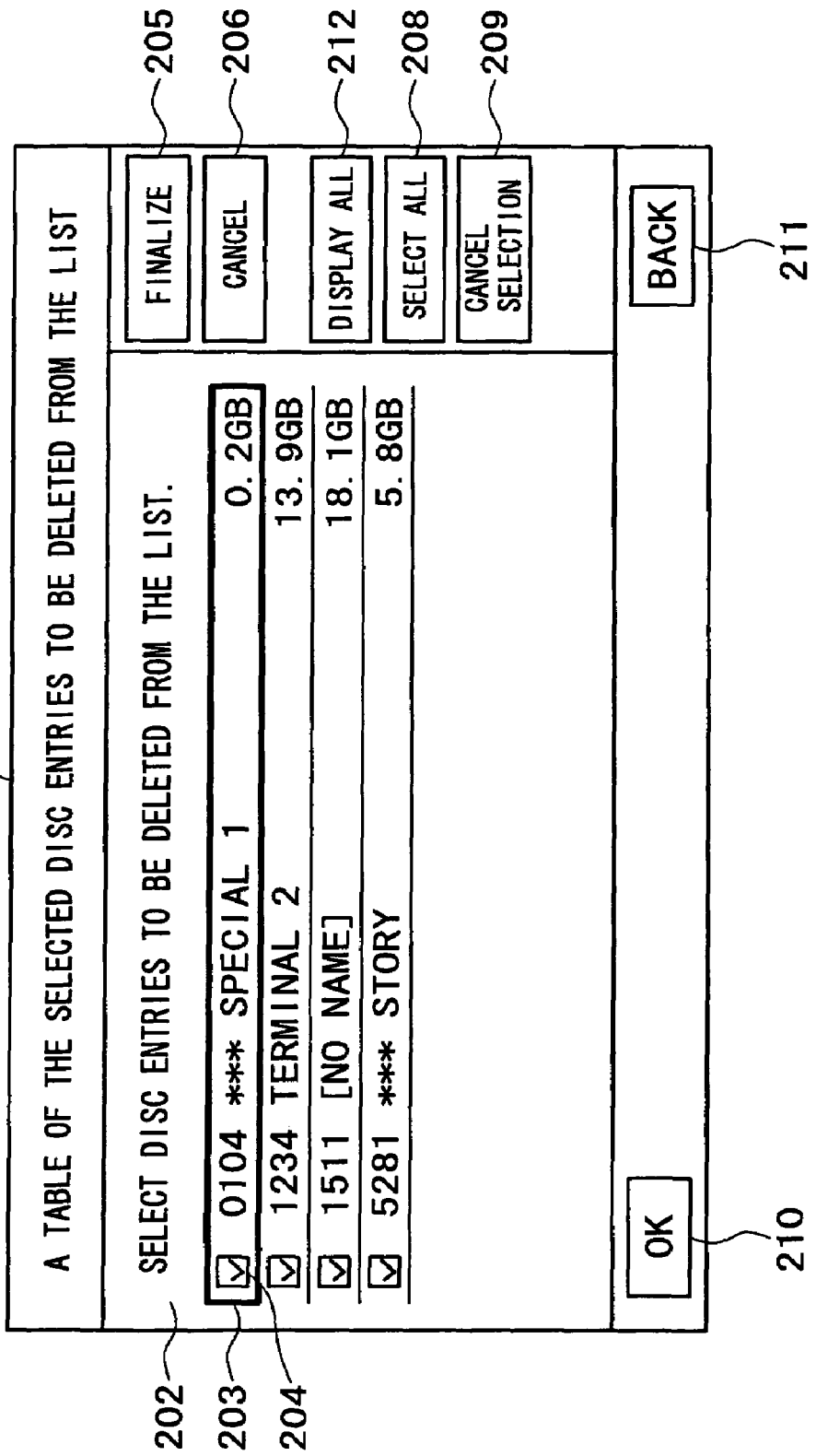
FIG. 23 is a schematic view depicting another typical screen display for deleting selected entries from the list.
Figure 24:
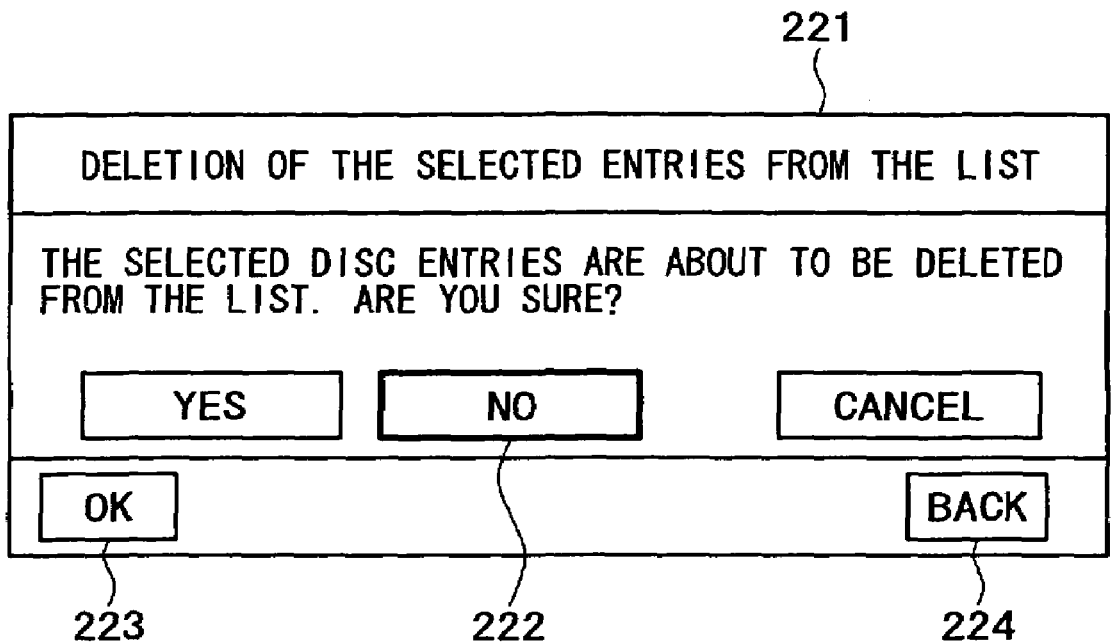
FIG. 24 is a schematic view illustrating a typical dialog screen display for deleting selected entries from the list.

When the user pushes the Finalize button 205 on the selected list entry deletion screen 201 of FIG. 22 or 23, the information control unit 2, given the user's instruction, causes the display unit 9 to display a dialog screen 221 for deleting selected entries from the list as shown in FIG. 24.

The dialog screen 221 of FIG. 24 displays a message asking the user to confirm his or her intention to delete the selected disc information from the list. Also displayed are items "Yes," "No" and "Cancel," as well as an OK button 223 and a Back button 224. Any one of these items may be selected by the user. Selecting the item "Yes" deletes the selected disc information; selecting the item "No" leaves the disc information undeleted; and selecting the item "Cancel" terminates the dialog screen 221 and replaces it with the library list screen 51 (FIG. 6). (In the example of FIG. 24, the item "No" is being selected by the cursor 222.). The buttons 223 and 224 are each operated as needed by the user. Operating the OK button 223 decides on the selected items, and operating the Back button 224 terminates the dialog screen 221 and replaces it with the library list screen 51 again.

Figure 25:
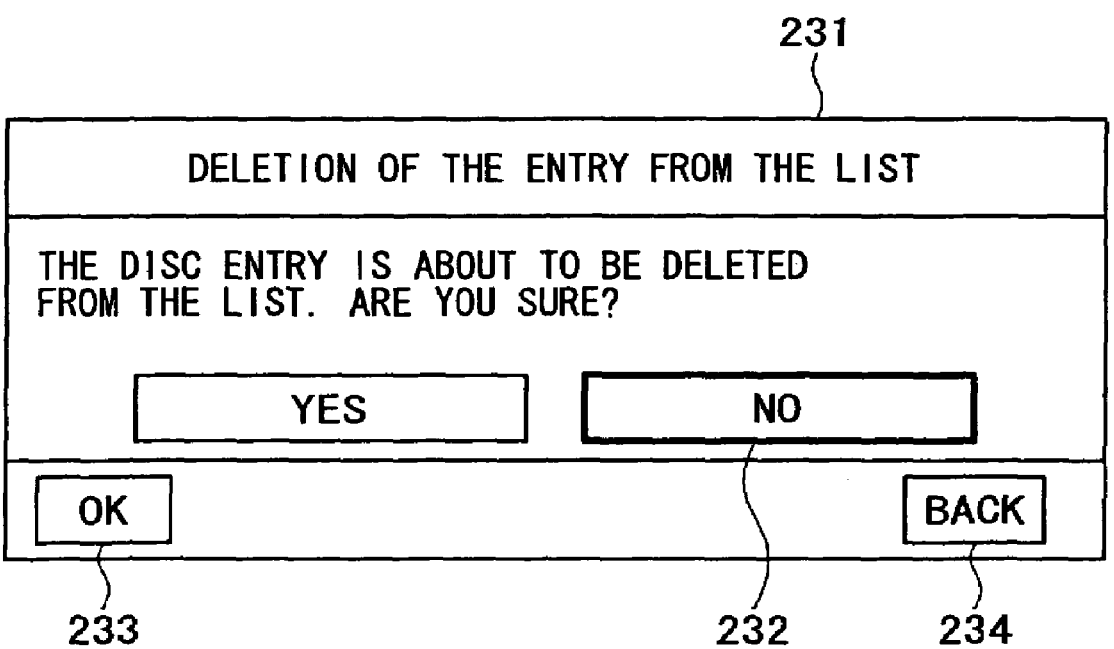
FIG. 25 is a schematic view indicating a typical dialog screen display for deleting an entry from the list.

If the user selects the item "Delete Entries from List" on the submenu 61 of FIG. 8A using the cursor 62, the information control unit 2 in step S71 of FIG. 21 causes the display unit 9 to display a dialog screen 231 for deleting entries from the list as shown in FIG. 25 in accordance with the user's instruction.

The dialog screen 231 of FIG. 25 gives a message asking the user to confirm his or her intention to delete the oldest disc information from the list. Also displayed are items "Yes" and "No," as well as an OK button 233 and a Back button 234. One of the items may be selected by the user operating a cursor 232. Selecting the item "Yes" deletes the-oldest disc information, and selecting the item "No" leaves the disc information undeleted. (In the example of FIG. 25, the item "No" is being selected by the cursor 232.) The buttons 233 and 234 are each operated selectively by the user. Operating the OK button 223 decides on the item being selected by the cursor 232, and operating the Back button 234 terminates the dialog screen 231 and replaces it with the library list screen 51 (FIG. 6).

In step S72 of FIG. 21, the information control unit 2 determines whether or not the disc information to be deleted was selected by the user and has been deleted. More specifically, the information control unit 2 determines whether or not the user checked the check boxes 204 of the disc information to be deleted out of the disc information displayed in the deletion setting area 202 of the selected list entry deletion screen 201 (FIG. 22), before pushing the Finalize button 205; or whether or not the user operating the cursor 232 selected the item "Yes" on the dialog screen 231 (FIG. 25) for entry deletion from the list, before pushing the OK button 233. The information control unit 2 waits for the target disc information to be selected and for its execution to be designated.

If in step S72 the disc information to be deleted is found to be selected and the deletion of the selected information finalized, then step S73 is reached. In step S73, the information control unit 2 causes the storage information management unit 7 to delete the disc information selected by the user. The storage information management unit 7 under control of the information control unit 2 deletes the user-selected disc information from the storage unit 8.

As described, the entries of disc information is displayed in list form so that the user may delete the unnecessary disc information specified in simple operations.

Figure 26:
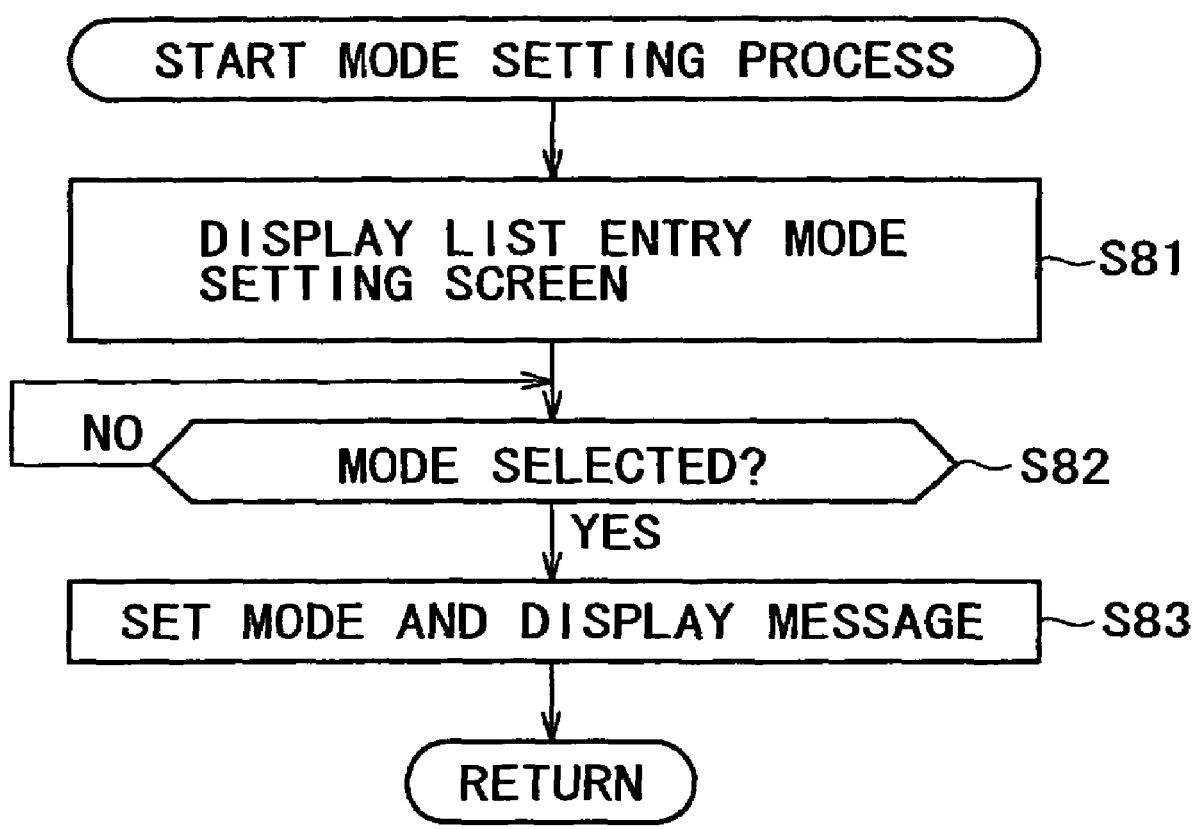
FIG. 26 is a flowchart of steps detailing a mode setting process as another example of step S9 in FIG. 4.

Described below with reference to the flowchart of FIG. 26 are steps detailing a mode setting process as another example of step S9 in FIG. 4.

Suppose that the user has selected the item "Set Entry Mode" by operating the cursor 122 on the tool menu 121 in the library list of FIG. 14. In that case, the information control unit 2 in step S81 of FIG. 26 causes the display unit 9 to display a dialog screen 241 for setting list entry mode as shown in FIG. 27 in accordance with the user's instruction.

Figure 27:
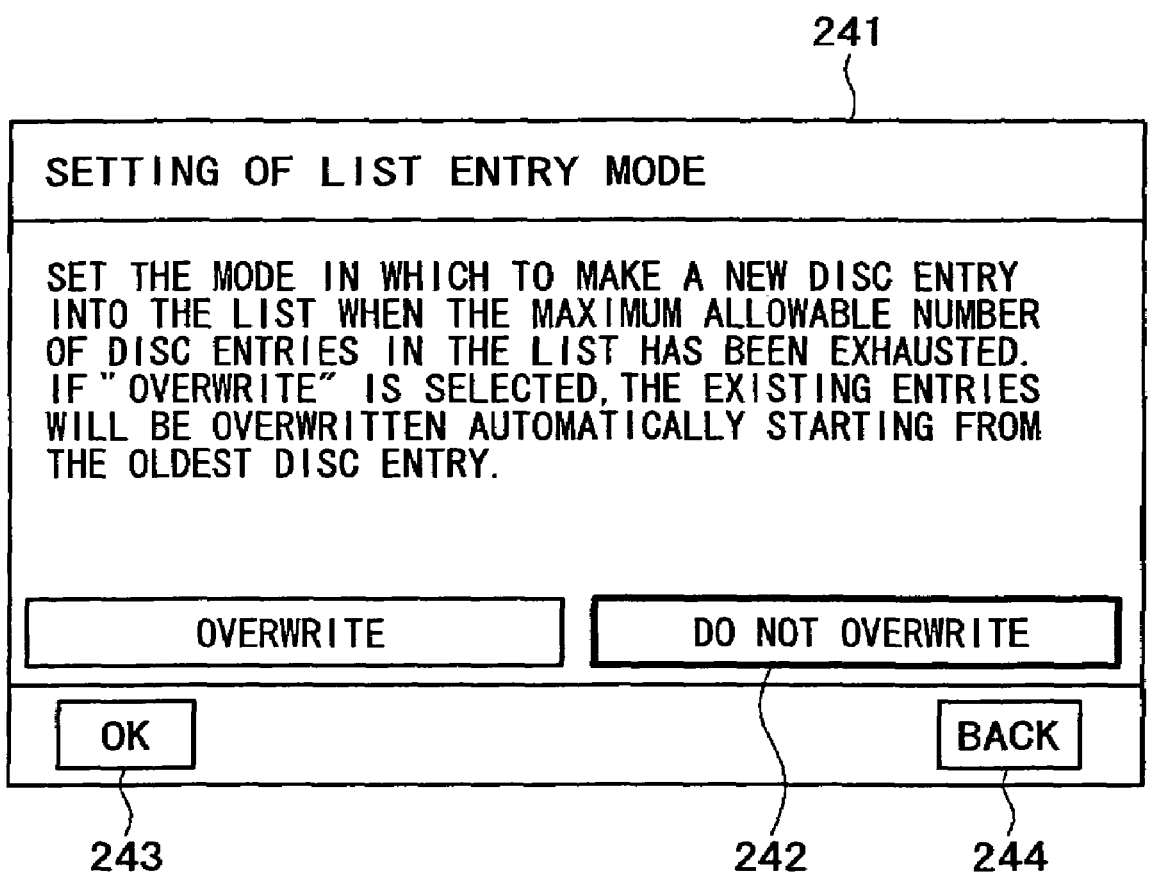
FIG. 27 is a schematic view of a typical dialog screen display for setting list entry mode.

The dialog screen 241 of FIG. 27 includes a message prompting the user to set the mode in which to make a new disc entry into the list when the maximum allowable number of disc entries in the list has been exhausted. Also included in the dialog screen 241 are items "Overwrite" and "Do Not Overwrite," as well as an OK button 243 and a Back button 244. Either of the two items is selected by the user positioning a cursor 242 to the desired item. Selecting the item "Overwrite" causes the existing disc information to be overwritten starting from the oldest entry, and selecting the item "Do Not Overwrite" cancels the overwrite operation. (In the example of FIG. 27, the item "Do Not Overwrite" is being selected by the cursor 242.) The buttons 243 and 244 are each operated selectively by the user. Operating the OK button 243 decides on the item being selected by the cursor 242, and operating the Back button 244 terminates the dialog screen 241 and replaces it with the library list screen 51 (FIG. 6) again.

In step S82, the information control unit 2 determines whether or not the user has selected the entry mode, i.e., whether or not the user has selected the item "Overwrite" or "Do Not Overwrite" using the cursor 242 on the dialog screen 241 for list entry mode setting, before pushing the OK button 243. The information control unit 2 waits for the mode to be selected.

If in step S82 the mode is found to be selected, step S83 is reached. In step S83, the information control unit 2 causes the storage information management unit 7 to establish the user-selected mode and displays a setting-complete message on the display unit 9.

For example, if the user selected the item "Overwrite" using the cursor 242 and has pushed the OK button 243, the information control unit 2, given the user's instruction, causes the display unit 9 to display a message screen 251 as shown in FIG. 28A. The message screen 251 informs the user that when the maximum allowable number of disc entries in the list is exhausted, the existing information will be overwritten with new disc entries.

If the user selected the item "Do Not Overwrite" using the cursor 242 and has pushed the OK button 243, the information control unit 2, given the user's instruction, causes the display unit 9 to display a message screen 252 as depicted in FIG. 28B. The message, screen 252 informs the user that even if the maximum allowable number of disc entries in the list is exhausted, the existing information will not be overwritten with new disc entries.

Where the "Do Not Overwrite" mode is in effect, the existing information will not be overwritten automatically even if the list is exhausted. In that case, the information control unit 2 causes the display unit 9 to display a message screen 261 shown in FIG. 29 telling the user that the capacity of the storage unit 8 has now been exhausted. With no more disc entries admitted into the list, the user is urged to delete unnecessary disc information.

Returning to FIG. 4, either step S9 or the negative result of the check in step S8 is followed by step S10. In step S10, the information control unit 2 determines whether or not a request is made to unload the disc 1. If no request is found to be made for unloading the disc 1, step S13 is reached. If a request is found to be made for unloading the disc 1, step S11 is reached. In step S11, the information control unit 2 causes the current disc information management unit 6 to read the current information from the loaded disc 1. That is, the information control unit 2 acquires the latest information in step S11 considering that the information on the disc 1 has been updated following recording or editing operations.

In step S12, the information control unit 2 causes the storage information management unit 7 to perform a duplicate storage process based on the current information acquired from the current disc information management unit 6.

Figure 30:
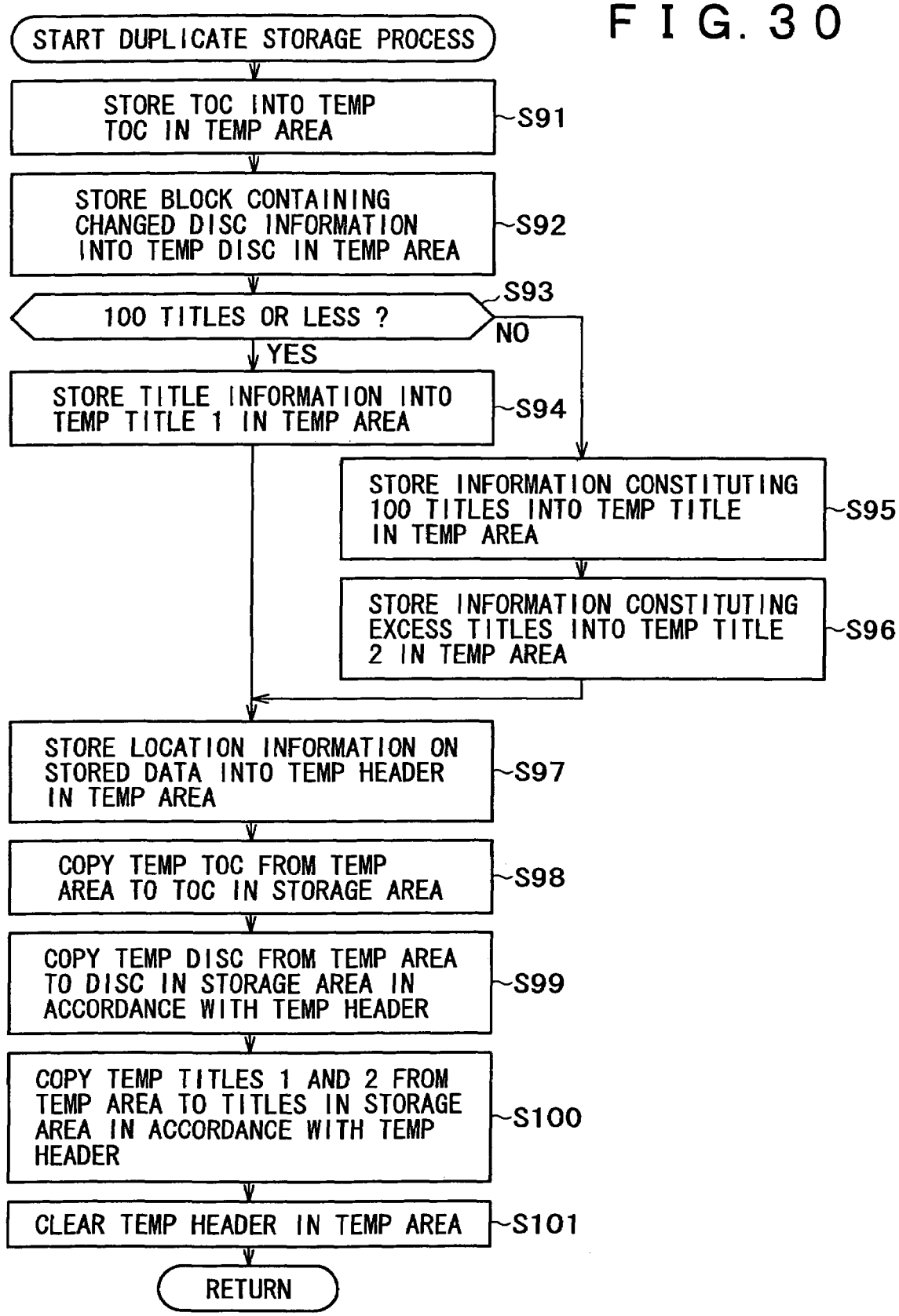
FIG. 30 is a flowchart of steps detailing a duplicate storage process in step S12 of FIG. 4.

Details of the duplicate storage process will now be described with reference to the flowchart of FIG. 30.

In step S91, the storage information management unit 7 stores the TOC, part of the acquired current information, into the temp TOC (block 104) of the temp area in the storage unit 8. In step S92, the storage information management unit 7 stores the block that contains changed disc information into the temp disc block (block 105) of the temp area. As mentioned above, the disc information is found in either the block 1 or the block 2 of the storage area; the information is read from one of the blocks and stored into the temp disc block.

In step S93, the storage information management unit 7 determines whether or not the number of titles included in the changed disc information is 100 or less. If the number of titles is found to be 100 or less, step S94 is reached. In step S94, the storage information management unit 7 stores the title information into the temp title 1 (block 106) of the temp area.

If in step S93 the number of titles included in the changed disc information is not found to be 100 or less, i.e., if the title count is 101 or higher, then step S95 is reached. In step S95, the storage information management unit 7 stores the title information constituting 100 titles into the temp title 1 of the temp area. Step S95 is followed by step S96 in which the title information constituting the excess titles (from the 101st title on) is stored into the temp title 2 (block 107).

Step S94 or step S96 is followed by step S97 in which the storage information management unit 7 stores location information on the stored data into the temp header (block 103) of the temp area. In step S98, The storage information management unit 7 reads the TOC from the temp TOC (block 104) in the temp area and writes the retrieved TOC to the TOC (block 0) in the storage area. (That is, the temp TOC is copied from the temp area to the TOC of the storage area.)

In step S99, the storage information management unit 7, based on the data location information held in the temp header, copies the temp disc block (block 105) in the temp area to a disc block (block 1 or 2) of the storage area.

In step S100, the storage information management unit 7 in keeping with the data location information held in the temp header copies the temp title 1 in the temp area to a title block (e.g., block 103) in the storage area. If the temp title 2 in the temp area contains the extra title information, that information is copied to another title block (e.g., block 104) in the storage area.

In step S101, the storage information management unit 7 clears the temp header in the temp area. From step S101, control is returned to step S13 of FIG. 4.

In step S13, the information control unit 2 determines whether or not the digital video recorder is turned off in response to the user's operation. If the apparatus is not found to be switched off, step S8 is reached again and the subsequent steps are repeated. If in step S13 power is found removed from the apparatus, the process is terminated.

As described, the digital video recorder embodying this invention has the storage area and temp area established in the storage unit 8. When the loaded disc is unloaded, the information written to the disc is temporarily stored into the temp area. The information is later copied to the storage area. When copying of the information to the storage area has all been completed, the temp header in the temp area is cleared. Next time the disc information is read from the storage unit 8, a reference is made to the temp header to see whether its information has been cleared. If the temp header is found to be cleared, that means the information held in the storage area is valid. If the temp header is not found cleared, that means the information retained in the temp area is valid. In either case, the valid information is always retrieved from the storage area or from the temp area. This ensures data consistency.

Because the disc information and title information held in the storage unit 8 are displayed in list form, the user finds it easy to search for desired information, give instructions for reproduction, or sort information.

In the above processes, the library list is displayed in response to the user's instruction. Alternatively, the library list may be displayed automatically whenever the digital video recorder is switched on, regardless of the user's instruction.

Figure 31:
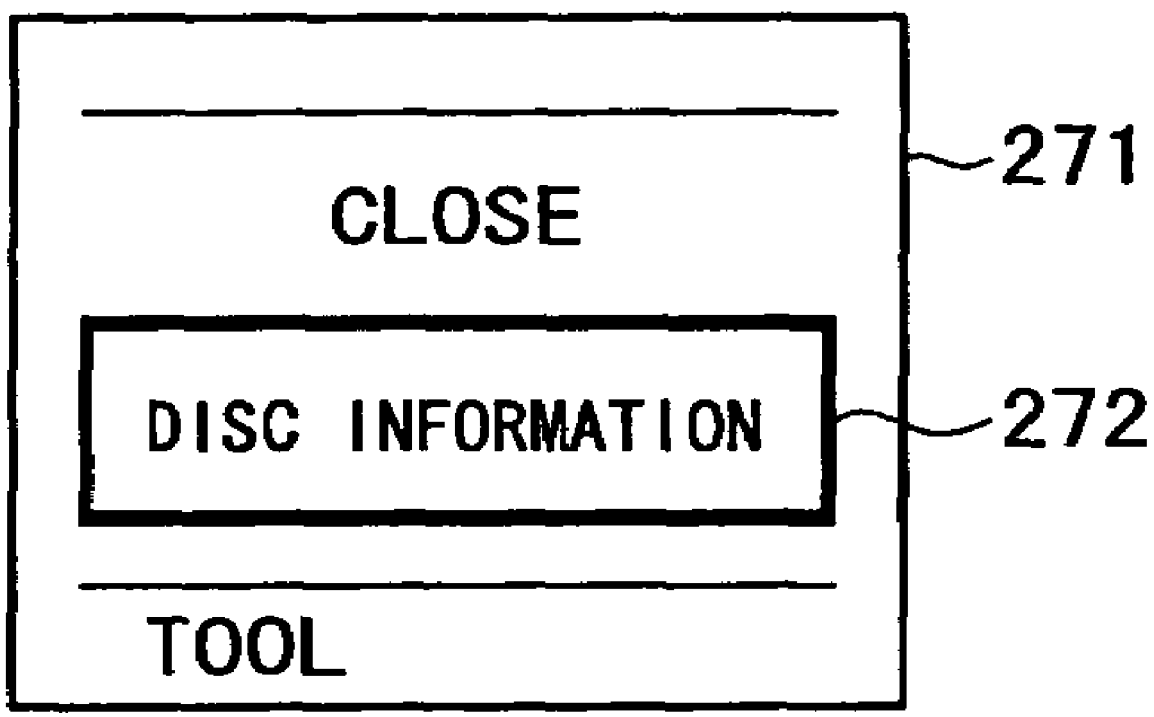
FIG. 31 is a schematic view of a typical tool display of the title list.

In this embodiment, not only the list of disc information and title information but also more detailed information may be displayed. For example, if the user pushes the Tool button 76 on the title list screen 71 (FIG. 9), the information control unit 2, given the user's instruction, causes the display unit 9 to display the title list tool menu 271 as shown in FIG. 31. The tool menu 271 includes user-selectable items "Close" and "Disc Information."

Illustratively, if the user selects the item "Disc Information" using a cursor 272 on the tool menu 271 of FIG. 31, the information control unit 2 outputs to the display unit 9 detailed information branching from the disc information based on the user's instruction. In turn, the output unit 9 displays a disc information dialog screen 281 as shown in FIG. 32. The dialog screen 281 includes detailed information 282 branching from the disc information, a Close button 283, and a Back button 284.

The detailed information 282 includes a disc name, a title count, a disc ID, recording dates, and a remaining disc storage capacity. The buttons 283 and 284 are each operated selectively by the user. Operating the Close button 283 or Back button 284 restores the library list screen 51 (FIG. 6).

The dialog screen 281 of FIG. 32 also appears when the item "Disc Information" is selected in the library list submenu 61 indicated in FIG. 8A.

In the manner described, not only the list of disc information and title information but also detailed information can be readily displayed.

In the foregoing description, the invention was shown applied to the digital video recorder which has the disc 1 loaded in its drive, which reads disc information and title information from the loaded disc, and which stores the retrieved information successively into the storage unit 8. However, that digital video recorder is only an example and is not limitative of the invention. The invention may also be applied extensively to other electronic apparatuses capable of being loaded with the disc 1.

It was also shown that the disc information and title information are written directly to the disc 1. The items of information thus written are associated with previously recorded disc IDs on the disc for information management purposes. Alternatively, apart from the disc information and title information written to the disc 1, management information unique to each digital video recorder (or to each user) may be input to a built-in HDD (hard disc drive) of the apparatus for management purposes.

Where no disc 1 is loaded in the digital video recorder, the above-described embodiment displays a message prompting the user to load the selected disc. Alternatively, content data may be retained temporarily on the HDD. The content data stored for the moment are then retrieved and written to the disc 1 that is subsequently loaded.

In a home network environment according to the invention where a plurality of AV apparatuses are interconnected and where the selected disc is loaded into one of the configured apparatuses, it is possible to check the other apparatuses to see whether or not any one of them has content data to be recorded to the loaded disc.

What follows is a description of such an AV system practiced as a second embodiment of this invention. In the description that follows, the component parts which have their functionally equivalent counterparts included in the digital video recorder of the first embodiment are designated by like reference numerals or characters, and their descriptions are omitted where redundant.

Figure 33:
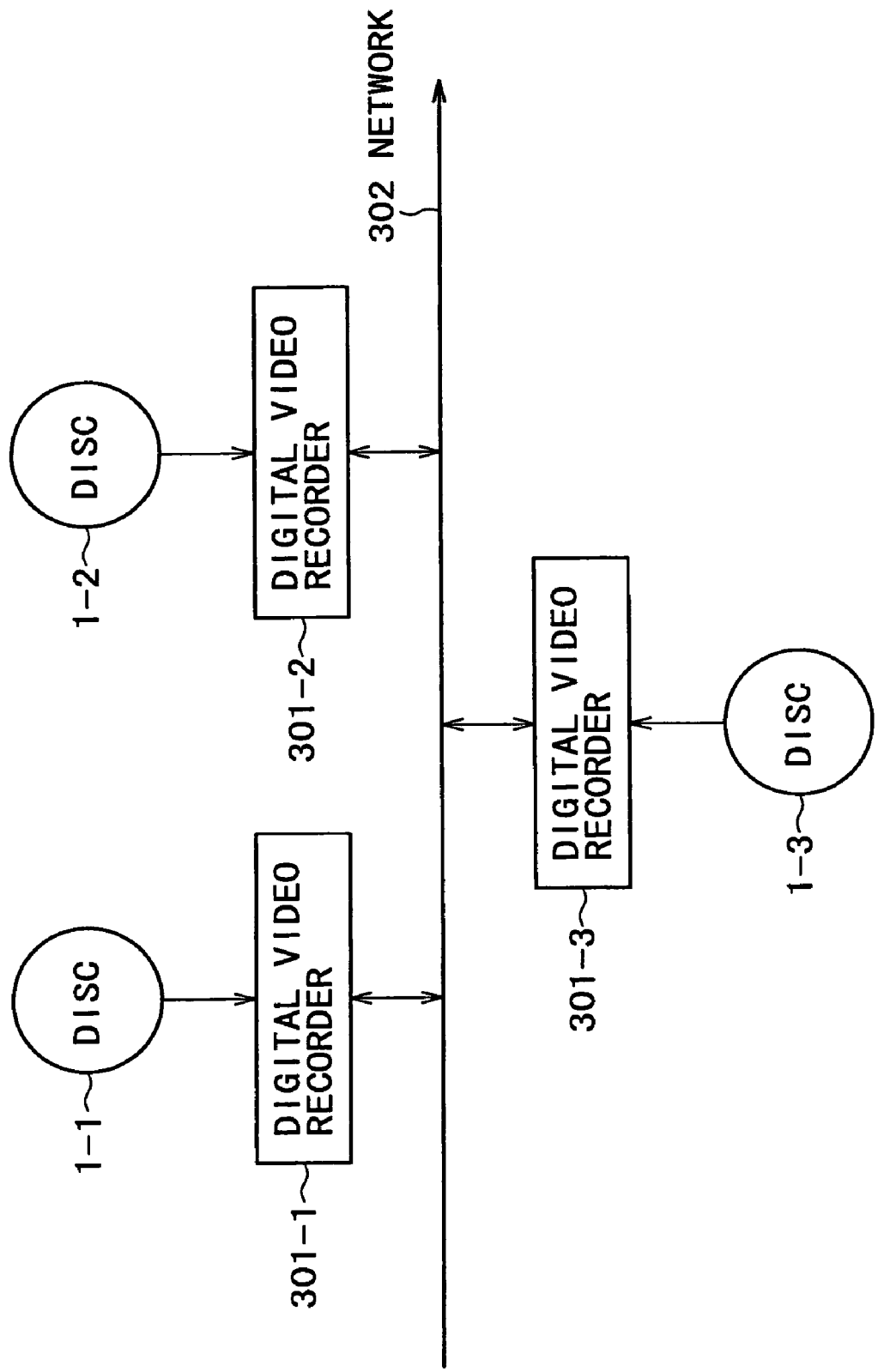
FIG. 33 is a block diagram of a typical AV system embodying this invention.

FIG. 33 is a block diagram of the AV system embodying this invention. In that AV system, digital video recorders 301-1 through 301-3 are interconnected via a network 302 and are capable of having discs 1-1 through 1-3 loaded therein respectively.

The digital video recorders 301-1 through 301-3 reproduce content data such as pictures and sounds from the discs 1-1 through 1-3; record content data to these discs; or each store temporarily into a hard disc drive (HDD) 330 (FIG. 34) the content data to be recorded to a disc so that when the selected disc 1 is loaded, the stored content data may be retrieved from the HDD 330 and recorded to that disc.

Each of the digital video recorders 301-1 through 301-3 admits from the loaded discs 1-1 through 1-3 management information specific to each recorder (local disc IDs, local disc names, etc.) to create a disc management table. Disc management is carried out on the basis of such disc management tables (details will be discussed later).

The network 302 may be of a wired type (based on IEEE (Institute of Electrical and Electronics Engineers) 1394 or USB (Universal Serial Bus) standards) or a wireless type (based on Bluetooth (trademark) criteria). The network 302 may also be the Internet or some other network arrangement.

In the description that follows, the digital video recorders 301-1 through 301-3 may be simply referred to as the digital video recorder 301 if there is no specific need to distinguish between them. Likewise, the discs 1-1 through 1-3 may be simply called the disc 1 if there is no need to distinguish between them.

Figure 34:
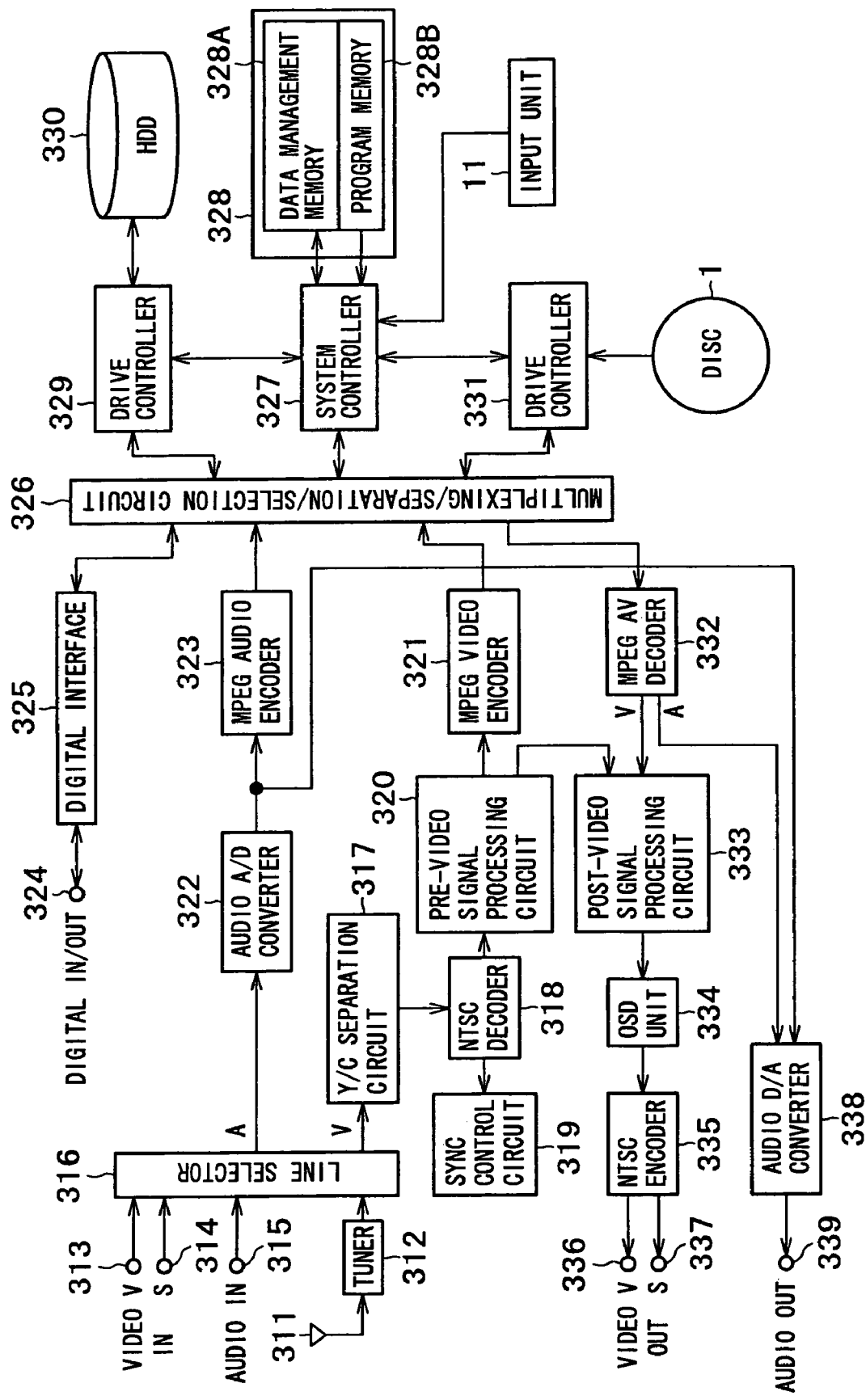
FIG. 34 is a block diagram presenting electrical connections in a digital video recorder included in FIG. 33.

FIG. 34 is a block diagram presenting electrical connections in the digital video recorder 301.

In the setup of FIG. 34, a tuner 312 receives TV broadcast waves input via an antenna 311 and demodulates the broadcast waves into a composite video signal and an analog audio signal for output to a line selector 316. A V input terminal 313 admits the composite video signal from the outside; an S input terminal 314 receives a component video signal derived from what is known as YC separation; and an audio input terminal 315 admits the audio signal. The signals input to these terminals are forwarded to the line selector 316.

The line selector 316, based on the user's changeover settings, selects the specified video and audio signals out of those coming from the tuner 312 and from the terminals 313 through 315. The selected audio signal is output to an audio A/D converter 322, and the selected video signal is sent to a Y/C separation circuit 317.

The Y/C separation circuit 317 separates the luminance component from the chrominance component in the supplied video signal for conversion into component signals. The converted component signals are output to an NTSC (National Television System Committee) decoder 318. If the supplied video signal is the component video signal coming from the S input terminal 314, no separation process will be carried out because the luminance and chrominance components have already been separated in the signal.

The NTSC decoder 318 performs such processes as A/D (analog to digital) conversion and chroma coding on the video signal in which the luminance component has been separated from the chrominance component, and outputs the resulting digital component data (simply called the video data hereunder) to a pre-video signal processing circuit 320. The NTSC decoder 318 further supplies a sync control circuit 319 with a clock generated on the basis of a horizontal sync signal in the input video signal, with a horizontal sync signal and a vertical sync signal derived from a synchronous separation process, and with a field discrimination signal. The sync control circuit 319 converts the sync signals from the NTSC decoder 318 into timing signals that address various circuits. These timing signals are fed to their corresponding circuits including an MPEG (Moving Picture Experts Group) video encoder 321.

The pre-video signal processing circuit 320 carries out diverse video signal processes including filtering on the input video data. The video data thus processed are supplied to the MPEG video encoder or to a post-video signal processing circuit 333.

The MPEG video encoder 321 subjects the video data to MPEG encoding so as to generate an MPEG video stream. The generated MPEG video stream is fed to a multiplexing/separation/selection circuit 326. The MPEG compression method used here is only an example; some other suitable compression scheme may be adopted alternatively.

The audio A/D converter 322 converts the audio signal coming from the line selector 316 into digital data which are then sent either to an MPEG audio encoder 323 or to an audio D/A converter 338. The MPEG audio encoder 323 subjects the input audio data to MPEG encoding in order to generate an MPEG audio stream. The MPEG audio stream thus generated is supplied to the multiplexing/separation/selection circuit 326. As with the video data, the MPEG compression method used here is only an example; some other suitable compression scheme may be adopted alternatively.

A digital input/output terminal 324 is connected illustratively to an external IRD (integrated receiver-decoder) via an IEEE 1394 interface or other suitable digital interface arrangements. From the external device, a transport stream (TS) that is subject to MPEG system requirements is input through the terminal 324. A digital interface 325 provides data format conversion between the data transmission format of the digital video recorder 301 and that of the digital interface. More specifically, the digital interface 325 converts in format the transport stream coming from the digital input/output terminal 324, and feeds the converted transport stream to the multiplexing/separation/selection circuit 326.

At the time of recording, the multiplexing/separation/selection circuit 326 packetizes the MPEG video stream coming from the MPEG video encoder 321, the MPEG audio stream from the MPEG audio encoder 323, and various kinds of control information fed from a system controller 327; and multiplexes the packets into a transport stream subject to MPEG system requirements. If a transport stream is input via the digital input/output terminal 324, the multiplexing/separation/selection circuit 326 updates control data as needed before outputting the transport stream.

At the time of reproduction, the multiplexing/separation/selection circuit 326 extracts PES (packetized elementary stream) packets from the transport stream retrieved from the HDD 330 and supplies the extracted packets to an MPEG AV decoder 332. If a transport stream is input through the digital input/output terminal 324, the multiplexing/separation/selection circuit 326 updates control data as needed and outputs the TS retrieved from the HDD 330.

The system controller 327, based on the input signals corresponding to the user's operation performed on the input unit 11, carries out suitable control programs held in a program memory 328B within a memory 328. Through the program execution, the system controller 327 generates control data to be multiplexed into a transport stream, controls drive controllers 329 and 331, and controls the digital video recorder 301 as a whole.

The system controller 327, also based on the signals reflecting the user's operation performed on the input unit 11, references or updates a data management memory 328A in the memory 328; generates file system management information for the HDD 330 and transport stream data management information, before recording the generated management information to a data management information storage area 361 (FIG. 36); records the transport stream to a real data storage area 362; or reads information or data as needed from the data management information storage area 361 or from the real data storage area 362. The system controller 327 gains access to the HDD 330 or to the transport stream in accordance with the file system management information and data management information. These items of information are managed in the form of a disc management table (FIG. 37) in the data management memory 328A.

The memory 328 is illustratively an electrically rewritable nonvolatile memory made up of the data management memory 328A and program memory 328B. The data management memory 328A accommodates the disc management table, to be described later with reference to FIG. 37. The program memory 328B holds the control programs necessary for the digital video recorder 301 to carry out various processes.

At the time of recording, the drive controller 329 writes to the HDD 330 the transport stream input successively from the multiplexing/separation/selection circuit 326. At the time of reproduction, the drive controller 329 reads the transport stream from the HDD 330 and feeds the retrieved transport stream to the multiplexing/separation/selection circuit 326.

The drive controller 331, upon recording, writes to the disc 1 the transport stream input successively from the multiplexing/separation/selection circuit 326. Upon reproduction, the drive controller 331 reads the transport stream from the disc 1 and feeds the retrieved transport stream to the multiplexing/separation/selection circuit 326. The drive controller 331 also reads the disc ID and disc information from the disc 1 and sends what is retrieved to the system controller 327.

The MPEG AV decoder 332 separates the input PES packets into MPEG video data and MPEG audio data which are subjected to an MPEG decoding process each. Following the decoding process, the MPEG AV decoder 332 supplies base-band video data to the post-video signal processing circuit 333 and base-band audio data to the audio D/A converter 338.

The post-video signal processing circuit 333 performs such processes as switchover between the video data coming from the MPEG AV decoder 332 and the video data from the pre-video signal processing circuit 320, superimposing of video data, and filtering, before feeding the processed data to an OSD (on-screen display) unit 334. The OSD unit 334 generates graphics for video display, superimposes the generated graphics onto the video data, and supplies the processed data to an NTSC encoder 335.

The NTSC encoder 335 converts the input video data into digital composite data prior to a D/A conversion process whereby an analog composite signal is generated. The analog composite signal is output to the display unit 9 (FIG. 35) through a V output terminal 336. Alternatively, the NTSC encoder 335 subjects the input video data (digital component data) to D/A conversion so as to generate an analog component signal. The analog component signal is output to the display unit 9 through an S output terminal 337.

The audio D/A converter 338 selectively inputs either the audio data from the MPEG AV decoder 332 or the audio data from the audio A/D converter 322, and subjects the input audio data to D/A conversion in order to generate an analog audio signal. The analog audio signal is output to the speakers 10 (FIG. 35) through an audio output terminal 339.

With the digital video recorder 301, as described above, various video signals are input from the tuner 312, from the input terminals 313 and 314, or from the digital interface 325. At the time of recording, one of these signals is selectively turned into the transport stream which is written to the real data storage area 362 (FIG. 36) on the HDD 330. Upon reproduction, the transport stream output from the HDD 330 is decoded and output through the V output terminal 336 or S output terminal 337. Alternatively the TS is output as digital data through the digital input/output terminal 324.

Figure 35:
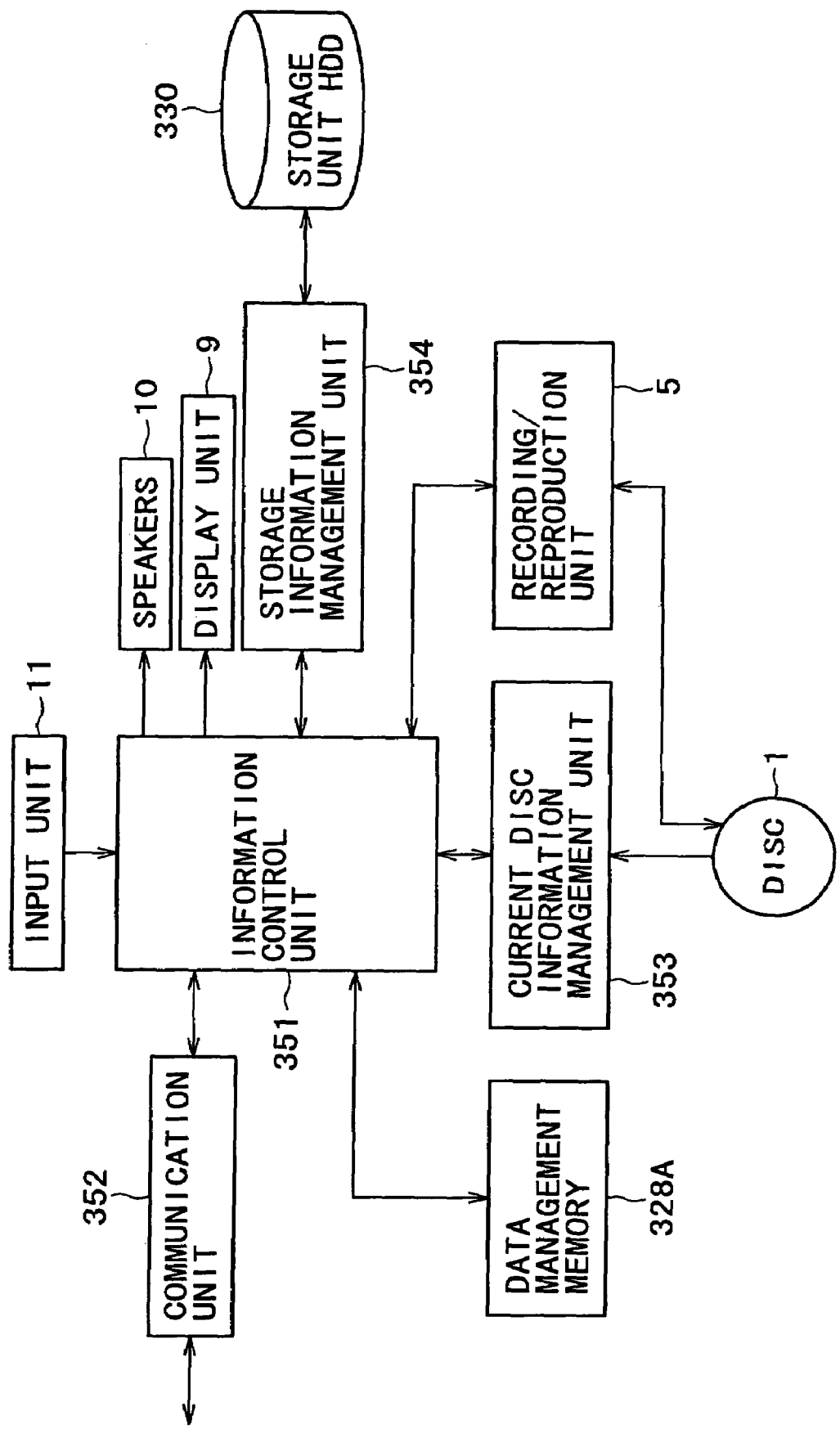
FIG. 35 is a block diagram outlining the functions of a system controller included in FIG. 34.

FIG. 35 is a block diagram outlining the functions of the system controller 327. These functions are implemented when the system controller 327 executes appropriate control programs held in the program memory 328B.

An information control unit 351, based on the input signals corresponding to the user's operation performed on the input unit 11, controls the current disc information management unit 353 and storage information management unit 354 and supplies the input content data (TS) to the current disc information management unit 353 or to the storage information management unit 354. The information control unit 351 further causes a communication unit 352 to conduct communications with other digital video recorders.

The information control unit 351 references the data management memory 328A in accordance with the disc ID of the disc 1 sent from the current disc information management unit 353. In so doing, the information control unit 351 retrieves from the disc management table certain information corresponding to the disc ID, or updates the disc management table itself.

The current disc information management unit 353 acquires the disc ID and disc information from the loaded disc 1 and feeds what is acquired to the information control unit 351. The storage information management unit 354 writes to the HDD 330 the data management information acquired from the information control unit 351, or reads data management information from the HDD 330 and supplies what is retrieved to the information control unit 351.

Whereas the disc ID for the disc 1 was described above as previously recorded (non-changing ID) in connection with the first embodiment of this invention, the unchanging aspect of disc IDs is not mandatory for the second embodiment. The user of the second embodiment may decide on a desired ID and attach it to the disc 1. In such a case, the user-selected ID is written to a user-writable area on the disc 1.

Figure 36:
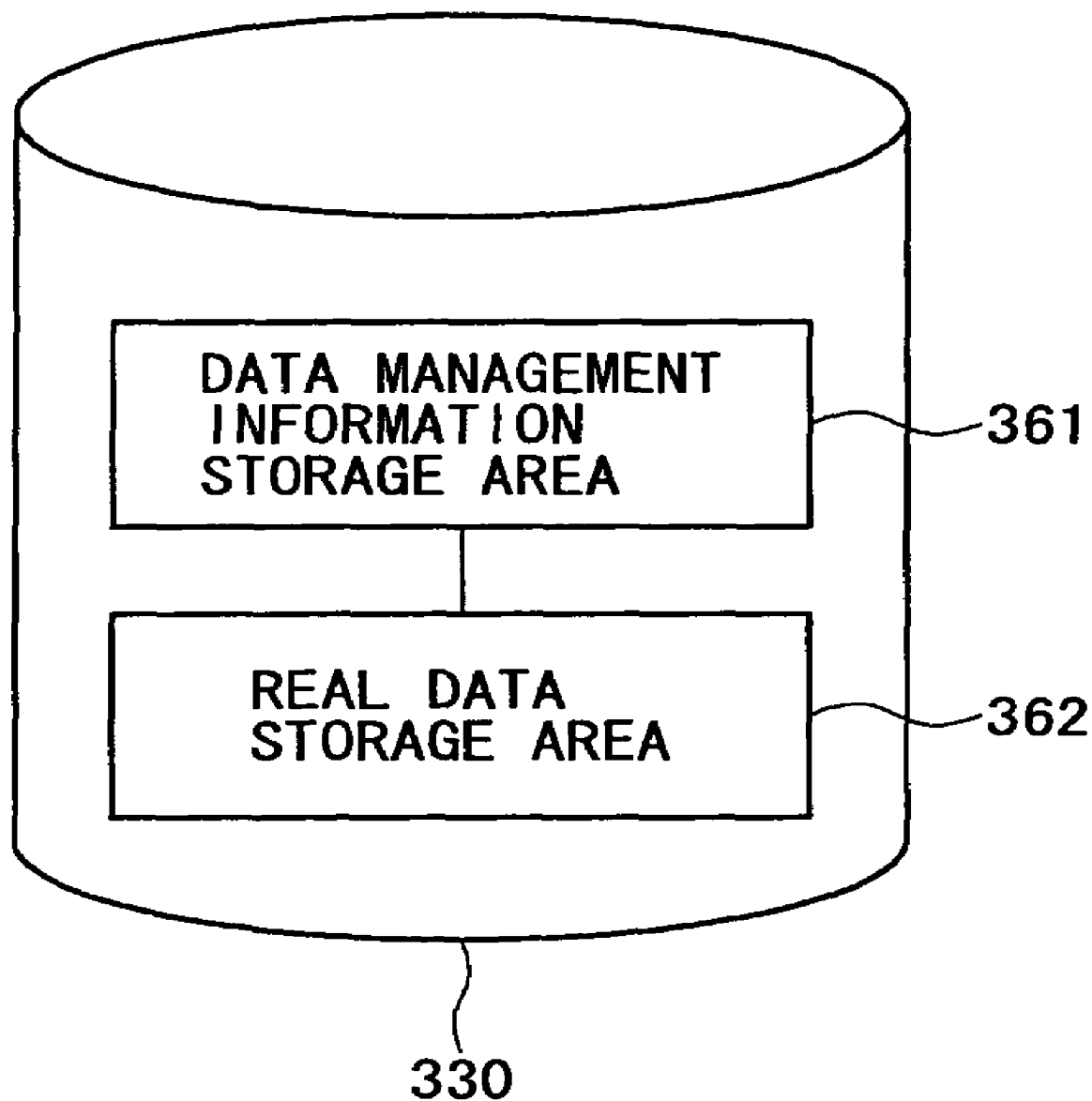
FIG. 36 is a schematic view showing a typical structure of an HDD included in FIG. 35.

The HDD 330 is constituted illustratively by a data management information storage area 361 and a real data storage area 362 as shown in FIG. 36. The data management information placed in the data management information storage area 361 is associated with the disc management table in the data management memory 328A as well as with the real data (e.g., TS) held in the real data storage area 362.

Figure 37:
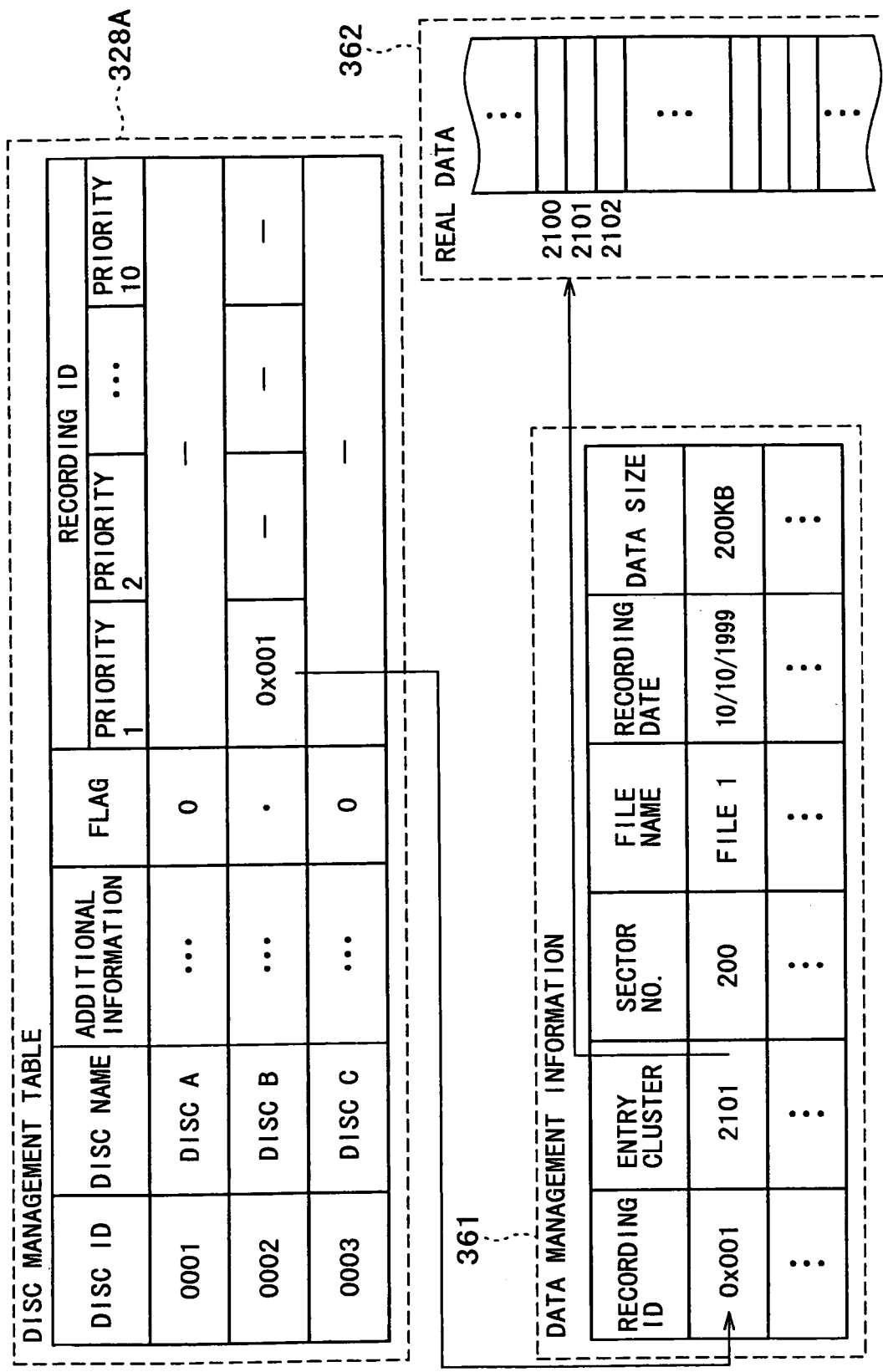
FIG. 37 is a schematic view depicting relations between a data management memory and the HDD.

FIG. 37 schematically depicts relations between the data management memory 328A and the HDD 330.

As shown in FIG. 37, the disc management table retained in the data management memory 328A has disc names, additional information, flags, and recording IDs stored in association with the disc IDs of the discs 1. The disc ID recorded on each disc 1 is an identifier attached to the disc for identification purposes. Likewise the disc name, also recorded on each disc 1, is the name given to the disc in question.

The additional information on each disc illustratively includes a data format, a creator's name, dates of data creation, a remaining recordable capacity, a local disc ID, a local disc name, and information about titles (i.e., content data) recorded on this disc. The local disc ID is a disc identifier which differs from the disc ID previously recorded on the disc 1 and which may be furnished to the disc 1 by each individual digital video recorder 301. The local disc name is a disc name which differs from the disc name previously written on the disc 1 and which may be given to the disc 1 by each digital video recorder 301.

The flag indicates whether or not the content data to be recorded to the disc 1 corresponding to this disc ID are being retained on the HDD 330 of the digital video recorder 301. If the flag is "0," that means the content data to be recorded to the disc 1 are not stored on the HDD 330; if the flag is "1," that means the content data to be recorded to the disc 1 are retained on the HDD 330.

The recording ID, information recorded only if the flag is "1," serves as the identifier of the content data to be recorded to the disc 1. The HDD 330 manages its content data based on the recording ID. Where there exist a plurality of titles of content data to be recorded to the disc 1, the recording ID subsumes recording priorities. In the example of FIG. 37, priorities 1 through 10 are shown established. The number of priorities may be changed as needed.

The data management information held in the data management information storage area 361 includes an entry cluster, a sector number, a file name, a recording date, and a data size stored in association with each recording ID linked to the disc management table in the data management memory 328A.

The entry cluster is a cluster number denoting the location in the real data storage area 362 of the cluster which contains the leading data of the file (content data) corresponding to the recording ID of interest. The sector number points to that sector in the real data storage area 362 which contains a file index of the file in question. The file name represents the target file held in the real data storage area 362. The recording date indicates the date on which the file in question was recorded. The data size denotes the size of all data included in the file of interest.

That is, the target file is written to the real data storage area 362 starting from the cluster whose number is designated by the entry cluster included in the data management information in the data management information storage area 361.

As described, when the recording ID is determined by the system controller 327, the corresponding file is recorded to the real data storage area 362. Concurrently, the data management information associated with the recording ID in question is written to the data management information storage area 361.

Figure 38:
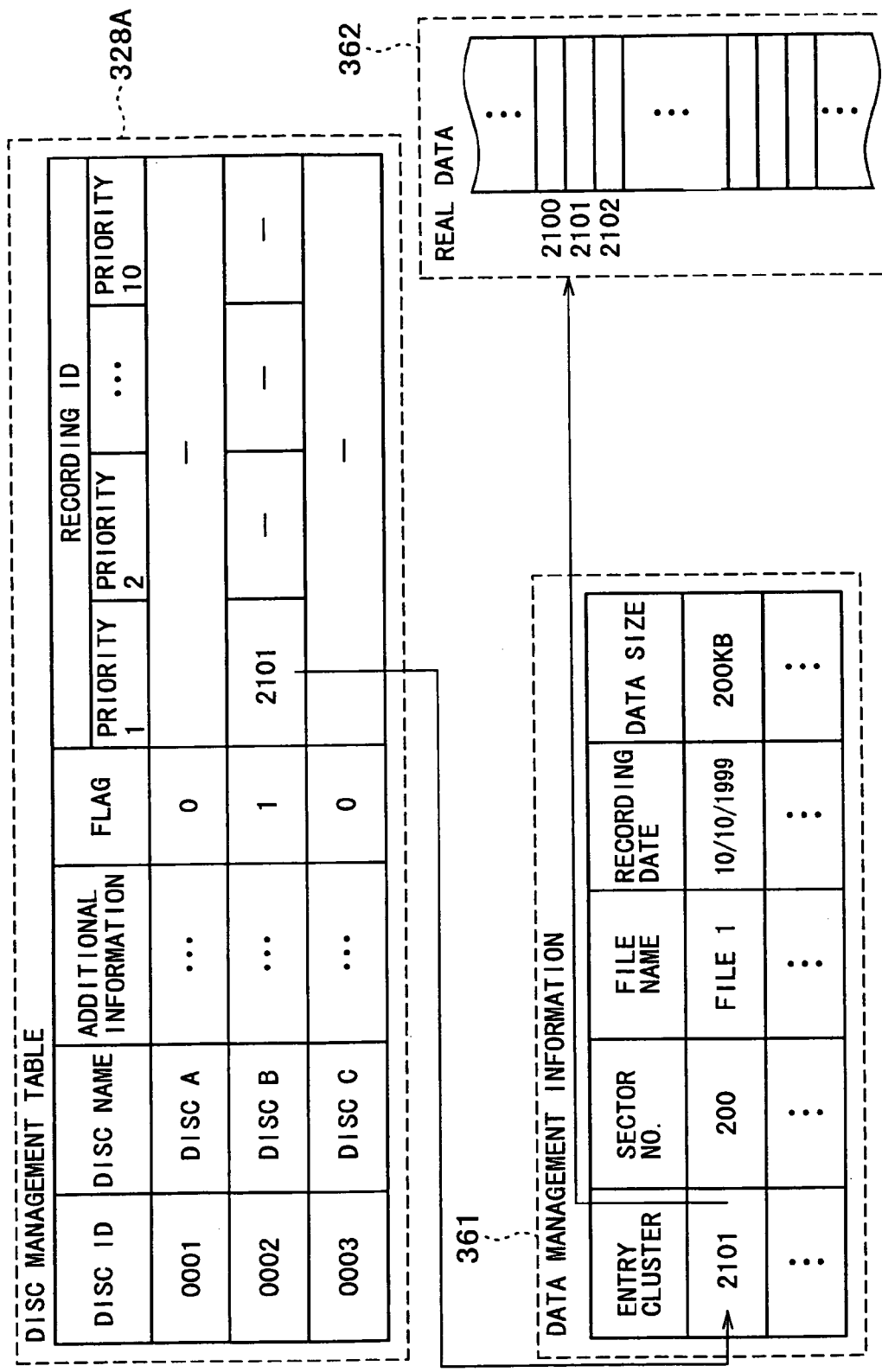
FIG. 38 is a schematic view illustrating other relations between the data management memory and the HDD.

While the system controller 327 was shown determining recording IDs in the foregoing description, this is not limitative of the invention. Alternatively, it is possible to read the entry cluster containing the desired file from the data management information in the data management information storage area 361 and to write the retrieved information to the disc management table. FIG. 38 shows typical relations between the data management memory 328A and the HDD 330, in effect in the alternative case above. As illustrated, the data management information may be managed in association with entry clusters without determining recording IDs.

Figure 39:
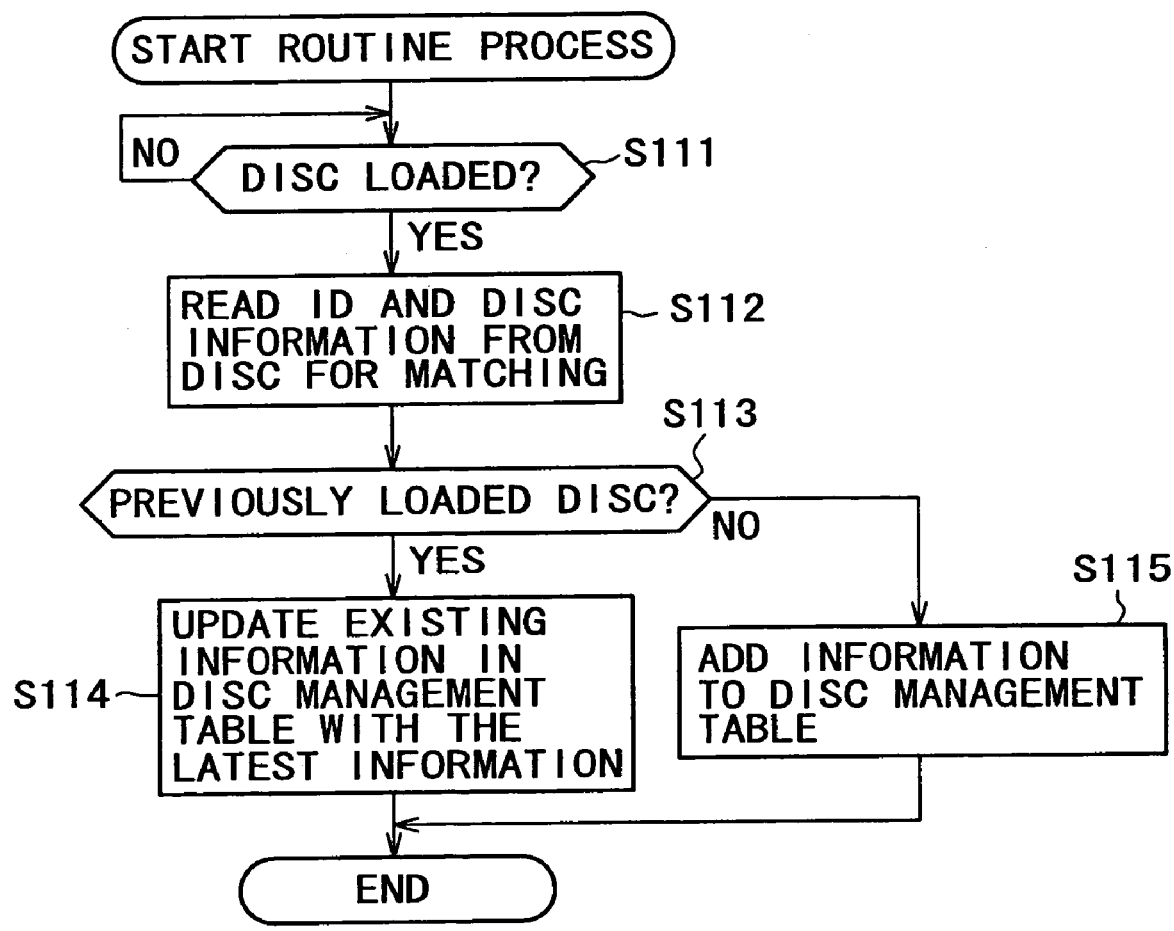
FIG. 39 is a flowchart of steps constituting another routine process.

Described below with reference to the flowchart of FIG. 39 is the routine process carried out by the digital video recorder of FIG. 35. This process is executed by the system controller 327 carrying out suitable control programs retrieved from the program memory 328B.

In step S111, the information control unit 351 causes the current disc information management unit 353 to determine whether or not the disc 1 is being loaded in the recorder. The information control unit 351 waits for the disc 1 to be loaded. If in step S1 the disc 1 is found to be loaded, step S112 is reached. In step S112, the information control unit 351 causes the current disc management unit 353 to read from the loaded disc 1 its disc ID and disc information (data format, creator's name, date of data creation, remaining recordable capacity, etc.). By referencing the disc management table in the data management memory 328A, the information control unit 351 checks to see whether or not the disc ID read by the current disc information management unit 353 has already been recorded.

In step S113, the information control unit 351 determines whether or not the disc is one which has been previously loaded, on the basis of the result of the check in step S112. More specifically, the information control unit 351 determines whether or not the disc ID read from the disc 1 is being stored in the disc management table. If the disc is found to have been previously loaded, step S114 is reached.

In step S114, the information control unit 351, based on the disc information read in step S112, updates the existing information in the disc management table within the data management memory 328A. If the loaded disc 1 had new content data recorded (added) thereto by some other digital video recorder, the date of data creation and the remaining recordable capacity must have been changed as a result of the additional recording. Given that possibility, the disc management table is updated every time the disc 1 is loaded.

If in step S113 the loaded disc is not found to have been loaded previously, i.e., if the disc ID retrieved from the disc 1 is not found in the disc management table, then step S115 is reached. In step S115, the information control unit 351 adds information to the disc management table in the data management memory 328A in keeping with the disc ID and the disc information retrieved in step S112.

As described, whenever the disc 1 is loaded, a check is made to see if the disc in question is a previously loaded one. The disc management table is updated in keeping with the result of the check. As needed, the user may furnish the disc 1 with a local disc ID and a local disc name specific to the digital video recorder at hand. These items of information are stored as additional information into the disc management table.

For example, in the disc management table of FIG. 37, the disc 1 having a disc ID "0001" is given a disc name "disc A." On the digital video recorder 301-1, the disc 1 may be supplemented with a local disc ID "0010" and a local disc name "Father"; on the digital video recorder 301-2, the disc 1 may be additionally furnished with a local disc ID "0005" and a local disc name "Papa."

When the disc 1 having the disc ID "0001" is loaded into the digital video recorder 301-1, a reference is made to the disc management table (in the data management memory 328A) in accordance with the disc ID. The reference allows the corresponding additional information (local disc ID "0010" and local disc name "Father") to be retrieved from the table. When the disc 1 having the disc ID "0001" is loaded into the digital video recorder 301-2, the disc management table is referenced on the basis of the disc ID. The corresponding additional information (local disc ID "0005" and local disc name "Papa") is then retrieved from the table.

In the manner described, the local disc ID and local disc name unique to each digital video recorder are managed using the disc management table in the data management memory 328A.

FIG. 40 shows a display example of a disc information screen 371 generated on the basis of the disc management table in the data management memory 328A. In the description that follows, the items which have their functionally equivalent counterparts included in the library list screen 51 of FIG. 6 are designated by like reference numerals, and their descriptions are omitted where redundant.

Unlike the library list screen 51 in FIG. 6, the library list display area 52 on the disc information screen 371 does not show the disc ID or disc name written to the disc 1. Instead, the library list display area 52 indicates local disc IDs and local disc names which have been furnished anew by this digital video recorder 301 and are distinguished thereby.

In the example of FIG. 40, a disc 1 having a disc ID "0007" is furnished with a local disc ID "0001"; and a disc 1 having a disc ID "0104" is provided with a local disc ID "0002" and, apart from the disc name "*** Special 1" (see FIG. 6), is supplemented with a local disc name "Documentary." Likewise, each disc 1 with a different disc ID is furnished with a local disc ID and a local disc name which have been conceived and provided by the user as desired.

The display sequence setting area 55 shows items "Number," "Name," "Remaining Capacity," and "Local." The displayed information is sorted by one of these items which is selected by the user. In the example of FIG. 40, the displayed information is shown sorted by local disc ID.

As described, the disc IDs written previously on the discs 1 and local disc IDs attached anew to the discs 1 by individual digital video recorders 301 may be displayed side by side, in mixed fashion. Alternatively, the disc IDs alone may be listed as shown in FIG. 6. As another alternative, the local disc IDs alone may be displayed (not shown). As a further alternative, the disc names recorded previously on the discs 1 and local disc names given anew to the discs 1 by individual digital video recorders 301 may be displayed in mixed fashion.

Figure 41:
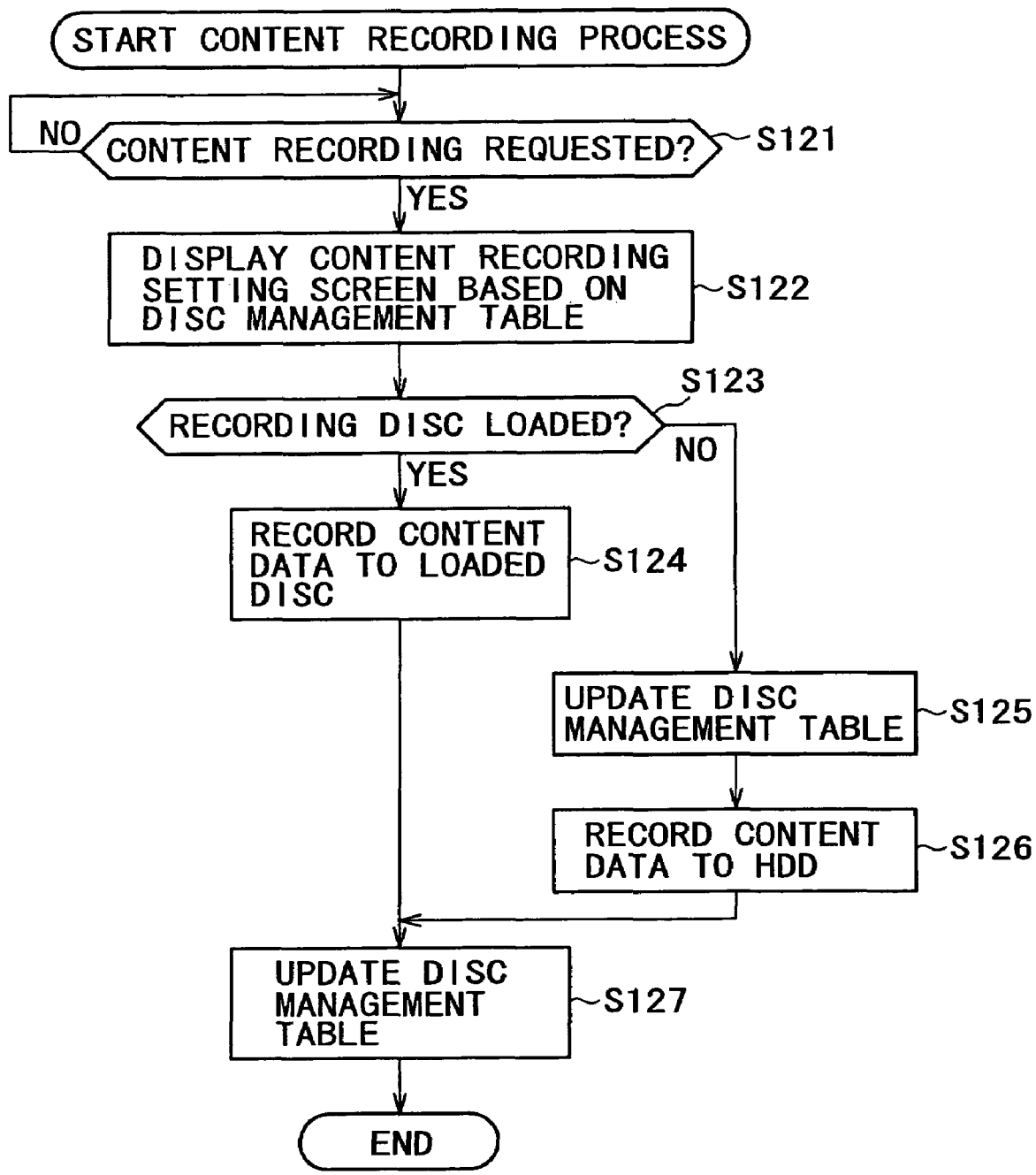
FIG. 41 is a flowchart of steps constituting a content recording process.

Described below with reference to the flowchart of FIG. 41 is the content recording process carried out by the digital video recorder 301 of FIG. 35.

Figure 42:
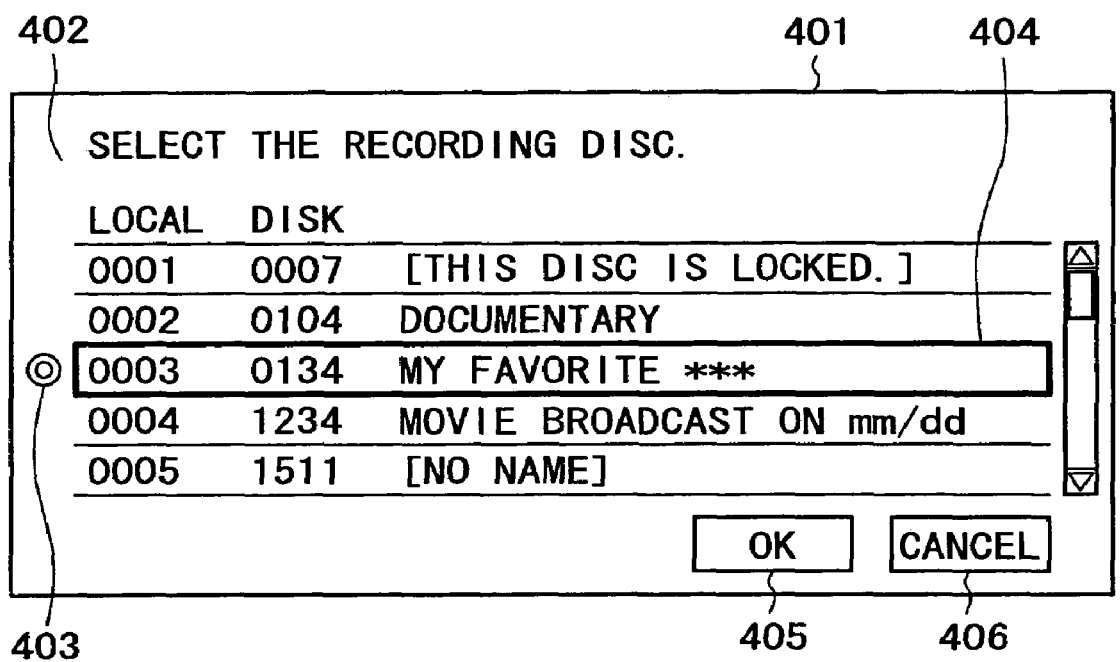
FIG. 42 is a schematic view of a typical content recording setting screen display.

In step S121, the information control unit 351 determines whether or not the user has requested recording of content data. The information control unit 351 waits for the recording to be requested. If in step S121 the recording of content data is found requested, step S122 is reached. In step S122, the information control unit 351 references the disc management table in the data management memory 328A and causes the display unit 9 to display a content recording setting screen 401 based on the referenced table, as shown in FIG. 42. The content recording setting screen 401 includes a list display area 402, a loaded disc mark 403, a cursor 404, an OK button 405, and a Cancel button 406.

The list display area 402 gives a list of local disc IDs, cartridge IDs (part of the disc IDs written on discs 1), and local disc names derived from the disc information held in the disc management table. In this example, the cursor 404 is shown highlighting the disc information "0003 (local disc ID), 0134 (cartridge ID), My Favorite * (local disc name)." The loaded disc mark 403 indicates that the disc 1 having the disc information "0003, 0134, My Favorite *" is being loaded.

The buttons 405 and 406 are each selected by the user operating the input unit 11. Selecting the OK button 405 confirms the recording to the disc 1 corresponding to the disc information selected by-the cursor 404. Selecting the Cancel button 406 cancels the recording.

Returning to step S123 in FIG. 41, the information control unit 351 causes the recording/reproduction unit 5 to determine whether or not the disc 1 to which to record the content data is being loaded. Illustratively, it is assumed that the disc 1 having the disc information "0003, 0134, My Favorite ***" is loaded as indicated by the loaded disc mark 403 on the content recording setting screen 401 of FIG. 42. A check is then made to see whether or not the recording to that disc 1 is requested.

If in step S123 the disc 1 to which to record the content data is found loaded, step S124 is reached. In step S124, the recording/reproduction unit 5 records to the loaded disc 1 the content data supplied from the information control unit 351.

If in step S123 the disc 1 to which to record the content data is not found loaded, i.e., if a request is made to record the content data to a disc other than the one indicated by the loaded disc mark 403 on the content recording setting screen 401 of FIG. 42, then step S125 is reached. In step S125, the information control unit 351 updates the disc management table in the data management memory 328A. More specifically, with the content data stored temporarily on the HDD 330, the information control unit 351 determines a recording ID linked to the data management information storage unit 361 of the HDD 330. With the recording ID established in the disc management table, the flag is set to "1."

Figure 43:
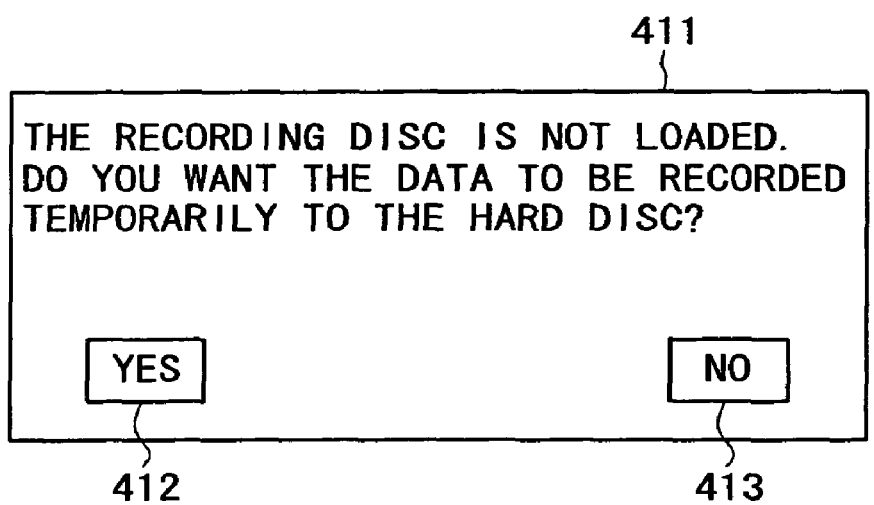
FIG. 43 is a schematic view of a typical dialog screen display.

In step S125, the information control unit 351 causes the display unit 9 to display as needed a dialog screen 411 such as one shown in FIG. 43. The dialog screen 411 indicates a "Yes" button 412 and a "No" button 413, along with a message prompting the user to determine whether or not the content data are to be recorded temporarily to the HDD 330. The user selects either the "Yes" button 412 to let the content data be recorded temporarily to the HDD 330, or the "No" button 413 to cancel the recording.

That is, when the recording disc is not loaded, the user is allowed to make one of two choices: either to have the content data recorded temporarily on the hard disc, or to cancel the recording.

If the "Yes" button 412 is selected by the user, step S126 is reached in which the information control unit 351 causes the storage information management unit 354 to record (store) temporarily the content data of interest to the HDD 330. The content data to be recorded eventually to the selected disc are then recorded for the moment to the real data storage area 362 of the HDD 330.

In step S127, the information control unit 351 updates the applicable additional information (date of data creation, remaining recordable capacity, etc.) in the disc management table within the data management memory 328A following the recording of new content data. When step S126 has been carried out, the information control unit 351 records the appropriate entry cluster (i.e., storage location in the real data storage area 362), sector number, file name, and data size as data management information into the data management information storage area 361.

Figure 44:
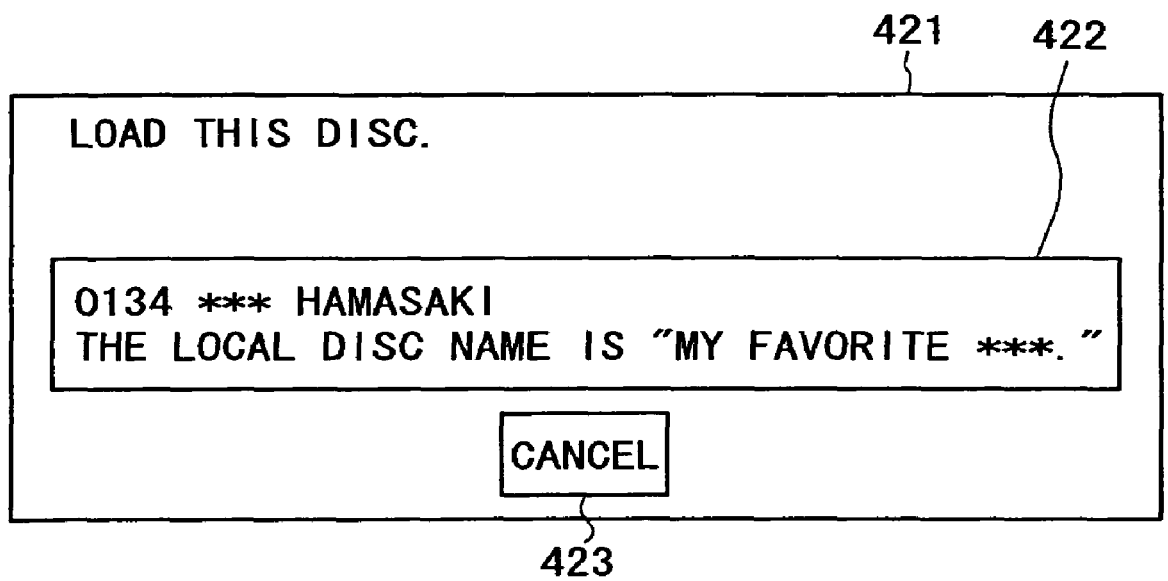
FIG. 44 is a schematic view of a typical dialog screen display brought about when a No button is selected on the dialog screen of FIG. 43.

If the "No" button 412 is selected on the dialog screen 411 of FIG. 43, the information control unit 351 causes another dialog screen 421 to appear as shown in FIG. 44. This dialog screen 421 indicates a message prompting the user to load a particular disc, along with the disc name 422 of that disc (e.g., "0134, * Hamasaki," with the local disc name "My Favorite *").

The user is then able to easily find the target disc to be loaded by looking up the cartridge ID ("0134" in this case) visibly indicated on each disc 1. When the appropriate disc 1 is loaded, step S124 of FIG. 41 is reached and the subsequent process is carried out as discussed above. The user selects the "Cancel" button 423 when canceling the recording both to the HDD 330 and to the disc 1.

As described, if recording of specific content data is carried out by the user and if the applicable disc to which to make the recording is not loaded, the content data in question are stored temporarily on the HDD 330. In that case, the disc ID and the content data (recording ID) are associated with each other when recorded to the disc management table. When the appropriate disc 1 is later loaded, the disc ID is retrieved from the loaded disc 1 and the disc management table is referenced on the basis of the retrieved disc ID. If the reference to the table reveals that the content data associated with the disc ID are being retained on the HDD 330, either the user is notified thereof as needed, or the content data are automatically recorded to the disc 1 from the HDD 330.

Figure 45:
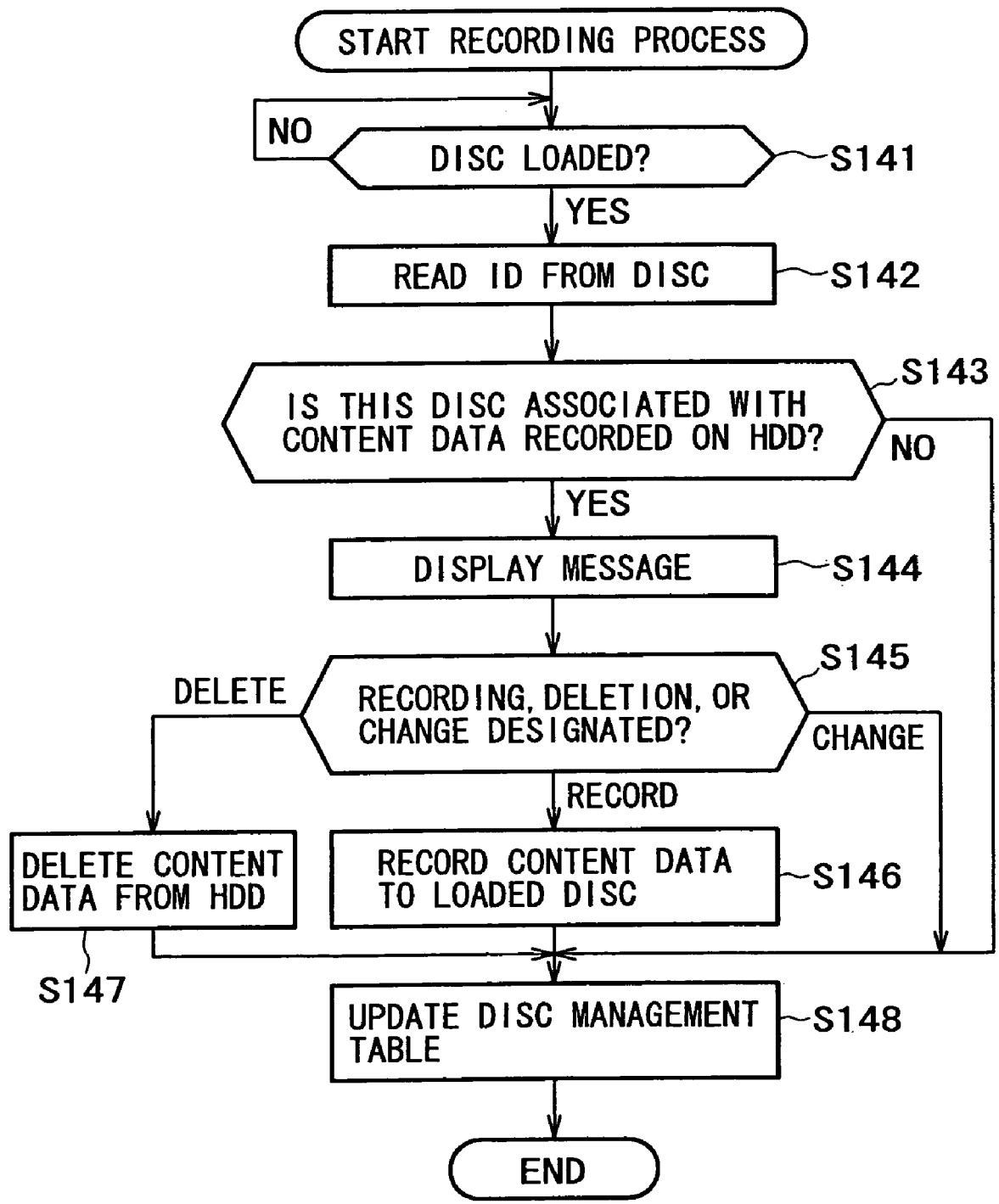
FIG. 45 is a flowchart of steps constituting a recording process.

What follows is a description, with reference to the flowchart of FIG. 45, of the recording process that takes place when an appropriate disc 1 to which to record content data is loaded following the above-described temporary storage of the content data in question onto the HDD 330 preparatory to their recording to the disc 1.

In step S141, the information control unit 351 causes the current disc information management unit 353 to determine whether or not the disc 1 is loaded into the recorder. The information control unit 351 waits for the disc 1 to be loaded. If in step S141 the disc 1 is found to be loaded, step S142 is reached. In step S142, the information control unit 351 causes the current disc information management unit 353 to read the disc ID and disc information from the loaded disc 1.

In step S143, the information control unit 351 references the disc management table in the data management memory 328A on the basis of the disc ID retrieved in step S142 by the current disc information management unit 353, in order to determine whether or not the loaded disc 1 is associated with the content data held temporarily on the HDD 330. More specifically, if the flag corresponding to the retrieved disc ID is found set to "1" in the disc management table, that is indicative that the content data to be recorded to the disc 1 are retained on the HDD 330. For example, if the retrieved disc ID is "0002," the flag corresponding to that disc ID is "1" in the disc management table shown in FIG. 37. This allows the information control unit 351 to determine that the content data to be recorded to the loaded disc 1 reside on the HDD 330.

If in step S143 the loaded disc 1 is not found to be the disc with which the content data temporarily recorded on the HDD 330 are associated, step S148 is reached. If in step S143 the loaded disc 1 is found to be the disc that the content data temporarily retained on the HDD 330 are associated with, then step S144 is reached. In step S144, the information control unit 351 causes the display unit 9 to display a dialog screen 431 as depicted in FIG. 46.

The dialog screen 431 indicates a message informing the user that the HDD 330 retains data to be recorded to the loaded disc. Also indicated along with the message are a Record button 432, a Delete button 433, and a Change button 434, any one of which may be selected by the user. Selecting the Record button 432 causes the content data in question to be read from the HDD 330 and recorded to the disc 1; selecting the Delete button 433 deletes the content data from the HDD 330; and selecting the Change button 434 allows the content data to be recorded from the HDD 330 to a different disc.

Returning to step S145 in FIG. 45, the information control unit 351 determines which of the three buttons (Record button 432, Delete button 433, and Change button 434) is selected by the user on the dialog screen 431 shown in FIG. 46. If the Record button 432 is found to be selected by the user, step S146 is reached.

In step S146, the information control unit 351 causes the storage information management unit 354 to read the content data which have been retained temporarily in the real data storage area 361 of the HDD 330 and which are to be recorded to the disc 1. The information control unit 351 then supplies the recording/reproduction unit 5 with the content data acquired from the storage information management unit 354 and causes the recording/reproduction unit 5 to record the content data to the disc 1. After the content data have been read from the HDD 330 and recorded to the disc 1, the data in question are deleted automatically from the HDD 330. Alternatively, the content data may be deleted manually in response to the user's instruction.

If in step S145 the user is found to have selected the Delete button 433, step S147 is reached. In step S147, the information control unit 351 causes the storage information management unit 354 to delete the content data which have been retained temporarily in the real data storage area 361 of the HDD 330 and which were to be recorded to the disc 1.

If in step S145 the user is found to have selected the Change button 434, step S148 is reached. In step S148, the information control unit 351 causes the display unit 9 to display a disc change screen 441 as shown in FIG. 47. The disc change screen 441 includes a list display area 442, a cursor 443, a Record button 444, and a Cancel button 445.

The list display area 441 gives a list of local disc IDs, cartridge IDs, and local disc names derived from the disc information stored in the disc management table. In the displayed list, the cursor 443 is shown highlighting the disc information "0005, 1511, No Name." The disc 1 corresponding to the disc information currently selected by the cursor 443 is the disc to which to record the content data. If it is desired to replace the currently selected disc with a different disc to which to make the recording, the user may move the cursor 443 to the desired disc information and push the Record button 444. The user may cancel the disc changing operation by pushing the Cancel button 445.

Returning to step S148 in FIG. 45, the information control unit 351 updates the applicable additional information (date of data creation, remaining recordable capacity, etc.) and the flag in the disc management table within the data management memory 328A following the recording of the content data to the disc 1 or the deletion from the HDD 330 of the data that might have been recorded to the disc 1.

The content data to be written to the disc 1 are recorded in association with the disc IDs to the disc management table, as described. This makes it easy to determine, whenever a disc 1 is loaded, whether any content data to be recorded to that disc 1 are stored on the HDD 330 by referencing the disc management table based on the disc ID retrieved from the loaded disc.

It was shown that the dialog screen 431 of FIG. 46 appears if the disc 1 is loaded while the content data to be loaded to that disc 1 have been held on the HDD 330. Alternatively, it is possible not to display the message of FIG. 46 and to let the content data be recorded automatically from the HDD 330 to the disc 1 when the latter is loaded.

Where there exist a plurality of titles of content data to be recorded to the disc 1, these titles may be assigned priorities with regard to their recording to the disc 1. For example, suppose that the user selects the "Yes" button 412 on the dialog screen 411 of FIG. 43 displayed when the recording of content data to an unloaded disc is requested, and that other content data to be recorded to the requested disc have already been held temporarily in the real data storage area 362 of the HDD 330. In that case, the user may prioritize the content data about to be recorded and the previously recorded content data.

How such a priority setting process is performed will now be described with reference to the flowchart of FIG. 48. This process is started if the user selects the "Yes" button 412 on the dialog screen 41 of FIG. 43 where content data to be recorded to the disc in question already exist in the real data storage area 362 of the HDD 330.

In step S161, the information control unit 351 references the disc management table in the data management memory 328A and causes the display unit 9 to display a priority setting screen 451 as shown in FIG. 49 in accordance with the referenced table. The priority setting screen 451 includes a Priority button 452 along with a message indicating that there exist a plurality of titles of content data to be recorded to the selected disc.

In the example of FIG. 49, priority 1 is assigned to the content data with a title A, and priority 2 is allotted to the content data with a title B. These titles have already been stored on the HDD 330 as content data to be recorded to the selected disc. By viewing the priority setting screen 451 on display, the user considers a suitable priority for the content data about to be temporarily recorded to the HDD 330, and selects the Priority button 452 to set the priority.

When the Priority button 452 is selected by the user, the information control unit 351 causes a pull-down screen 461 to appear as illustrated in FIG. 50. This pull-down screen 461 indicates items "1," through "3" representative of priorities. The item "2" is shown selected by the cursor 462 on the screen. The user may move the cursor 462 to decide on the preferred priority that is set for the content data about to be stored temporarily onto the HDD 330.

Figure 48:
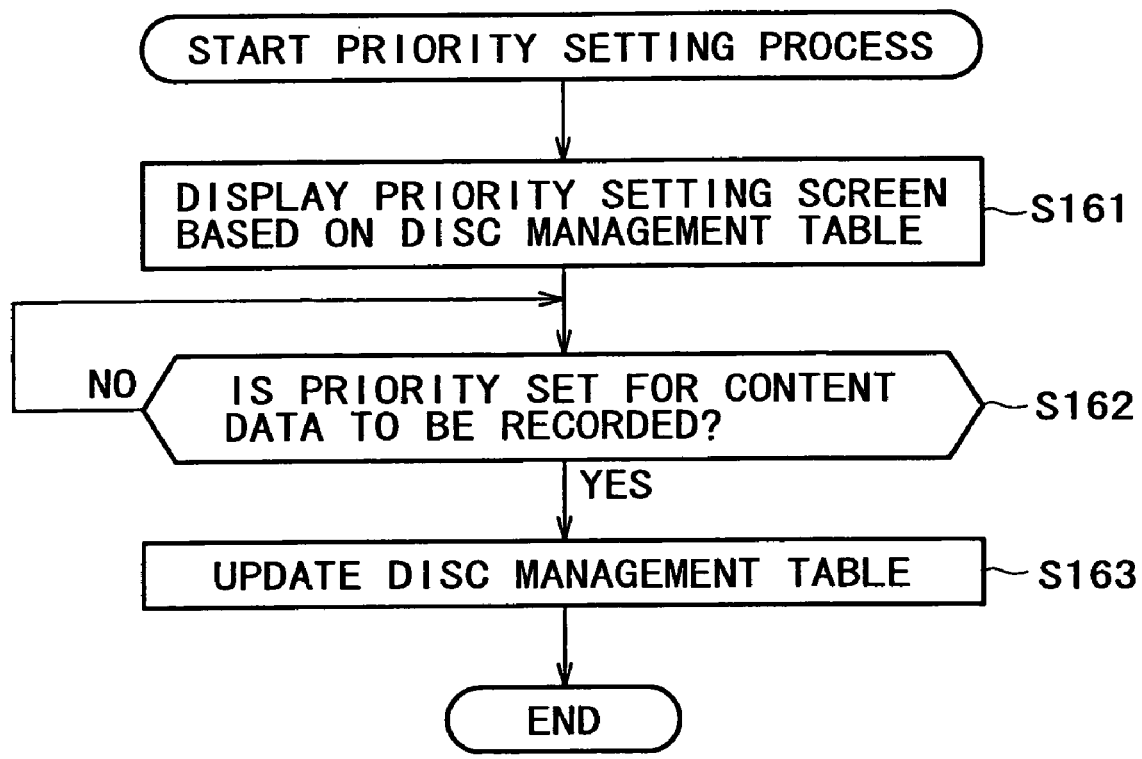
FIG. 48 is a flowchart of steps constituting a priority setting process.

Returning to step S162 in FIG. 48, the information control unit 351 determines whether or not the priority of the content data about to be recorded has been set by the user. More specifically, a check is made to see whether or not the Priority button 452 is selected on the priority setting screen 451 of FIG. 49, whether or not the pull-down screen 461 of FIG. 50 is displayed, and whether or not the desired priority is selected using the cursor 462. The information control unit 351 waits for the priority to be set.

If in step S162 the priority is found to be set for the content data about to be recorded, then step S163 is reached. In step S163, the information control unit 351 updates the applicable recording ID in the disc management table within the data management memory 328A.

What follows is a more detailed description of the priority setting process, with reference to examples in FIGS. 51A and 51B of the disc management table within the data management memory 328A. For purpose of simplification and illustration, each recording ID is shown with its high-order three bits supplemented by low-order three bits constituting the priority (e.g., "0x001001" is made up of a recording ID "001"+a priority "001"). Alternatively, some other suitable recording ID format may be adopted as long as it allows each title of content data to be designated uniquely.

Illustratively, for the disc 1 with the disc ID "0134" and the disc name "*** Hamasaki," priority 1 is assigned to the content data having a recording ID "0x001001" and priority 2 to the content data having a recording ID "0x010010" as shown in FIG. 51A. In other words, if the selected disc is loaded, the content data with the recording ID "0x01001001" will be first recorded to the disc 1, followed by the content data with the recording ID "0x010010."

Suppose that, with two titles of content data already stored temporarily on the HDD 330 preparatory to their recording to the selected disc, another title of content data to be eventually recorded to the selected disc is about to be written temporarily to the HDD 330, and that the user sets priority 2 for the newly added title of content data (with recording ID "011") about to be stored. In that case, as shown in FIG. 51B, priority 2 is allotted to the title of content data having the recording ID "0x011010" (i.e., recording-ID "011"+priority "010"). That title of content data (with recording ID "0x010010") which was previously assigned priority 2 is now assigned priority 3, with the recording ID changed to "0x010011" (i.e., recording ID "010"+priority "011"). (The low-order three bits are updated following the change of priorities.) If writing the new content data with priority 2 to the HDD 330 has exhausted the latter's recordable capacity, the content data with a lower priority may be automatically deleted (i.e., the content data with priority 3 in this example) from the hard disc. If deleting the content data with a lower priority fails to vacate sufficient space to accommodate the content data about to be recorded temporarily to the HDD 330 (i.e., the content data with priority 2 in this case), the user may be informed thereof and asked to reconsider the priorities. Alternatively, the user may be notified that the recording is canceled due to a lack of recordable capacity.

If it is not desired to let lower-priority content data be deleted automatically or to cancel the recording outright, the information control unit 351 may ask the other recorder or recorders configured on the network 302 whether or not any one of them can record the content data on behalf of this recorder with its insufficient capacity. If any configured recorder is found capable of accommodating the content data, the data may be transferred (store) to that recorder for storage.

As described, a plurality of titles of content data to be recorded to the disc 1 may be stored temporarily on the HDD 330 in the descending order of their priorities. Later, when the applicable disc 1 is loaded and when the content data to be recorded to that disc are found to exist on the HDD 330 (in step S143 of FIG. 45), the dialog screen 431 of FIG. 46 appears (in step S144 of FIG. 45). When the user designates recording of the content data to the disc, the multiple titles of content data retained on the HDD 330 are retrieved successively and recorded to the disc 1 in the descending order of their priorities (in step s146 of FIG. 45).

If the recordable capacity of the disc 1 is exhausted halfway while the applicable contend data are being recorded thereto in the descending order of their priorities, the user may be notified thereof. Alternatively, the user may be presented not only with the notice of the exhausted capacity of the disc 1 but also with candidates of recordable discs to which the remaining-content data may be recorded.

If in step S143 of FIG. 45 the loaded disc 1 is not found to be associated with the content data retained temporarily on the HDD 330, then the information control unit 351 may alternatively search through the other digital video recorder or recorders configured on the network 302 for any content data which are to be recorded to the disc 1 in question and which are being retained temporarily by the configured recorder or recorders.

The search process in the alternative case above is described below with reference to the flowchart of FIG. 52. This process is carried out when the digital video recorder 301 is connected to the network 302.

In step S171, the information control unit 351 causes the current disc information management unit 353 to determine whether or not the disc 1 is loaded into this recorder. The information control unit 351 waits for the disc 1 to be loaded (corresponding to step S141 in FIG. 45). If in step S171 the disc 1 is found to be loaded, step S172 is reached. In step S172, the information control unit 351 causes the current disc information management unit 353 to read the disc ID and disc information from the loaded disc 1 (corresponding to step S142 in FIG. 45).

In step S173, the information control unit 351 causes the communication unit 352 to establish connection with the other digital video recorder or recorders configured on the network 302. The information control unit 351 inquires the other recorders connected to the network 302 whether or not they have any content data associated with the disc ID retrieved in step S172 by the current disc information management unit 353.

Each of the other digital video recorders configured references the disc management table in its data management memory 328A, searches its HDD 330 for any content data associated with the inquired disc ID, and sends the result of the search along with the device ID of the recorder to the digital video recorder that originated the inquiry.

In step S174, the information control unit 351 receives the response (i.e., result of the search) from the other recorder or recorders. In step S175, the information control unit 351 determines whether or not any other configured digital video recorder has the content data to be recorded to the loaded disc.

If in step S175 no other recorder is found to retain any content data to be recorded to the loaded disc, step S180 is reached. If in step S175 some other digital video recorder is found to have the content data to be recorded to the loaded disc, step S176 is reached. In step S176, the information control unit 351 causes the display unit 9 to display a dialog screen 471 such as one shown in FIG. 53.

The dialog screen 471 indicates a message informing the user that content data to be recorded to the loaded disc have been found in some other configured recorder. Also indicated on the screen 471 are a Record button 472, a Delete button 473, and a Change button 474. Each of the buttons 472 through 474 is operated selectively by the user. Selecting the Record button 472 causes the content data in question to be acquired from the other recorder and recorded to the disc 1; selecting the Delete button 473 deletes the content data from the other recorder; and selecting the Change button 474 changes discs so that the content data held on the other recorder are to be recorded to a disc other than the currently loaded one.

Figure 52:
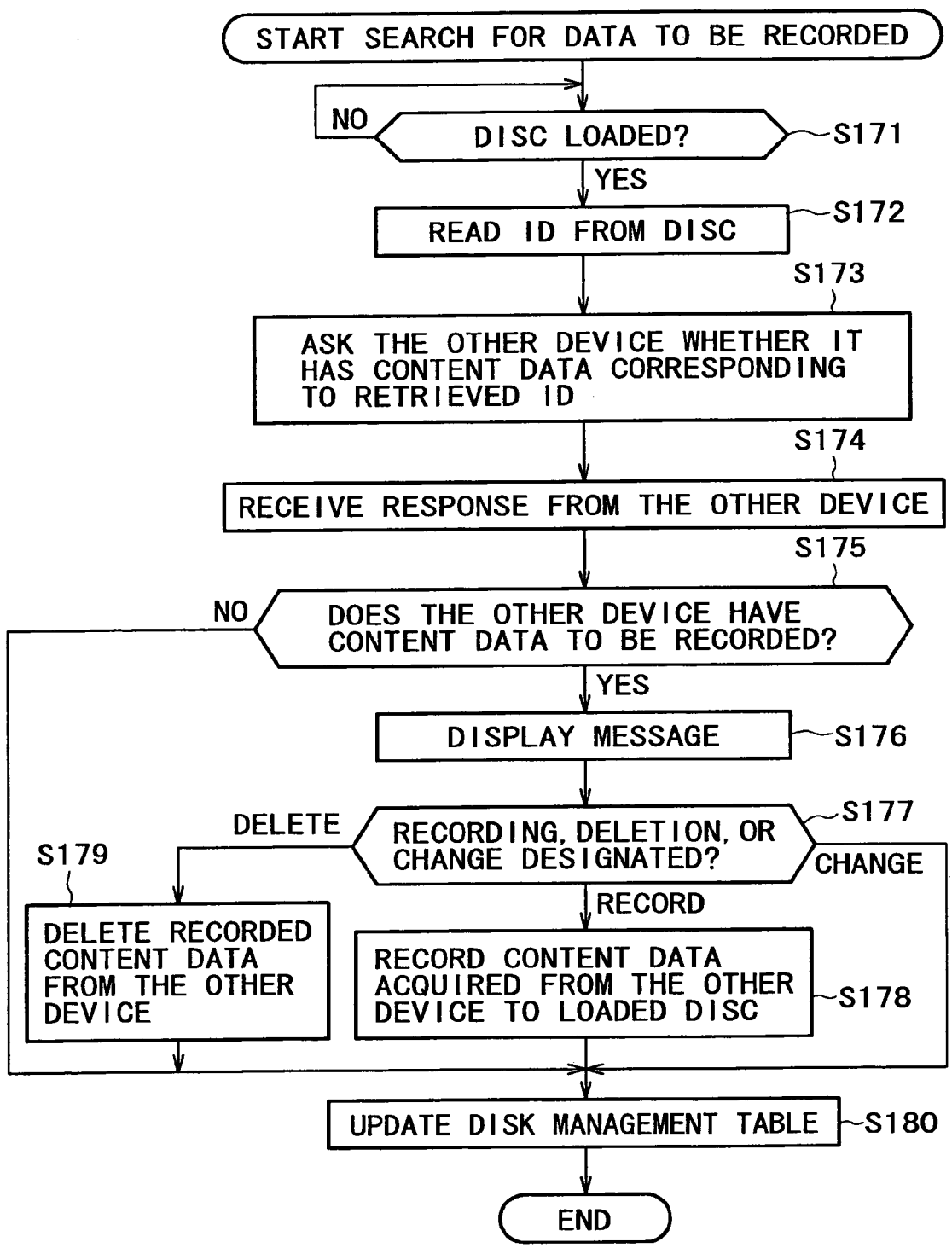
FIG. 52 is a flowchart of steps constituting a search process.
Figure 53:
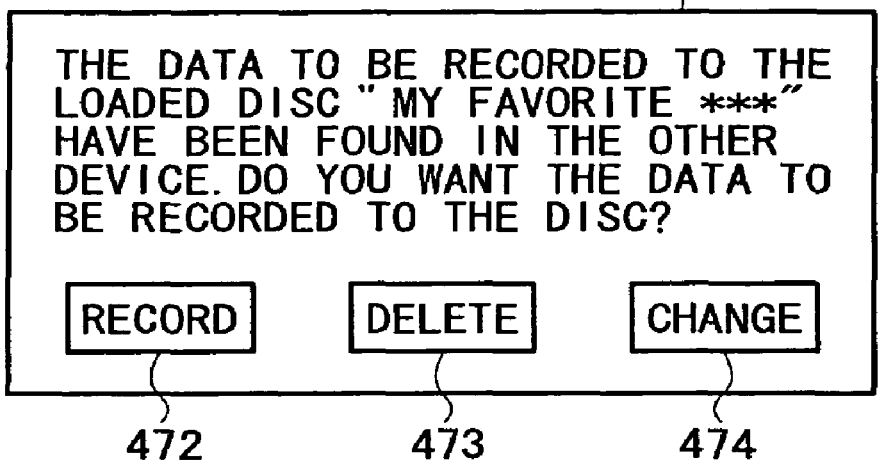
FIG. 53 is a schematic view of a typical dialog screen display.

Returning to step S177 in FIG. 52, the information control unit 351 determines which of the Record button 472, Delete button 473, and Change button 474 is selected by the user on the dialog screen 471 shown in FIG. 53. If the user is found to have selected the Record button 472, step S178 is reached.

In step S178, the information control unit 351, using the communication unit 352 and network 302, acquires from the other configured recorder the content data to be recorded to the loaded disc and supplies the acquired data to the recording/reproduction unit 5 for recording to the disc 1. After the content data from the other recorder have been recorded to the disc 1, the data in question held by the other recorder are deleted either automatically or manually in response to the user's instruction.

If in step S177 the user is found to have selected the Delete button 473, step S179 is reached. In step S179, the information control unit 351 using the communication unit 352 and network 302 causes the other configured recorder to delete its content data that were to be recorded to the loaded disc.

If in step S177 the user is found to have selected the Change button 474, step S180 is reached. In step S180, the information control unit 351 causes the display unit 9 to display the disc change screen shown in FIG. 47. The user then proceeds to change discs in order to get the content data recorded to a different disc as discussed above.

More specifically in step S180, the information control unit 351 updates the applicable additional information (date of date creation, remaining recordable capacity, etc.) and flags in its disc management table following the recording to the disc 1 of the content data acquired from the other configured recorder, the deletion of the content data in question from the other configured recorder, or the change of discs preparatory to recording. Alternatively, the information control unit 351 using the network 302 causes the other configured recorder to update the additional information and flags in the disc management table of that recorder.

As described, it is easy to search the other configured recorder or recorders over the network 302 for any content data that need to be recorded to the disc 1. If any other configured recorder is found to retain the content data to be recorded to the disc 1, the data in question are acquired from that recorder and recorded to the disc 1.

In the manner described above, local disc IDs and local disc names which are added to the discs 1 and which differ from their original disc IDs and disc names allow each digital video recorder to manage the discs with ease. Furthermore, the inventive arrangements permit the HDD 330 of the digital video recorder to retain temporarily the content data to be recorded eventually to a given disc 1.

The data stored on the HDD 330 are not limited to those to be recorded to the disc 1; the data not associated with the disc 1 may also be retained temporarily on the HDD 330. Illustratively, the data retained on the HDD 330 but not scheduled to be recorded to the disc 1, and the data saved temporarily on the HDD 330 because of an inadvertent removal of power or like eventualities, may be associated as needed with the disc 1 through simple operations.

Figure 54:
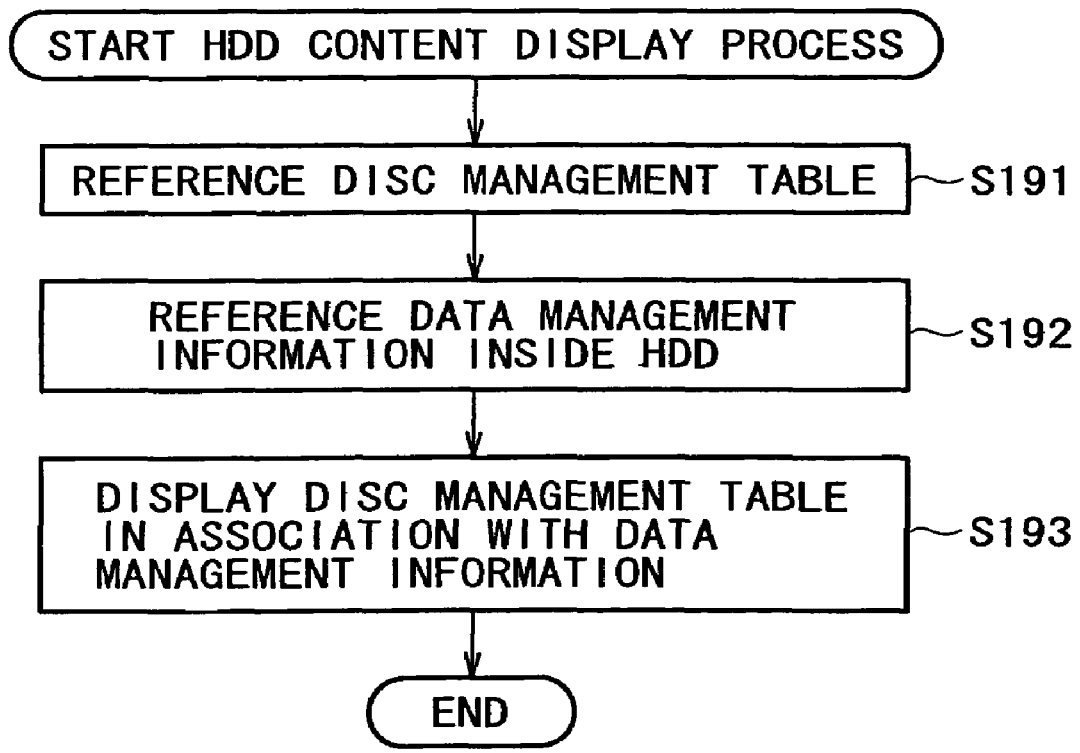
FIG. 54 is a flowchart of steps constituting a display process.

Described below with reference to the flowchart of FIG. 54 is the process of displaying the data held on the HDD 330. This process is started when the user performs operations to let all data held on the HDD 330 be displayed on the screen.

In steps S191 and S192, the information control unit 351 in response to the user's operations references the disc management table in the data management memory 328A and refers to the data management information in the data management information storage area 361 on the HDD 330. Generally, the disc management table contains the disc information about all discs 1 that have been loaded so far and the data management information includes all data that have been held in the real data storage area 362. Referencing these tables allows the information control unit 351 to acquire the content data to be recorded to the disc 1 as well as the data not associated therewith (i.e., all data that have been stored on the HDD 330).

Figure 55:
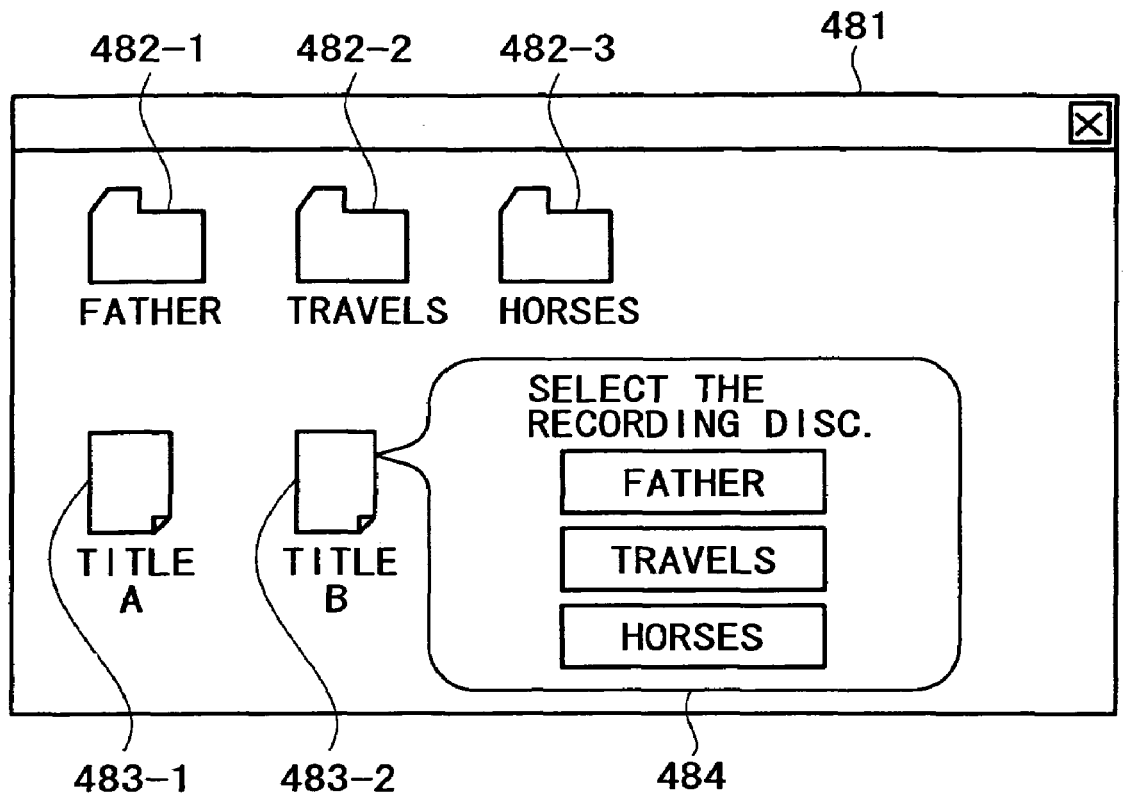
FIG. 55 is a schematic view of a typical HDD reference screen display.

In step S193, the information control unit 351 associates the information acquired in step S191 from the disc management table with the data management information obtained in step S192, and causes the display unit 9 to display an HDD reference screen 481 such as one shown in FIG. 55.

The HDD reference screen 481 displays folders 482-1 through 482-3 as well as files 483-1 and 483-2. The folder 482-1 is shown having content data to be recorded to a disc 1 having a disc ID "0001" (with a local disc name "Father"); the folder 482-2 is shown holding content data to be recorded to a disc 1 having a disc ID "0002" (with a local disc name "Travels"); and the folder 482-3 is shown retaining content data to be recorded to a disc 1 having a disc ID "0003" (with a local disc name "Horses"). The files 483-1 and 483-2 indicate data that are not associated with any disc 1.

These icons on display allow the user to determine easily whether or not any given set of data is associated with any disc 1.

Suppose that after viewing the HDD reference screen 481, the user wants to have the file 483-2 recorded to the applicable disc. In that case, the user right-clicks the mouse to display a pull-down screen 484. The pull-down screen 484 shows items "Father," "Travels" and "Horses." When the user selects one of the items (e.g., item "Father"), the file 483-2 is moved into the corresponding folder (folder 482-1 in this case) and the disc management table is updated accordingly (a recording ID for the title B is brought into association with the disc ID "0001" when recorded).

Whereas it was shown that the user may select any one of the items on the pull-down screen 484 to get the desired file associated with the applicable disc (i.e., folder), this is not limitative of the invention. Alternatively, the file 483-2 may be simply moved into the folder 482-1 in a drag-and-drop manner to establish its correspondence to the applicable disc.

Whereas the folders 482-1 through 482-3 are created and displayed on the basis of their disc IDs held in the disc management table, this is not limitative of the invention. Alternatively, the content data placed in each of the folders may be additionally displayed on the screen.

Figure 56:
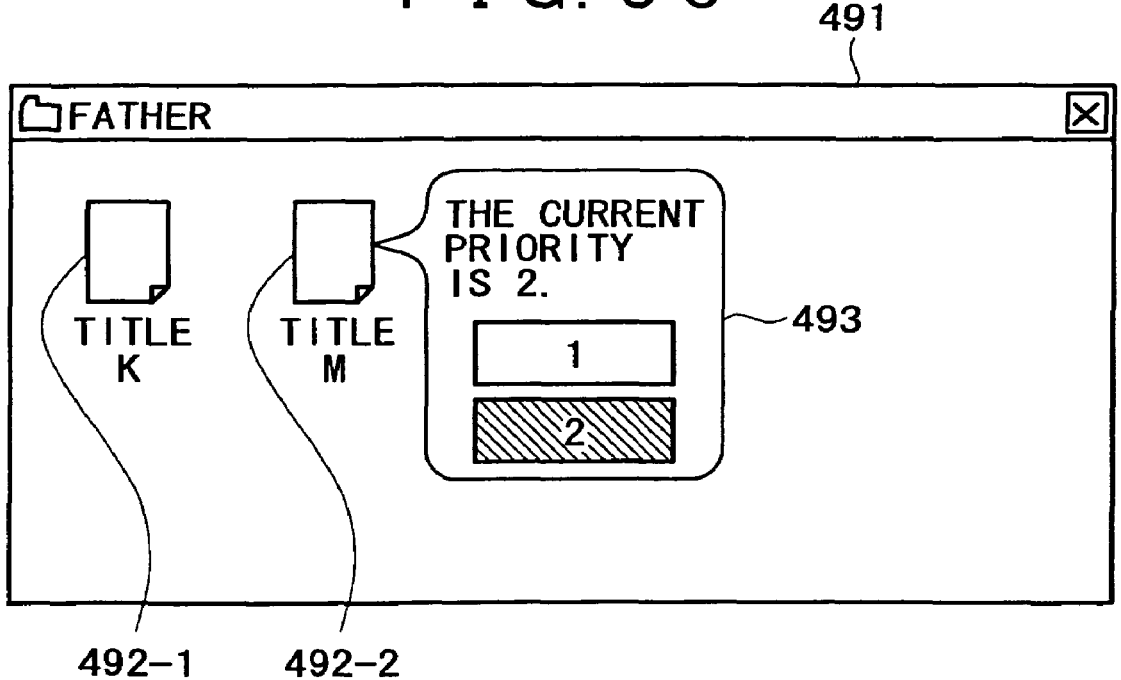
FIG. 56 is a schematic view of a typical disc reference screen display.

For example, when the user double-clicks on the folder 482-1 with the mouse, a disc reference screen 491 such as one in FIG. 56 appears. The disc reference screen 491 shows files 492-1 and 492-2 which are content data held in the folder 482-1 (i.e., data to be recorded to the disc with the disc ID "0001"). With the disc reference screen 491 on display, the user may set or change priorities for the content data to be recorded to the disc.

For example, if the user wants to change the priority for the file 492-2, the user right-clicks the mouse to get a pull-down screen 493 displayed. The pull-down screen 493 shows items "1" and "2" indicative of priorities (the priority is shown set for "2" in this example). If the user selects the item "1," the priority for the file 492-2 is changed from "2" to "1." Following the user's operations, the file 492-1 has its priority changed from "1" to "2," and the recording IDs in the disc management table are updated correspondingly.

As described, when the disc information in the data management table are displayed in the form of icons or like indications, the user is offered more data visibility in establishing the correspondence of the data not associated with any disc to a desired disc through simple operations.

It has been shown that the content data to be recorded to the disc 1 are recorded temporarily onto the HDD 330 in the absence of the disc 1. Alternatively, the data may be temporarily recorded not only to the HDD 330 but also to other suitable recording media such as magnetic discs, optical discs, magneto-optical discs, or semiconductor memories.

The series of processes described above (e.g., the routine process of FIG. 4, duplication process of FIG. 5, reproduction reservation process of FIG. 7, search process of FIG. 13, deletion process of FIG. 21, mode setting process of FIG. 26, duplicate storage process of FIG. 30, routine process of FIG. 39, content recording process of FIG. 41, recording process of FIG. 45, priority setting process of FIG. 48, search process of FIG. 52, and content display process of FIG. 54) may be executed by hardware as well as by software. For the software-based processing to take place, the programs constituting processing sequences may be either loaded from dedicated hardware of a computer into its internal memory for execution, or installed upon program execution from a suitable program recording medium into a general-purpose personal computer or like equipment capable of executing diverse functions.

FIG. 57 indicates a typical internal structure of a general-purpose computer. In this structure, a CPU (central processing unit) 501 of the computer performs diverse processes in accordance with programs held in a ROM (read only memory) 502 or with programs loaded from a storage unit 508 into a RAM (random access memory) 503. The RAM 503 also accommodates data that may be needed by the CPU 501 in carrying out its processing.

The CPU 501, ROM 502, and RAM 503 are interconnected with one another via a bus 504. The bus 504 is also connected to an input/output interface 505.

The input/output interface 505 is connected to an input unit 506, an output unit 507, the storage unit 508, and a communication unit 509. The input unit 506 is made up of buttons, switches, a keyboard, and/or a mouse. The output unit 507 is formed by a display device such as a CRT (cathode ray tube) or an LCD and by speakers. The communication unit 509, constituted by a modem or a terminal adapter, conducts communications over networks including the Internet.

The input/output interface 505 is also connected as needed to a drive 510 that is loaded with a magnetic disc 511, an optical disc 512, a magneto-optical disc 513, or a semiconductor memory 514. Computer programs held on these media are read out and installed into the storage unit 508 for execution.

As shown in FIG. 57, the program recording media for accommodating computer-installable, computer-executable programs designed to perform the above-described processes are constituted not only by such package media as the magnetic disc 511 (including flexible disks), optical disc 512 (including CD-ROM (compact disc read-only memory) and DVD (digital versatile disc)), magneto-optical disc 513 (including MD (Mini-Disc; registered trademark)), or semiconductor memory 514; but also by the ROM 502 and storage unit 508 which are preinstalled in the computer before being offered to users and which may have the programs stored therein temporarily or permanently. The programs are recorded to the recording media via the communication unit 509 such as a router or a modem and through wired or wireless communication media such as public circuit networks, local area networks, the Internet, and digital satellite broadcasting networks.

In this specification, the steps which are stored on the program recording medium and which describe the programs to be executed represent not only the processes that are carried out in the depicted sequence (i.e., on a time series basis) but also processes that may be conducted parallelly or individually.

In this specification, the term "system" refers to an entire configuration made up of a plurality of component devices.

INDUSTRIAL APPLICABILITY

According to the invention, as described above, it is easy to manage information recorded on discs.

It is also easy to prevent inconsistencies that may occur in the managed information following such eventualities as an inadvertent removal of power.

The invention makes it possible properly to manage information recorded on a plurality of discs. Items of the information thus recorded can be listed, sorted, and searched for with ease.

Furthermore, the invention allows discs to be furnished with additional information that differs from user to user or from one recorder to another. Where a recording disc is not loaded in the recorder for the moment, data that should be recorded to that disc may be stored temporarily in the recorder for data management purposes.

The invention claimed is:

1. An information processing apparatus, comprising:
storing means for temporarily storing content data that is to be recorded subsequently to an information recording medium which is currently not loaded, and for temporarily storing, in association with the content data, identification information for identifying the information recording medium;
reading means for reading, in response to the information recording medium being loaded, identification information for identifying said information recording medium, the identification information being read from the loaded information recording medium;
first comparing means for comparing the read out identification information with the temporarily stored identification information associated with the temporarily stored content data;
recording means for recording the stored content data onto the loaded information recording medium if the comparison by said comparing means reveals that the read out identification information matches the temporarily stored identification information associated with the temporarily stored content data;
acquiring means for acquiring respective related information for each one of a plurality of previously loaded information recording mediums, the related information for a given one of the plurality of previously loaded information recording mediums including respective identification information for that information recording medium and a list of entries recorded on that information recording medium;
display controlling means for controlling display of at least part of the acquired related information;
selecting means for selecting, from the displayed related information, an entry from the list of entries recorded on a particular one of the plurality of previously loaded information recording mediums;
said reading means, in response to another information recording medium being loaded, reading from the another loaded information recording medium further identification information for identifying the another information recording medium;
second comparing means for comparing the further identification information read out by said reading means with the respective identification information associated with the particular one of the plurality of previously loaded information recording mediums; and
notifying means for, in response to the comparison by said second comparing means indicating that the read out identification information does not match the respective identification information associated with the particular one of the plurality of previously loaded information recording mediums, prompting a user to load a further one of the plurality of previously loaded information recording mediums whose respective identification information is associated with the selected related information.

2. An information processing apparatus according to claim 1, further comprising reproducing means for, if the comparison by said comparing means reveals that the respective identification information associated with said related information selected by said selecting means matches said further identification information read out by said reading means, reproducing from said another information recording medium said further content data associated with said related information selected by said selecting means.

3. An information processing apparatus according to claim 1, wherein said information processing apparatus further comprises:
third comparing means for comparing the read out further identification information with the respective identification information of each one of the plurality of previously loaded information recording mediums; and
updating means for updating, if the comparison by said third comparing means reveals that the read out further identification information matches the respective identification information of at least one of the plurality of previously loaded information recording mediums so that the another information recording medium is one of the plurality of previously loaded information recording mediums, the acquired related information based on further related information read from the another information recording medium.

4. An information processing apparatus according to claim 3, wherein
said storing means stores second content data acquired in association with still further identification information; and further comprising:
determining means for determining whether or not said further identification information read out by said reading means matches the still further identification information associated with said second content data stored by said storing means.

5. An information processing apparatus according to claim 4, further comprising writing means which, if said determining means determines that said further identification information read out by said reading means matches the still further identification information associated with said second content data stored by said storing means, then reads said second content data from said storing means and writes said second content data to said another information recording medium.

6. An information processing apparatus according to claim 3, wherein said recording means records, in association with said further identification information, additional information which differs from said further related information recorded on said another information recording medium and which concerns said further content data.

7. An information processing apparatus according to claim 3, further comprising selection means for a user to select a list entry mode for adding an entry to said list of entries when said list of entries contains a maximum allowable number of entries.

8. An information processing apparatus according to claim 3, further comprising priority setting means for a user to set a priority for said further content data to be recorded by said recording means to said another information recording medium; wherein the priority setting means displays a priority setting screen based on the related information for the user to set the priority for the further content data.

9. An information processing method, comprising:
temporarily storing content data that is to be recorded subsequently to an information recording medium which is currently not loaded, and temporarily storing, in association with the content data, identification information for identifying the information recording medium;
loading the information recording medium;
in response to the information recording medium being loaded, reading, from the loaded information recording medium, identification information for identifying said information recording medium, comparing the read out identification information with the temporarily stored identification information associated with the temporarily stored content data, and recording the temporarily stored content data onto the loaded information recording medium if the comparing step reveals that the read out identification information matches the temporarily stored identification information associated with the temporarily stored content data;

acquiring respective related information for each one of a plurality of previously loaded information recording mediums, the related information for a given one of the plurality of previously loaded information recording mediums including respective identification information for that information recording medium and a list of entries recorded on that information recording medium;

controlling display of at least part of the acquired related information;

selecting, from the displayed related information, an entry from the list of entries recorded on a particular one of the plurality of previously loaded information recording mediums; and in response to another information recording medium being loaded, reading from the another loaded information recording medium further identification information for identifying the another information recording medium, comparing the read out further identification information with the respective identification information associated with the particular one of the plurality of previously loaded information recording mediums, and in response to the comparison indicating that the read out identification information does not match the respective identification information associated with the particular one of the plurality of previously loaded information recording mediums, prompting a user to load a further one of the plurality of previously loaded information recording mediums whose respective identification information is associated with the selected related information.

10. An information processing method according to claim 9, further comprising:

comparing the further identification information read out read out from the another loaded information recording medium with the respective identification information of each one of the plurality of previously loaded information recording medium; and updating, if the comparison reveals that the read out further identification information matches the respective identification information of at least one of the plurality of previously loaded information recording mediums so that the another information recording medium is one of the plurality of previously loaded information recording mediums, the acquired related information based on further related information read from the another information recording medium.

11. An information processing method according to claim 10, further comprising:

storing second content data acquired in association with still further identification information; and determining whether or not said further identification information read out from the another information recording medium matches the still further identification information associated with said stored second content data.

12. An information processing method according to claim 11, further comprising reading, if said determining step determines that said read out further identification information matches the still further identification information associated with said second content data, said stored second content data and writing said second content data to said another information recording medium.

13. An information processing method according to claim 10, further comprising:

selecting a list entry mode for adding an entry to said list of entries when said list of entries contains a maximum allowable number of entries;

adding said entry to said list of entries in accordance with the selected list entry mode when the list of entries contains a maximum allowable number of entries;

setting a priority for said further content data to be recorded to said another information recording medium, including displaying a priority setting screen based on the related information for a user to set the priority for the content data; and recording said further content data to said another information recording medium in accordance with the set priority.

* * * * *